United States Patent
Katakura et al.

(10) Patent No.: US 7,859,765 B2
(45) Date of Patent: Dec. 28, 2010

(54) ZOOM LENS AND IMAGE PICKUP APPARATUS EQUIPPED WITH SAME

(75) Inventors: Masahiro Katakura, Chofu (JP); Kazuteru Kawamura, Hachiouji (JP)

(73) Assignee: Olympus Imaging Corp., Tokyo (JP)

( * ) Notice: Subject to any disclaimer, the term of this patent is extended or adjusted under 35 U.S.C. 154(b) by 118 days.

(21) Appl. No.: 12/384,976

(22) Filed: Apr. 9, 2009

(65) Prior Publication Data

US 2009/0257131 A1 Oct. 15, 2009

(30) Foreign Application Priority Data

| Apr. 11, 2008 | (JP) | 2008-103918 |
| Apr. 17, 2008 | (JP) | 2008-107524 |

(51) Int. Cl.
   *G02B 15/14* (2006.01)
(52) U.S. Cl. ........ 359/684; 359/686
(58) Field of Classification Search .......... 359/684, 359/686, 676, 678, 681, 715
See application file for complete search history.

(56) References Cited

U.S. PATENT DOCUMENTS 7,116,482 B2   10/2006   Yang

2006/0066953 A1   3/2006   Nishio et al.
2006/0279853 A1   12/2006   Morooka et al.
2008/0198474 A1   8/2008   Morooka et al.

FOREIGN PATENT DOCUMENTS

| JP | 2-27301 | 1/1990 |
| JP | 2001-324676 | 11/2001 |
| JP | 2005-92115 | 4/2005 |
| JP | 2006-098962 | 4/2006 |
| JP | 2006-343622 | 12/2006 |

*Primary Examiner*—Alicia M Harrington
(74) *Attorney, Agent, or Firm*—Kenyon & Kenyon LLP

(57) ABSTRACT

An apparatus has a zoom lens and an image pickup element disposed on the image side of the zoom lens that converts an optical image formed by the zoom lens into an electrical signal. The zoom lens includes, in order from the object side to the image side, a negative first lens unit, a negative second lens unit, a positive third lens unit, and a negative fourth lens unit. During zooming from the wide angle end to the telephoto end, the distance between the first lens unit and the second lens unit changes, the distance between the second lens unit and the third lens unit changes, and the distance between the third lens unit and the fourth lens unit changes, the distance between the second lens unit and the third lens unit being smaller at the telephoto end than at the wide angle end. The first lens unit includes a reflecting surface that deflects the optical path, and the zoom lens satisfies the following condition (1): $-100 < fg4/ihw < -2.5$ (1).

50 Claims, 40 Drawing Sheets

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application Nos. 2008-103918 filed on Apr. 11, 2008, and 2008-107524 filed on Apr. 17, 2008; the entire contents of which are incorporated herein by reference.

BACKGROUND OF THE INVENTION

1. Field of the Invention

The present invention relates to a zoom lens having a reflecting surface that deflects the optical path. The present invention also relates to an image pickup apparatus equipped with such a zoom lens and an image pickup element.

2. Description of the Related Art

Zoom lenses used in image pickup apparatuses such as digital cameras and video cameras are required to have high performance and high zoom ratio and to be made smaller. One of the important factors in achieving a reduction in the size of the image pickup apparatus is the thickness of the zoom lens (i.e. the dimension of the lens system measured along the direction of the axis of light incident thereon from the object side).

In a know type of zoom lens, in order to reduce the thickness of the image pickup apparatus or camera when not in use, the lens system is extended out from the camera body when in use (i.e. when the apparatus is turned on) and received in the camera body when not in use (i.e. when the apparatus is turned off).

However, in this type of zoom lens, the first lens unit is extended greatly out from the body of the image pickup apparatus when the apparatus is turned from off to on. This is disadvantageous in terms of driving time and power consumption.

On the other hand, there is a known zoom lens in which a reflecting member is provided in the first lens unit disposed closest to the object side to deflect the optical path, in order to reduce the operation of the image pickup apparatus performed when it is turned on and to achieve slimming of the apparatus.

There is a known zoom lens including a first lens unit having a positive refracting power, a second lens unit having a negative refracting power, a third lens unit having a positive refracting power, and a fourth lens unit having a positive refracting power, in which a reflecting member that deflects the optical path is provided in the first lens unit to achieve slimming of the image pickup apparatus with respect to the thickness direction while maintaining a zoom ratio as high as approximately four, as disclosed in, for example, Japanese Patent Application Laid-Open No. 2006-343622.

There is another known zoom lens including a first lens unit having a negative refracting power, a second lens unit having a negative refracting power, a third lens unit having a positive refracting power, and a fourth lens unit having a negative refracting power in which a reflecting member that deflects the optical path is provided in the first lens unit to achieve slimming of the image pickup apparatus with respect to the thickness direction while maintaining a zoom ratio as high as approximately three, as disclosed in, for example, Japanese Patent Application Laid-Open No. 2006-98962.

SUMMARY OF THE INVENTION

An image pickup apparatus according to a first aspect of the present invention comprises, in order from its object side:
a zoom lens; and
an image pickup element that converts an optical image formed by the zoom lens into an electrical signal, wherein
the zoom lens comprises, in order from the object side, a first lens unit having a negative refracting power, a second lens unit having a negative refracting power, a third lens unit having a positive refracting power, and a fourth lens unit having a negative refracting power,
during zooming from the wide angle end to the telephoto end, the distance between the first lens unit and the second lens unit changes, the distance between the second lens unit and the third lens unit changes, and the distance between the third lens unit and the fourth lens unit changes, the distance between the second lens unit and the third lens unit being smaller at the telephoto end than at the wide angle end, and
the first lens unit comprises a reflecting surface that deflects the optical path, and the zoom lens satisfies the following condition (1):

$$-100 < fg4/ihw < -2.5 \tag{1}$$

where fg4 is the focal length of the fourth lens unit, and ihw is the maximum image height at the wide angle end, wherein if an effective image pickup area of the image pickup element is variable, ihw is the largest value among values it can assume.

A zoom lens according to a second aspect of the present invention comprises, in order from its object side, a first lens unit having a negative refracting power, a second lens unit having a negative refracting power, a third lens unit having a positive refracting power, and a fourth lens unit having a negative refracting power, wherein
during zooming from the wide angle end to the telephoto end, the distance between the first lens unit and the second lens unit changes, the distance between the second lens unit and the third lens unit changes, and the distance between the third lens unit and the fourth lens unit changes, the distance between the second lens unit and the third lens unit being smaller at the telephoto end than at the wide angle end, and
the first lens unit comprises a reflecting surface that deflects the optical path, a lens element having a negative refracting power disposed on the object side of the reflecting surface, and a convex surface having a positive refracting power disposed on the image side of the negative lens element.

BRIEF DESCRIPTION OF THE DRAWINGS

FIG. 18A shows aberrations at the wide angle end, FIG. 18B shows aberrations at the intermediate focal length position, and FIG. 18C shows aberrations at the telephoto end;

FIG. 19A shows aberrations at the wide angle end, FIG. 19B shows aberrations at the intermediate focal length position, and FIG. 19C shows aberrations at the telephoto end;

FIG. 20A shows aberrations at the wide angle end, FIG. 20B shows aberrations at the intermediate focal length position, and FIG. 20C shows aberrations at the telephoto end;

FIG. 21A shows aberrations at the wide angle end, FIG. 21B shows aberrations at the intermediate focal length position, and FIG. 21C shows aberrations at the telephoto end;

FIG. 22A shows aberrations at the wide angle end, FIG. 22B shows aberrations at the intermediate focal length position, and FIG. 22C shows aberrations at the telephoto end;

FIG. 23A shows aberrations at the wide angle end, FIG. 23B shows aberrations at the intermediate focal length position, and FIG. 23C shows aberrations at the telephoto end;

FIG. 24A shows aberrations at the wide angle end, FIG. 24B shows aberrations at the intermediate focal length position, and FIG. 24C shows aberrations at the telephoto end;

FIG. 25A shows aberrations at the wide angle end, FIG. 25B shows aberrations at the intermediate focal length position, and FIG. 25C shows aberrations at the telephoto end;

FIG. 26A shows aberrations at the wide angle end, FIG. 26B shows aberrations at the intermediate focal length position, and FIG. 26C shows aberrations at the telephoto end;

FIG. 27A shows aberrations at the wide angle end, FIG. 27B shows aberrations at the intermediate focal length position, and FIG. 27C shows aberrations at the telephoto end;

FIG. 28A shows aberrations at the wide angle end, FIG. 28B shows aberrations at the intermediate focal length position, and FIG. 28C shows aberrations at the telephoto end;

FIG. 29A shows aberrations at the wide angle end, FIG. 29B shows aberrations at the intermediate focal length position, and FIG. 29C shows aberrations at the telephoto end;

FIG. 30A shows aberrations at the wide angle end, FIG. 30B shows aberrations at the intermediate focal length position, and FIG. 30C shows aberrations at the telephoto end;

FIG. 31A shows aberrations at the wide angle end, FIG. 31B shows aberrations at the intermediate focal length position, and FIG. 31C shows aberrations at the telephoto end;

FIG. 32A shows aberrations at the wide angle end, FIG. 32B shows aberrations at the intermediate focal length position, and FIG. 32C shows aberrations at the telephoto end;

FIG. 33A shows aberrations at the wide angle end, FIG. 33B shows aberrations at the intermediate focal length position, and FIG. 33C shows aberrations at the telephoto end;

FIG. 34A shows aberrations at the wide angle end, FIG. 34B shows aberrations at the intermediate focal length position, and FIG. 34C shows aberrations at the telephoto end;

DETAILED DESCRIPTION OF THE INVENTION

Figure 1A:
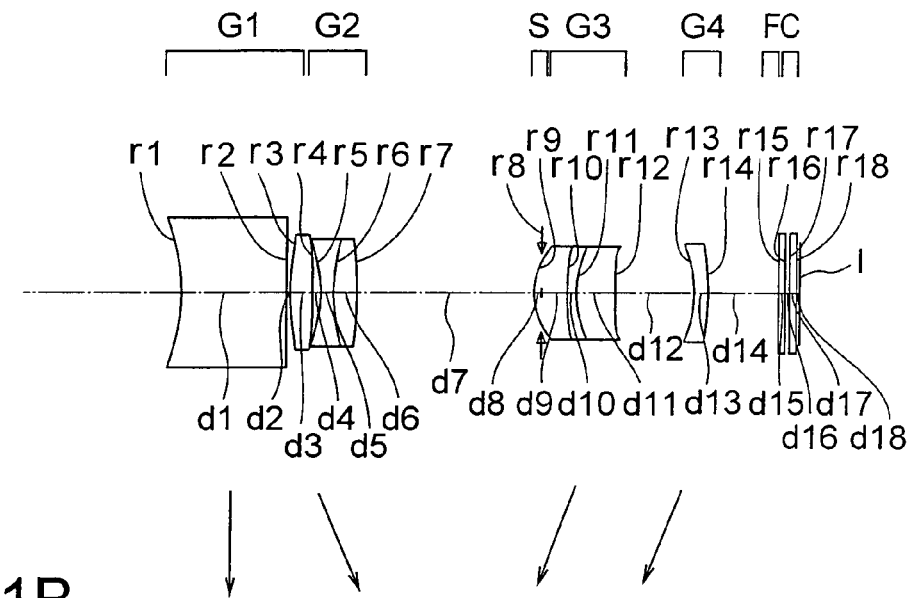
FIGS. 1A, 1B, and 1C are cross sectional views of a zoom lens according to a first embodiment of the present invention in the state in which the zoom lens is focused on an object point at infinity respectively at the wide angle end (FIG. 1A), in an intermediate focal length state (FIG. 1B), and at the telephoto end (FIG. 1C)

An image pickup apparatus according to a first aspect of the present invention has a zoom lens and an image pickup element that is disposed on the image side of the zoom lens and converts an optical image formed by the zoom lens into an electrical signal. The zoom lens includes, in order from the object side to the image side thereof, a first lens unit having a negative refracting power, a second lens unit having a negative refracting power, a third lens unit having a positive refracting power, and a fourth lens unit having a negative refracting power, wherein during zooming from the wide angle end to the telephoto end, the distance between the first lens unit and the second lens unit changes, the distance between the second lens unit and the third lens unit changes, the distance between the third lens unit and the fourth lens unit changes, and the distance between the second lens unit and the third lens unit is smaller at the telephoto end than at the wide angle end.

In addition, the first lens unit has a reflecting surface that deflects the optical path, and the fourth lens unit satisfies the following condition:

$$-100 < fg4/ihw < -2.5 \quad (1)$$

where fg4 is the focal length of the fourth lens unit, and ihw is the maximum image height at the wide angle end, wherein if the effective image pickup area of the image pickup element is variable, ihw is the largest value among values it can assume.

By designing the first lens unit and the second lens unit to both have a negative refracting power, it becomes easy to provide the composite system of the first lens unit and the second lens unit with an adequate negative refracting power at the wide angle end. This is advantageous in achieving an adequate angle of field at the wide angle end, in decreasing the optical path length, and in reducing shading. In addition, designing the first lens unit to have a negative refracting power facilitates preventing the second lens unit from having an unduly high negative refracting power, which in turn facilitates a reduction in variations of aberrations during zooming.

Changing the distance between the second lens unit having a negative refracting power and the third lens unit having a positive refracting power facilitates making the third lens unit to provide a major part of the magnification change. Changing the respective distances between the first, the second, the third, and the fourth lens units enables control of variations in the pupil position and aberrations and facilitates adjustment of the image position.

The fourth lens unit having a negative refracting power is provided on the image side of the third lens unit having a positive refracting power. Thus, lens units each having a negative refracting power are disposed on both the object side and the image side of the third lens unit having a positive refracting power. This enables good symmetry of the refracting power arrangement. As a result, distortion and curvature of field can easily be prevented from becoming unnecessarily large.

In the zoom lens according to the present invention, having a reflecting surface in the first lens unit as described above is advantageous in reducing the thickness of the zoom lens (i.e. the dimension of the lens system measured along the direction of the axis of light incident thereon from the object side).

In addition, the fourth lens unit satisfies the above-mentioned conditional expression (1).

Conditional expression (1) specifies preferred values of the ratio of the negative focal length of the fourth lens unit and the image height at the wide angle end.

The fourth lens unit has the function of refracting off-axis rays emerging from the third lens unit having a positive refracting power in directions away from the optical axis. Therefore, it is possible to adjust the size of the second and the third lens units relative to the size of the image surface by controlling the degree of the negative refracting power of the fourth lens unit.

Conditional expression (1) is introduced to achieve a reduction in the size of the lens system as well as to provide good quality images.

If the lower limit of conditional expression (1) is not exceeded so that the fourth lens unit has an adequate negative refracting power, a reduction in the size of the second and the third lens units relative to the image height is facilitated. If the fourth lens unit has an adequate negative refracting power, good symmetry in the refracting power arrangement in the entire zoom lens can be achieved. This facilitates suppression of unduly large curvature of field and distortion.

If the upper limit of conditional expression (1) is not exceeded so that the negative refracting power of the fourth lens unit is made moderately small, the angle formed by off-axis principal rays emerging from the fourth lens unit and the optical axis can be reduced to a moderate extent. This facilitates, consequently, making the angle of incidence of off-axis principal rays on the image pickup element small and reducing the influence of shading.

In addition, a reduction in the aberration generated in the fourth lens unit is facilitated, which leads to an additional benefit, for example, that variations in off-axis aberrations during zooming can be reduced even if the fourth lens unit is composed of a single lens.

To achieve the above-described advantageous effects, it is more preferred that the following condition be satisfied:

$$-40 < fg4/ihw < -4.5 \quad (1'),$$

and it is still more preferred that the following condition be satisfied:

$$-15 < fg4/ihw < -6.0 \quad (1'').$$

The upper limit and/or the lower limit of the basic conditional expression (1) may be replaced respectively by the upper limit and/or the lower limit of the more limited conditional expression (1') or (1''). This also applies to other conditional expressions that will be presented in the following.

The term "effective image pickup area" refers to an area of an image formed on the light receiving surface of the image pickup element in which an image to be used for display and/or printing etc. is present.

In the case of an image pickup apparatus that has the function of transforming an image in a barrel-shaped area on the image pickup element into image information representing a rectangular image for display and/or printing at the wide angle end in order to electrically correct barrel distortion of the zoom lens at the wide angle end, the effective image pickup area has a barrel shape.

In the case of an image pickup apparatus in which the effective image pickup area at the wide angle end can be changed when picking up image (e.g. an image pickup apparatus having the function of changing aspect ratio at user's will), the effective image pickup area shall be the image pickup area having the largest image height.

Examples of the image pickup apparatus may include a digital camera, a camera-equipped cellular phone, and a notebook computer equipped with camera for video communication etc.

It is preferred that any one or some of the following features be additionally adopted in the above-described apparatus according to the present invention.

It is preferred that the fourth lens unit be located closer to the object side at the telephoto end than at the wide angle end, and satisfy the following condition:

$$1.01 < \beta g4(t)/\beta g4(w) < 2.0 \quad (2)$$

where $\beta g4(w)$ is the lateral magnification of the fourth lens unit at the wide angle end, and $\beta g4(t)$ is the lateral magnification of the fourth lens unit at the telephoto end.

By moving the fourth lens unit in the above-described manner, the fourth lens unit can operate to provide a magnification change. This enables a reduction in the share of the magnification change that the third unit is required to have. This is advantageous in achieving good optical performance and an adequate zoom ratio.

Conditional expression (2) specifies preferred values of the magnification change ratio of the fourth lens unit.

It is preferred that the lower limit of conditional expression (2) be not exceeded so that the fourth lens unit provides an adequate magnification change.

It is also preferred that the upper limit of conditional expression (2) is not exceeded so that the magnification change provided by the forth lens unit is made small, thereby preventing the movement amount of the fourth lens unit from becoming unduly large. This is preferred in order to reduce variations in off-axis aberrations, to make the size of the zoom lens small, and to reduce manufacturing errors.

To achieve the above-described advantageous effects, it is more preferred that the following condition be satisfied:

$$1.02 < \beta g4(t)/\beta g4(w) < 1.8 \quad (2'),$$

and it is still more preferred that the following condition be satisfied:

$$1.03 < \beta g4(t)/\beta g4(w) < 1.5 \quad (2'').$$

It is also preferred that the fourth lens unit satisfy the following condition:

$$-0.35 < Dg4/fg4 < -0.0005 \quad (3)$$

where $Dg4$ is the thickness of the fourth lens unit from its object side surface to its image side surface on the optical axis.

Conditional expression (3) specifies a preferred relationship between the length of the fourth lens unit on the optical axis and the focal length thereof.

Designing the fourth lens unit in such a way that the lower limit of conditional expression (3) is not exceeded is advantageous in achieving a reduction in the cost of the lens member. If the upper limit of conditional expression (3) is not exceeded so that the fourth lens unit has an appropriate thickness, refraction of off-axis rays is facilitated without a particular loss of durability.

To achieve the above-described effects, it is more preferred that the following condition be satisfied:

$$-0.3 < Dg4/fg4 < -0.005 \quad (3'),$$

and it is still more preferred that the following condition be satisfied:

$$-0.2 < Dg4/fg4 < -0.01 \quad (3'').$$

It is preferred that the zoom lens satisfy the following condition:

$$0.5 < enp(W)/fw < 1.8 \quad (4)$$

where $enp(w)$ is the distance, on the optical axis, from the object side refracting surface of the first lens unit to the entrance pupil at the wide angle end, and $fw$ is the focal length of the entire zoom lens system at the wide angle end.

In the zoom lens according to the present invention, in which the lens unit disposed closest to the object side has a reflecting surface, the thickness of the zoom lens significantly depend on the distance from the surface closest to the object side of the first lens unit to the reflecting surface.

To make this distance smaller, it is preferred that the entrance pupil be located as close to the object side as possible, and the height of rays in the first lens unit be made smaller.

However, in order to locate the entrance pupil closer to the object side, it is required to increase the negative refracting power of the second lens unit, or to locate a principal point of the second lens unit closer to the object side. This greatly affects aberration characteristics. Therefore, it is preferred that the position of the exit pupil is appropriately controlled so that a good balance between size reduction and optical performance is achieved.

Conditional expression (4) describes a preferred condition for this.

If the lower limit of conditional expression (4) is not exceeded, aberrations can easily be made well-balanced.

If the upper limit of conditional expression (4) is not exceeded, slimming of the image pickup apparatus is further facilitated.

It is more preferred that the following condition be satisfied:

$$0.7 < enp(W)/fw < 1.5 \qquad (4'),$$

and it is still more preferred that the following condition be satisfied:

$$1.0 < enp(W)/fw < 1.3 \qquad (4'').$$

It is also preferred that the first lens unit and the fourth lens unit satisfy the following condition:

$$0.001 < fg4/fg1 < 30.0 \qquad (5)$$

where fg1 is the focal length of the first lens unit.

Conditional expression (5) specifies preferred values of the ratio of the focal length of the first lens unit and the focal length of the fourth lens unit.

If the lower limit and the upper limit of conditional expression (5) are not exceeded, the degree of symmetry of the refracting power arrangement of the first lens unit and the fourth lens unit is further increased. Thus, aberrations such as distortion and curvature of field can be further reduced, and on-axis and off-axis aberrations can easily be made well-balanced.

It is more preferred that the following condition be satisfied:

$$0.01 < fg4/fg1 < 5.0 \qquad (5'),$$

and it is still more preferred that the following condition be satisfied:

$$0.3 < fg4/fg1 < 1.3 \qquad (5'').$$

It is also preferred that the first lens unit include a reflecting prism having a reflecting surface, an object side refracting surface, and an image side refracting surface, and the total number of reflecting surfaces that deflects the optical path in the zoom lens be one.

If the total number of reflecting members is one, the zoom lens can be prevented from having unnecessarily large entire length. Use of a prism as the reflecting member is advantageous in ensuring an adequate optical path length at low cost.

It is also preferred that the first lens unit include a reflecting prism having a reflecting surface, an object side refracting surface, and an image side refracting surface, and the reflecting prism satisfy the following condition:

$$0.5 < Dpr/fw < 2.0 \qquad (6)$$

where Dpr is the optical path length from the object side refracting surface of the reflecting prism to the image side refracting surface thereof along the optical axis, and fw is the focal length of the entire zoom lens system at the wide angle end.

Conditional expression (6) describes a preferred condition for disposing a prism in the first lens unit without difficulty in the case where the prism to deflect the optical axis is provided in the first lens unit.

If the lower limit of conditional expression (6) is not exceeded, the prism can easily be designed to have an adequate optical path length.

If the upper limit of conditional expression (6) is not exceeded, a reduction in the size of the prism is facilitated.

It is more preferred that the following condition be satisfied:

$$0.7 < Dp/fw < 1.5 \qquad (6'),$$

and it is still more preferred that the following condition be satisfied:

$$0.8 < Dp/fw < 1.3 \qquad (6'').$$

It is also preferred that the first lens unit include a reflecting prism having a reflecting surface, an object side refracting surface, and an image side refracting surface, and the reflecting prism satisfy the following condition:

$$1.70 < nd(pr) < 2.3 \qquad (10)$$

where nd(pr) is the refractive index for the d-line of the reflecting prism in the first lens unit.

Conditional expression (10) specifies preferred values of the refractive index of the reflecting prism in the first lens unit. Designing the zoom lens in such a way that conditional expression (10) is satisfied is advantageous in providing an adequate optical path length without an unnecessary increase in the cost.

If the lower limit of conditional expression (10) is not exceeded so that the reflecting prism has an appropriate refractive index, an adequate optical path length can be achieved without using a large reflecting prism.

If the upper limit if conditional expression (10) is not exceeded, a reduction in the cost of the reflecting prism is facilitated.

To achieve the above-described advantageous effects, it is more preferred that the following condition be satisfied:

$$1.80 < nd(pr) < 2.1 \qquad (10'),$$

and it is still more preferred that the following condition be satisfied:

$$1.88 < nd(pr) < 2.0 \qquad (10'').$$

It is also preferred that during zooming from the wide angle end to the telephoto end, the first lens unit be kept stationary, the second lens unit be moved, and the third lens unit be moved in such a way that it is located closer to the object side at the telephoto end than at the wide angle end.

This eliminates the need for a mechanism for driving the first lens unit, and therefore facilitates slimming of the zoom lens. In addition this is advantageous in making the image pickup apparatus dust-proof and drip-proof.

Furthermore, the second lens unit having a negative refracting power can serve as a compensator. In addition, the third lens unit having a positive refracting power can serve as a variator. This is advantageous in achieving an adequately high zoom ratio and in reducing the optical path length.

It is also preferred that during zooming from the wide angle end to the telephoto end, the second lens unit move first toward the image side and thereafter reverse its moving direction to move toward the object side.

This is advantageous in reducing the optical path length after the reflecting surface while providing an adequate magnification change by the movement of the third lens unit.

It is preferred that during focusing operation from an object at a long distance toward an object at a short distance, the fourth lens unit move toward the image side.

In the zoom lens used in the image pickup apparatus according to the present invention, the second lens unit and the fourth lens unit may be designed to serve as focusing lens units.

By disposing the focusing lens units closer to the image side than the reflecting surface, the variation in the thickness of the zoom lens during focusing is eliminated, which facilitates slimming of the zoom lens.

Moving the fourth lens unit for focusing is more preferred than moving the second lens unit, because a space for movement of the lens unit during focusing can more easily be provided.

It is also preferred that the third lens unit be composed of two positive lens elements and one negative lens element, and at least two of these lens elements be cemented together.

Having two positive lens elements and one negative lens element with at least one cemented surface in the third lens unit enables good correction of on-axis chromatic aberration and spherical aberration particularly at the telephoto end. Use of not more than three lens elements is advantageous in reducing the cost. Using as much as three lens elements is advantageous in reducing spherical aberration particularly at the telephoto end.

It is also preferred that the second lens unit be composed of two lens elements including, in order from the object side, a negative lens element and a positive lens element, and the negative lens element and the positive lens element be cemented together.

Use of the second lens unit composed of a cemented lens made up of a negative lens element and a positive lens element arranged in order from the object side is advantageous in achieving good correction of chromatic aberration of magnification particularly at the wide angle end.

It is also preferred that the fourth lens unit be composed of two or fewer lens elements.

This is advantageous in reducing the cost. A reduction in the cost is further facilitated by composing the fourth lens unit of one negative lens element.

It is also preferred that the fourth lens unit have a negative lens that is disposed closest to the image side in the fourth lens unit and satisfies the following condition:

$$1.4 < nd(g4i) < 1.7 \quad (7)$$

$$55.0 < vd(g4i) < 100 \quad (8)$$

where $nd(g4i)$ is the refractive index for the d-line of the lens closest to the image side in the fourth lens unit, and $vd(g4i)$ is the Abbe number of the lens closest to the image side in the fourth lens unit.

Conditional expressions (7) and (8) respectively specify preferred values of the refractive index and the Abbe number of the lens located closest to the image side in the fourth lens unit.

In the zoom lens used in the image pickup apparatus according to the first aspect of the present invention, using a lens having a negative refracting power as the lens located closest to the image side in the fourth lens unit is advantageous in reducing the size of the zoom lens. It is preferred that this negative lens be made of a low dispersion material.

Use of a negative lens that satisfies conditional expression (8) is advantageous particularly in reducing chromatic aberration of magnification.

If a low dispersion negative lens is used so that the lower limit of conditional expression (8) is not exceeded, a reduction in chromatic aberration of magnification is facilitated. If the upper limit of conditional expression (8) is not exceeded, a reduction in the cost of the lens material is facilitated.

If the lower limit of conditional expression (7) is not exceeded, the negative lens can easily have an adequate refracting power even with a relatively small curvature. This is advantageous in reducing off-axis aberrations. If the upper limit of conditional expression (7) is not exceeded, a reduction in the cost of the lower dispersion glass material that satisfies conditional expression (8) is facilitated.

It is also preferred that the zoom lens used in the apparatus according to the first aspect of the present invention be a four unit zoom lens having an aperture stop disposed between the image side surface of the second lens unit and the image side surface of the third lens unit.

The four unit zoom lens configuration is advantageous in achieving cost reduction while making the size of the zoom lens small with a limited number of lens units.

In this case, if an aperture stop, which determines the size of on-axis beams, is disposed between the image side surface of the second lens unit and the image side surface of the third lens unit, the size of each lens unit and the position of the exit pupil can easily be controlled favorably.

It is also preferred that the zoom lens used in the present invention satisfy the following condition:

$$1.8 < ft/fw < 6.5 \quad (9)$$

where $fw$ is the focal length of the entire zoom lens system at the wide angle end, and $ft$ is the focal length of the entire zoom lens system at the telephoto end.

It is preferred that the lower limit of conditional expression (9) is not exceeded so that the zoom lens has an adequate zoom ratio.

Limiting the zoom ratio of the zoom lens so that the upper limit of conditional expression (9) is not exceeded is advantageous in further facilitating a reduction in the size and cost and in maintaining good optical performance while preventing an increase in the number of lenses.

It is also preferred that the image pickup apparatus according to the first aspect of the present invention be provided with an image transformation section that transforms, by image processing, an electrical signal representing an image containing distortion attributed to the zoom lens into an image signal in which distortion is corrected.

In this case, distortion is allowed to be left in images formed by the zoom lens. This provides a further advantage in reducing the size of the zoom lens.

It is more preferred that the image pickup apparatus according to the present invention be provided with an image transformation section that transforms, by image processing, an electrical signal containing chromatic aberration of magnification attributed to the zoom lens into an image signal in which chromatic aberration of magnification is corrected.

In this case, chromatic aberration of magnification is allowed to be left in images formed by the zoom lens. This provides an advantage in reducing the cost of the lens material and the number of lenses.

It is more preferred two or more of the above described features be adopted at the same time.

In the case where the zoom lens has the focusing function, the conditional expressions presented above are for the state in which the zoom lens is focused on an object at the farthest distance.

It is more preferred that some of the conditions, which may be selected arbitrarily, be satisfied at the same time. In the more preferred numerical range limitations by each of the conditional expressions, limitation by only the upper limit value or the lower limit value may be applied. Furthermore, the various features described above may be adopted in any possible combination.

A zoom lens according to the second aspect of the present invention includes, in order from the object side to the image side, a first lens unit having a negative refracting power, a second lens unit having a negative refracting power, a third lens unit having a positive refracting power, and a fourth lens unit having a negative refracting power, wherein during zooming from the wide angle end to the telephoto end, the distance between the first lens unit and the second lens unit changes, the distance between the second lens unit and the third lens unit changes, the distance between the third lens unit and the fourth lens unit changes, and the distance between the second lens unit and the third lens unit is smaller at the telephoto end than at the wide angle end.

In addition, the first lens unit has a reflecting surface that deflects the optical path, a negative lens component having a negative refracting power disposed on the object side of the reflecting surface, and a convex lens surface having a positive refracting power disposed on the image side of the negative lens component. In this context, the term "lens component" refers to a lens member whose surfaces that are in contact with air on the optical axis include only two surfaces, one being the object side surface and the other being the image side surface. The lens component may be a single lens or a cemented lens.

By designing the first lens unit and the second lens unit to both have a negative refracting power, it becomes easy to provide the composite system of the first lens unit and the second lens unit with an adequate negative refracting power at the wide angle end. This is advantageous in achieving an adequate angle of field at the wide angle end, in decreasing the optical path length, and in reducing shading. In addition, designing the first lens unit to have a negative refracting power facilitates preventing the second lens unit from having an unduly high negative refracting power, which in turn facilitates a reduction in variations of aberrations during zooming.

Changing the distance between the second lens unit having a negative refracting power and the third lens unit having a positive refracting power facilitates making the third lens unit to provide a major part of the magnification change. Changing the respective distances between the first, the second, the third, and the fourth lens units enables control of variations in the pupil position and aberrations and facilitates adjustment of the image position.

The fourth lens unit having a negative refracting power is provided on the image side of the third lens unit having a positive refracting power. Thus, lens units each having a negative refracting power are disposed on both the object side and the image side of the third lens unit having a positive refracting power. This enables good symmetry of the refracting power arrangement. As a result, distortion and curvature of field can easily be prevented from becoming unnecessarily large.

In the zoom lens according to the second aspect of the present invention, having a reflecting surface in the first lens unit as described above is advantageous in reducing the thickness of the zoom lens (i.e. the dimension of the lens system measured along the direction of the axis of light incident thereon from the object side).

Furthermore, a negative lens component is provided on the object side of the reflecting surface. This negative lens component provides a plurality of refracting effects. This is advantageous in achieving an adequately large angle of view while suppressing aberrations.

Providing a convex lens surface located closer to the image side than this negative lens component facilitates cancellation of aberrations, such as chromatic aberration and spherical aberration, that cannot be corrected by the negative lens component. This is advantageous in achieving good optical performance.

It is preferred that the following condition concerning sharing of the negative refracting power among the first lens unit and the second lens unit be satisfied:

$$0.5 < Pg2/Pg1 < 20 \qquad (19)$$

where Pg1 is the refracting power of the first lens unit, and Pg2 is the refracting power of the second lens unit, the refracting power being the reciprocal of the focal length.

Conditional expression (19) specifies preferred sharing of the negative refracting power among the first lens unit and the second lens unit.

If the negative refracting power of the first lens unit is made moderately small so that the lower limit of conditional expression (19) is not exceeded, a reduction in chromatic aberration of magnification at zoom positions near the wide angle end and at zoom positions near the telephoto end, and spherical aberration at zoom positions near the telephoto end is facilitated.

If the negative refracting power of the second lens unit is made moderately small so that the upper limit of conditional expression (19) is not exceeded, a reduction in the curvature of field at zoom positions near the wide angle end and spherical aberration at zoom positions near the telephoto end is facilitated.

To achieve the above-described advantageous effects, it is more preferred that the following condition be satisfied:

$$1.0 < Pg2/Pg1 < 10.0. \qquad (19')$$

and it is still more preferred that the following condition be satisfied:

$$2.0 < Pg2/Pg1 < 7.0 \qquad (19'').$$

The upper limit and/or the lower limit of the basic conditional expression (19) may be replaced respectively by the upper limit and/or the lower limit of the more limited conditional expression (19') or (19''). This also applies to other conditional expressions that will be presented in the following.

It is also preferred that the negative lens component in the first lens unit have a shape with a concave surface directed toward the image side. This facilitates a reduction in the angle of incidence of off-axis rays on this concave surface, which is advantageous in reducing aberrations.

In addition, it is more preferred that the concave image side surface of the negative lens component in the first lens unit be an aspheric surface.

Making the concave image side surface of the negative lens component in the first lens unit aspheric enables good correction of off-axis aberrations among others.

It is preferred that the above-mentioned negative lens component satisfy the following condition:

$$0.5 < (rlno + rlni)/(rlno - rlni) < 2 \quad (14)$$

where rlno is the paraxial radius of curvature of the object side surface of the negative lens component in the first lens unit, and rlni is the paraxial radius of curvature of the image side surface of the negative lens component in the first lens unit.

If a plurality of negative lens components are provided on the object side of the reflecting surface, it is preferred that the above condition be applied to the negative lens component that is located closest to the object side, on which the height of incident rays is large.

Conditional expression (14) specifies preferred shapes of the negative lens component in the first lens unit.

If the lower limit of conditional expression (14) is not exceeded, a reduction in the angle of incidence of rays on the negative lens component is facilitated, which is advantageous in reducing off-axis aberrations such as distortion.

If the upper limit of conditional expression (14) is not exceeded, the curvature of the object side surface and image side surface of the negative lens component can be made small, which is advantageous in reducing spherical aberration and coma.

To achieve the above-described advantageous effects, it is more preferred that the following condition be satisfied:

$$0.7 < (rlno + rlni)/(rlno - rlni) < 1.5 \quad (14'),$$

and it is still more preferred that the following condition be satisfied:

$$0.9 < (rlno + rlni)/(rlno - rlni) < 1.2 \quad (14'').$$

It is preferred that in the first lens unit, the aforementioned convex lens surface be positioned closer to the image side than the reflecting surface.

By this arrangement, an adequate optical path length can be provided between the negative lens component and the convex lens surface, and the height of off-axis marginal rays in the first lens unit can be made lower. This, consequently, facilitates a reduction in the effective diameter, which is advantageous in slimming the zoom lens. Furthermore, the negative lens component and the convex lens surface can function as a kind of wide-conversion lens, which is advantageous in achieving an adequately wide angle of field.

In addition, it is preferred that the first lens unit include a positive lens component having the aforementioned convex lens surface disposed on the image side of the reflecting surface.

This is advantageous in reducing aberrations of the first lens unit by a plurality of refracting surfaces of the positive lens component.

Furthermore, it is more preferred that the positive lens component in the first lens unit satisfy the following condition:

$$-1.0 < (rlpo + rlpi)/(rlpo - rlpi) < 1.0 \quad (15)$$

where rlpo is the paraxial radius of curvature of the object side surface of the positive lens component in the first lens unit, and rlpi is the paraxial radius of curvature of the image side surface of the positive lens component in the first lens unit.

If a plurality of positive lens components are provided on the image side of the reflecting surface, it is preferred that the above condition be applied to the positive lens component that is located closest to the image side in the first lens unit, in which the ray height of on-axis principal rays is large.

Conditional expression (15) specifies preferred shapes of the positive lens component in the first lens unit.

If neither the lower limit nor the upper limit of conditional expression (15) is not exceeded, the absolute value of the curvature of either the object side surface or the image side surface of the positive lens component is prevented from becoming large. This facilitates correction of spherical aberration and coma.

To achieve the above-described advantageous effects, it is more preferred that the following condition be satisfied:

$$0.0 < (rlpo + rlpi)/(rlpo - rlpi) < 0.8 \quad (15'),$$

and it is still more preferred that the following condition be satisfied:

$$0.2 < (rlpo + rlpi)/(rlpo - rlpi) < 0.5 \quad (15'').$$

It is also preferred that the positive lens component in the first lens unit satisfy the following condition:

$$-20.0 < P1p/Pg1 < -0.5 \quad (16)$$

where P1p is the refracting power of the positive lens component in the first lens unit, and Pg1 is the refracting power of the first lens unit, the refracting power being the reciprocal of the focal length.

If a plurality of positive lens components are provided on the image side of the reflecting surface, it is preferred that the above condition be applied to the positive lens component that is located closest to the image side in the first lens unit, in which the ray height of on-axis principal rays is large.

Conditional expression (16) is a preferred condition for correcting aberrations generated by the negative lens component in the first lens unit.

It is preferred that the refracting power of the positive lens component relative to the negative refracting power of the first lens unit be made moderately small so that the lower limit of conditional expression (16) is not exceeded. This facilitates a reduction of spherical aberration and curvature of field generated by the positive lens component.

It is preferred that the positive lens component have an appropriate refracting power so that the upper limit of conditional expression (16) is not exceeded, to thereby appropriately correct on-axis chromatic aberration and spherical aberration generated by the negative lens component.

In order to reduce aberrations generated in the first lens unit, it is preferred that the following condition be satisfied:

$$-12.0 < P1p/Pg1 < 1.0 \quad (16'),$$

and it is still more preferred that the following condition be satisfied:

$$-8.0 < P1p/Pg1 < -3.0 \quad (16'').$$

It is also preferred that the positive lens component in the first lens unit satisfy the following condition:

$$-5.0 < P1p/Pg2 < -0.03 \quad (17)$$

where P1p is the refracting power of the positive lens component in the first lens unit, and Pg2 is the refracting power of the second lens unit, the refracting power being the reciprocal of the focal length.

If a plurality of positive lens components are provided on the image side of the reflecting surface, it is preferred that the above condition be applied to the positive lens component that is located closest to the image side in the first lens unit, in which the ray height of on-axis principal rays is large.

Conditional expression (17) specifies preferred values of the ratio of the refracting power of the positive lens component in the first lens unit and the refracting power of the second lens unit.

Making the positive refracting power of the first lens unit appropriately small and making the negative refracting power of the second lens unit appropriately large so that the lower limit of conditional expression (7) is not exceeded facilitates locating the entrance pupil closer to the object side. This is advantageous in reducing the size of the zoom lens and in ensuring sufficient supply of light in the peripheral region of the image.

Making the refracting power of the second lens unit appropriately small so that the lower limit of conditional expression (7) is not exceeded facilitates a reduction of coma and curvature of field at zoom positions near the telephoto end.

To achieve the above-described advantageous effects, it is more preferred that the following condition be satisfied:

$$-3.0<P1p/Pg2<-0.2 \qquad (17'),$$

and it is still more preferred that the following condition be satisfied:

$$-1.5<P1p/Pg2<-0.5 \qquad (17'').$$

It is also preferred that the first lens unit be composed, in order from the object side, of the negative lens component, a reflecting member having the aforementioned reflecting surface, and the positive lens component.

Thus, the first lens unit can be composed of three optical components. This is advantageous in reducing the size and in achieving good performance.

Furthermore, the positive lens component in the first lens unit satisfy the following condition:

$$0.03<D1p/fw<2.0 \qquad (11)$$

where D1p is the thickness, on the optical axis, of the positive lens component in the first lens unit, and fw is the focal length of the entire zoom lens system at the wide angle end.

Conditional expression (11) limits the thickness of the positive lens component in the first lens unit.

To facilitate aberration correction, it is preferred that the lower limit of conditional expression (11) is not exceeded so that the positive lens component has an adequate thickness on the optical axis and has an adequate positive refracting power.

If the upper limit of conditional expression (11) is not exceeded, a reduction in the optical path length and a reduction in the cost of parts are facilitated.

It is more preferred that the following condition be satisfied:

$$0.1<D1p/fw<1.0 \qquad (11'),$$

it is still more preferred that the following condition be satisfied:

$$0.15<D1p/fw<0.4 \qquad (11'').$$

Furthermore, it is preferred that the reflecting member be a reflecting prism having an object side refracting surface and an image side refracting surface.

This is advantageous in reducing the size of the zoom lens because the size of the reflecting surface can easily be made small when the reflecting surface is provided between the negative lens component and the positive lens component.

Still further, it is preferred that the reflecting prism in the first lens unit satisfy the following condition:

$$0.5<Dpr/fw<2.0 \qquad (13)$$

where Dpr is the optical path length along the optical axis from the object side refracting surface to the image side refracting surface of the reflecting prism, and fw is the focal length of the entire zoom lens system at the wide angle end.

Conditional expression (13) is a preferred condition for facilitating providing a prism that reflects rays.

It is preferred that the lower limit of conditional expression (13) is not exceeded. If the lower limit is not exceeded, an appropriate optical path length is provided in the prism, which facilitates manufacturing of the prism.

To achieve size reduction, it is preferred that the size of the prism be made so small that the upper limit of conditional expression (13) is not exceeded.

To achieve the above-described advantageous effects, it is more preferred that the following condition be satisfied:

$$0.7<Dpr/fw<1.5 \qquad (13'),$$

and it is still more preferred that the following condition be satisfied:

$$0.8<Dpr/fw<1.3 \qquad (13'').$$

It is also preferred that the distance, on the optical axis, between the negative lens component in the first lens unit and the reflecting prism satisfy the following condition:

$$0.03<D1npr/fw<1.0 \qquad (12)$$

where D1npr is the distance, on the optical axis, between the negative lens component in the first lens unit and the prism, and fw is the focal length of the entire zoom lens system at the wide angle end.

Conditional expression (12) specifies preferred values of the distance, on the optical axis, between the negative lens component in the first lens unit and the prism.

If an adequate distance is provided between the negative lens component and the prism so that the lower limit of conditional expression (12) is not exceeded, the image side surface of the negative lens component can have an adequate negative refracting power. This facilitates preventing curvature of field and distortion from becoming unduly large.

If the upper limit of conditional expression (12) is not exceeded, the entrance pupil can easily be located closer to the object side surface of the zoom lens. This is advantageous in making the first lens unit small.

It is more preferred that the following condition be satisfied:

$$0.07<D1npr/fw<0.6 \qquad (12'),$$

and it is still more preferred that the following condition be satisfied:

$$0.10<D1npr/fw<0.3 \qquad (12'')$$

It is also preferred that the negative lens component in the first lens unit be a single lens element, the positive lens component in the first lens unit be a single lens element, and the reflecting member in the first lens unit be a reflecting prism having a plurality of refracting surface. This is advantageous in reducing the cost and size.

It is also preferred that during zooming from the wide angle end to the telephoto end, the first lens unit be kept stationary, the second lens unit be moved, and the third lens unit be moved in such a way that it is located closer to the object side at the telephoto end than at the wide angle end.

This eliminates the need for a mechanism for driving the first lens unit, and therefore facilitates slimming of the zoom lens. In addition, this is advantageous in making the image pickup apparatus dust-proof and drip-proof because the number of driving portions can be made smaller.

Furthermore, the second lens unit having a negative refracting power can serve as a compensator, and the third lens unit having a positive refracting power can serve as a variator. This is advantageous in achieving an adequately high zoom ratio and in reducing the optical path length.

Furthermore, it is preferred that during zooming from the wide angle end to the telephoto end, the second lens unit move first toward the image side and thereafter reverse its moving direction to move toward the object side.

This is advantageous in reducing the optical path length after the reflecting surface while providing an adequate magnification change by the movement of the third lens unit.

It is also preferred that during zooming from the wide angle end to the telephoto end, the fourth lens unit move in such a way that the distance between the fourth lens unit and the third lens unit changes. This enables providing the fourth lens unit with the function of controlling aberrations and the position of the exit pupil during zooming.

It is also preferred that the distance between the third lens unit and the fourth lens unit be larger at the telephoto end than at the wide angle end. This makes the position at which on-axis marginal rays are incident on the fourth lens unit having a negative refracting power closer to the optical axis. This facilitates correction of the Petzval image surface.

It is also preferred that the fourth lens unit be located closer to the object side at the telephoto end than at the wide angle end. Having a negative refracting power, the fourth lens unit provides an increase in the magnification as it is displaced toward the object side at the telephoto end from its position at the wide angle end. This facilitates a reduction in the share of the magnification change that the third lens unit is required to have.

It is also preferred that any one of the lens units having a negative refracting power that is located closer to the image side than the reflecting surface be moved during the focusing operation from an object at a long distance toward an object at a short distance.

In the zoom lens according to the second aspect of the present invention, the second lens unit and the fourth lens unit may be designed to serve as focusing lens units.

By disposing the focusing lens units closer to the image side than the reflecting surface, the variation in the thickness of the zoom lens during focusing is eliminated, which facilitates slimming of the zoom lens.

It is also preferred that the fourth lens unit be moved toward the image side during the focusing operation from an object at a long distance toward an object at a short distance.

Moving the fourth lens unit for focusing is more preferred than moving the second lens unit, because a space for movement of the lens unit during focusing can more easily be provided.

It is more preferred that the zoom lens according to the second aspect of the present invention be a four unit zoom lens, and an aperture stop be provided between the image side surface of the second lens unit and the image side surface of the third lens unit.

The four unit zoom lens configuration is advantageous in achieving cost reduction while making the size of the zoom lens unit small with a limited number of lens units.

In this case, if an aperture stop, which determines the size of on-axis beams, is disposed between the image side surface of the second lens unit and the image side surface of the third lens unit, the size of each lens unit and the position of the exit pupil can easily be controlled favorably.

It is also preferred that the second lens unit be composed of two lens elements including a negative lens element and a positive lens element, the third lens unit be composed of two positive lens elements and one negative lens element, and the fourth lens unit be composed two or fewer lens elements.

This facilitates good aberration balance by reducing aberrations of the third lens unit in which the positive refracting power is concentrated and chromatic aberration of the second lens unit while making the number of lens elements smaller.

It is preferred that the zoom lens according to the second aspect of the present invention satisfy the following condition:

$$2.3 < ft/fw < 6 \qquad (18)$$

where fw is the focal length of the entire zoom lens system at the wide angle end, and ft is the focal length of the entire zoom lens system at the telephoto end.

It is preferred that the lower limit of conditional expression (18) is not exceeded so that the zoom lens has an adequate zoom ratio.

Limiting the zoom ratio of the zoom lens so that the upper limit of conditional expression (18) is not exceeded is advantageous in further facilitating a reduction in the size and cost and in maintaining good optical performance while preventing an increase in the number of lenses.

It is preferred that the zoom lens according to the present invention have a flare stop disposed in the optical path.

Having the flare stop in addition to the aperture stop enables elimination of unwanted light that may cause ghost images, lens flare or the like.

An image pickup apparatus according to the present invention is provided with a zoom lens according to any one of the above described modes and an image pickup element disposed on the image side thereof that converts an optical image formed by the zoom lens into an electrical signal.

Since the above described zoom lens according to the second aspect of the present invention is advantageous in achieving a size reduction, when used as an image pickup optical system of an image pickup element, it facilitates a reduction in the size and weight of the image pickup apparatus.

Examples of the image pickup apparatus may include a digital camera, a camera-equipped cellular phone, and a notebook computer equipped with camera for video communication etc.

It is also preferred that the above-described image pickup apparatus be provided with an image transformation section that transforms, by image processing, an electrical signal representing an image containing distortion attributed to the zoom lens into an image signal in which distortion is corrected.

In this case, distortion is allowed to be left in images formed by the zoom lens. This provides a further advantage in reducing the size of the zoom lens.

It is more preferred that the image pickup apparatus according to the present invention be provided with an image transformation section that transforms, by image processing, an electrical signal containing chromatic aberration of magnification attributed to the zoom lens into an image signal in which chromatic aberration of magnification is corrected.

In this case, chromatic aberration of magnification is allowed to be left in images formed by the zoom lens. This provides an advantage, for example, in reducing the cost of the lens material and in reducing the number of lenses.

It is more preferred two or more of the above described features be adopted at the same time.

In the case where the zoom lens has the focusing function, the conditional expressions presented above are for the state in which the zoom lens is focused on an object at the farthest distance.

Embodiments

In the following, embodiments of the zoom lens and the image pickup apparatus according to the present invention will be described in detail with reference to the drawings. It should be understood, however, that the present invention is not limited by the embodiments.

In the following, first to seventeenth embodiments of the zoom lens according to the present invention will be described. FIGS. 1A, 1B, and 1C to 17A, 17B, and 17C are cross sectional views of the zoom lenses according to the first to the seventeenth embodiments respectively at the wide angle end (FIGS. 1A to 17A), in an intermediate focal length state (FIGS. 1B to 17B) and at the telephoto end (FIGS. 1C to 17C) in the state in which the zoom lenses are focused on an object point at infinity. In FIGS. 1A through 17C, a first lens unit is denoted by G1, a second lens unit is denoted by G2, an aperture stop is denoted by S, a third lens unit is denoted by G3, a fourth lens unit is denoted by G4, a plane parallel plate having wavelength range restriction coating applied thereon that blocks or reduces infrared light to constitute a low pass filter is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have the function of a low pass filter.

In each embodiment, the aperture stop S moves integrally with the third lens unit G3. All the numerical data presented below are for the state in which the zoom lens is focused on an object at infinity. In the numerical data, dimensions are in mm (millimeters) and angles are in degrees. In all the embodiments, focusing is performed by moving the lens unit located closest to the image side. In other words, the focusing operation from an object at a long distance toward an object at a short distance is performed by moving the fourth lens unit toward the image side. Zoom data will be presented for the wide angle end (WE), the intermediate focal length state (ST) and the telephoto end (TE).

Figure 1B:
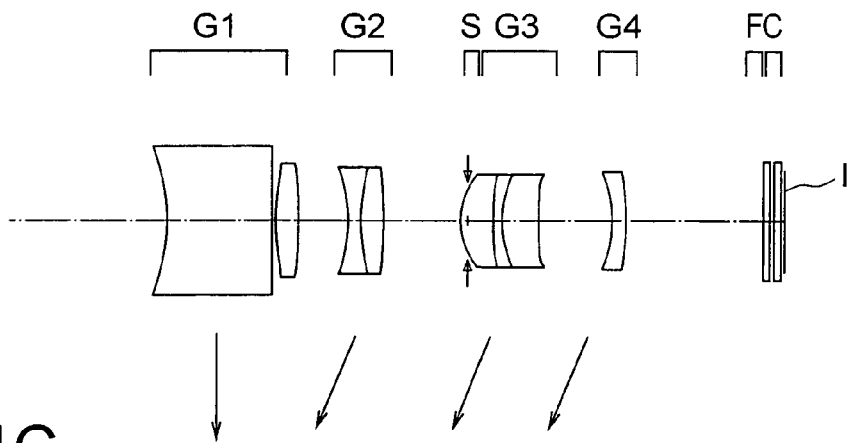
Figure 1C:
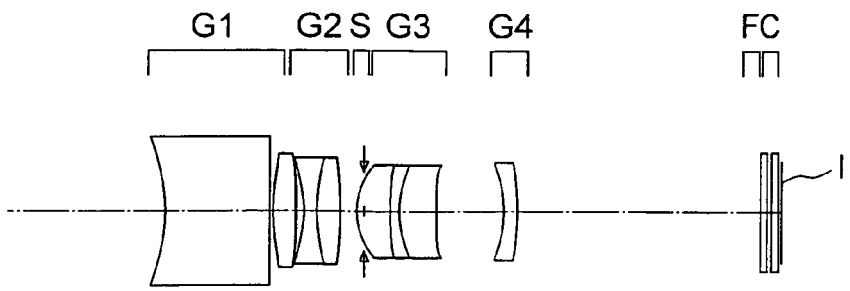

As shown in FIGS. 1A, 1B, and 1C, the zoom lens according to the first embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves toward the object side.

The first lens unit G1 is composed of an optical path deflecting prism having a concave surface directed toward the object side and a biconvex positive lens. The second lens unit G2 is composed of a cemented lens made up of a biconcave negative lens and a biconvex positive lens. The third lens unit G3 is composed of a cemented lens made up of a positive meniscus lens having a convex surface directed toward the object side, a negative meniscus lens having a convex surface directed toward the object side, and a biconvex positive lens. The fourth lens unit G4 is composed of a negative meniscus lens having a concave surface directed toward the object side. All the lens elements in each lens unit G1, G2, G3, G4 are arranged in the mentioned order from the object side.

The following seven surfaces are aspheric surfaces: the object side surface of the optical path deflecting prism in the first lens unit G1, both surfaces of the biconvex positive lens in the first lens unit G1, the image side surface of the biconvex positive lens in the second lens unit G2, the object side surface of the positive meniscus lens having a convex surface directed toward the object side in the third lens unit G3, the image side surface of the biconvex positive lens in the third lens unit G3, and the object side surface of the negative meniscus lens having a concave surface directed toward the object side in the fourth lens unit G4.

Figure 2A:
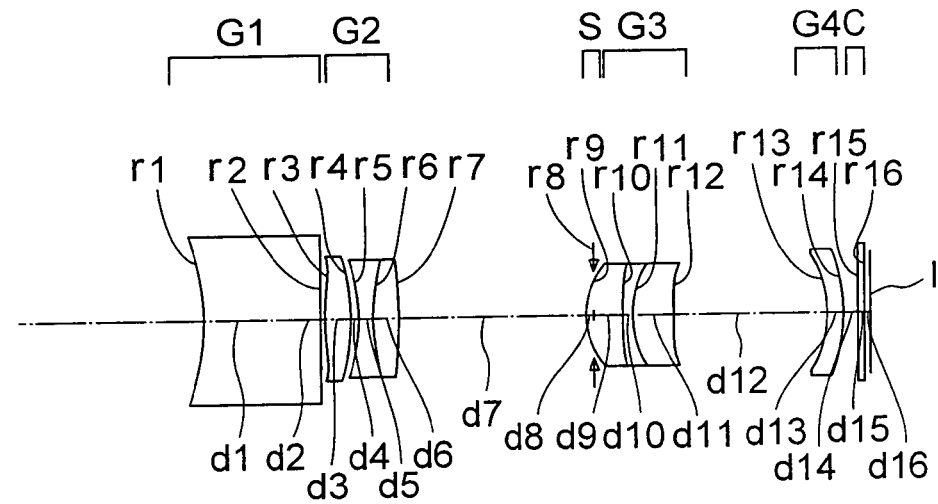
FIGS. 2A, 2B, and 2C are cross sectional views similar to FIGS. 1A, 1B, and 1C, showing a zoom lens according to a second embodiment of the present invention.
Figure 2B:
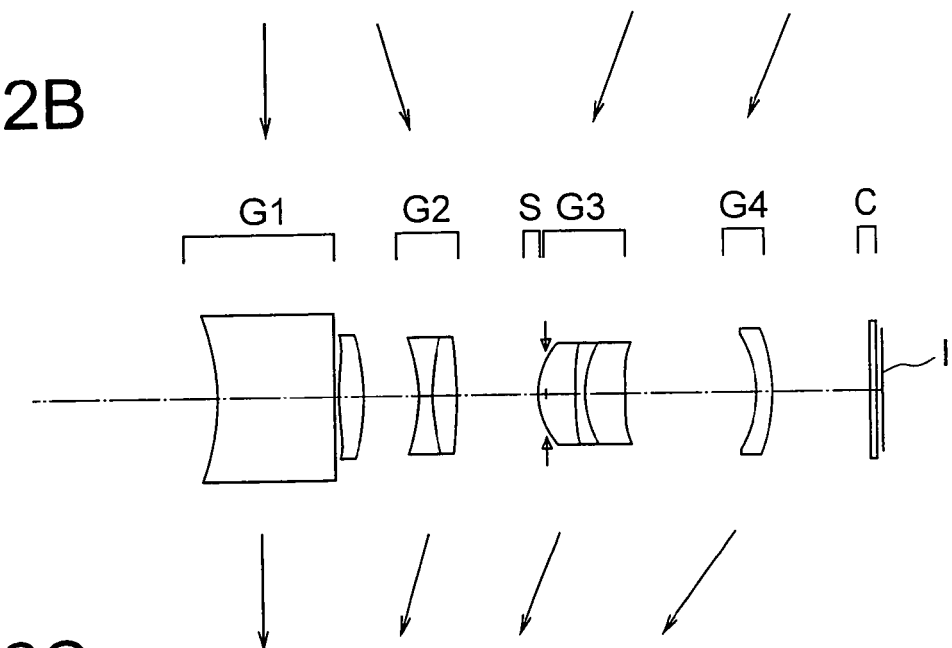
Figure 2C:
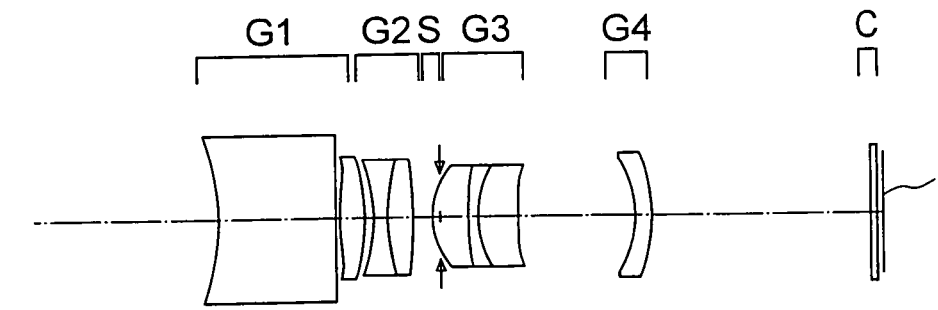

As shown in FIGS. 2A, 2B, and 2C, the zoom lens according to the second embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves toward the object side.

The first lens unit G1 is composed of an optical path deflecting prism having a concave surface directed toward the object side and a biconvex positive lens. The second lens unit G2 is composed of a cemented lens made up of a biconcave negative lens and a biconvex positive lens. The third lens unit G3 is composed of a cemented lens made up of a positive meniscus lens having a convex surface directed toward the object side, a negative meniscus lens having a convex surface directed toward the object side, and a biconvex positive lens. The fourth lens unit G4 is composed of a negative meniscus lens having a concave surface directed toward the object side. All the lens elements in each lens unit G1, G2, G3, G4 are arranged in the mentioned order from the object side.

The following seven surfaces are aspheric surfaces: the object side surface of the optical path deflecting prism in the first lens unit G1, both surfaces of the biconvex positive lens in the first lens unit G1, the image side surface of the biconvex positive lens in the second lens unit G2, the object side surface of the positive meniscus lens having a convex surface directed toward the object side in the third lens unit G3, the image side surface of the biconvex positive lens in the third lens unit G3, and the object side surface of the negative meniscus lens having a concave surface directed toward the object side in the fourth lens unit G4.

Figure 3A:
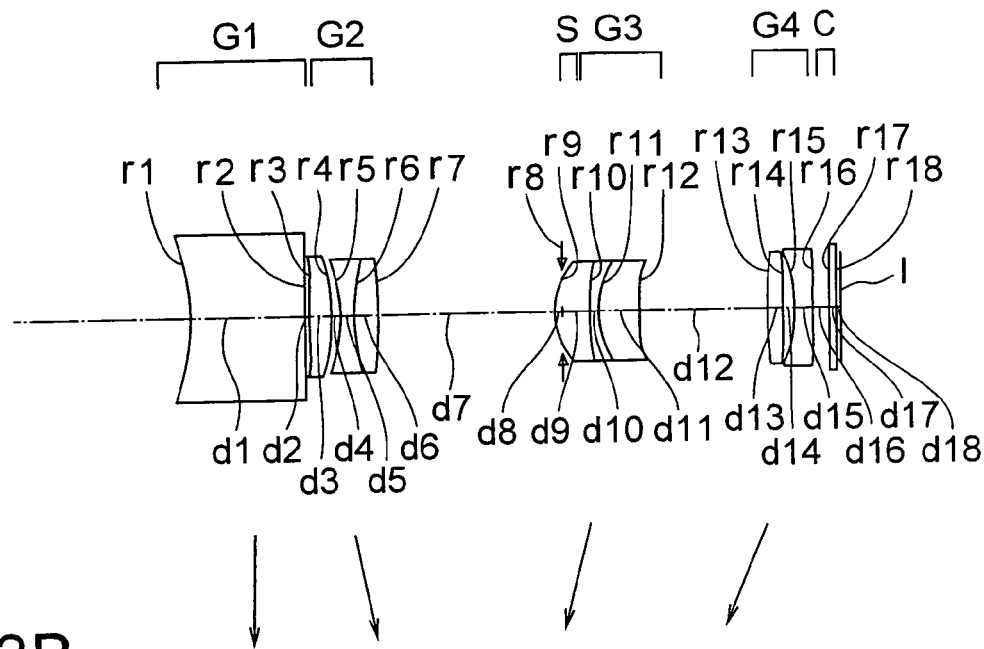
FIGS. 3A, 3B, and 3C are cross sectional views similar to FIGS. 1A, 1B, and 1C, showing a zoom lens according to a third embodiment of the present invention.
Figure 3B:
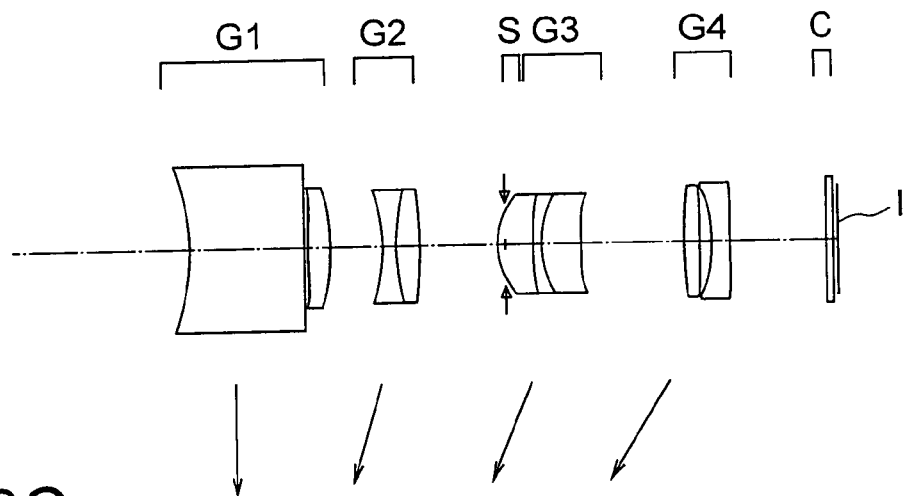
Figure 3C:
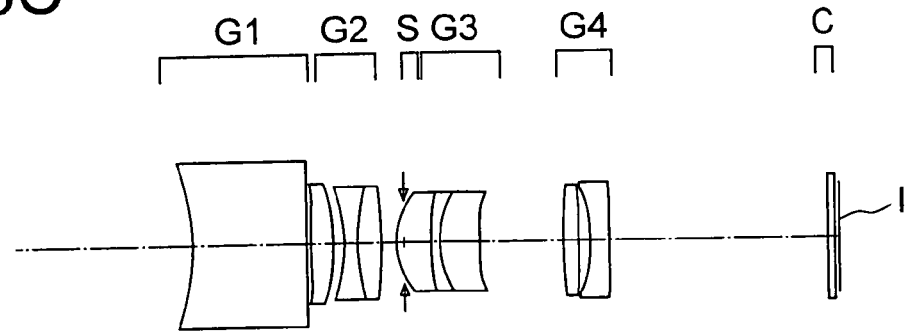

As shown in FIGS. 3A, 3B, and 3C, the zoom lens according to the third embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves toward the object side.

The first lens unit G1 is composed of an optical path deflecting prism having a concave surface directed toward the object side and a biconvex positive lens. The second lens unit G2 is composed of a cemented lens made up of a biconcave negative lens and a biconvex positive lens. The third lens unit G3 is composed of a cemented lens made up of a positive meniscus lens having a convex surface directed toward the object side, a negative meniscus lens having a convex surface directed toward the object side, and a biconvex positive lens. The fourth lens unit G4 is composed of a biconvex positive lens and a negative meniscus lens having a concave surface directed toward the object side. All the lens elements in each lens unit G1, G2, G3, G4 are arranged in the mentioned order from the object side.

The following seven surfaces are aspheric surfaces: the object side surface of the optical path deflecting prism in the first lens unit G1, both surfaces of the biconvex positive lens in the first lens unit G1, the image side surface of the biconvex positive lens in the second lens unit G2, the object side surface of the positive meniscus lens having a convex surface directed toward the object side in the third lens unit G3, the image side surface of the biconvex positive lens in the third lens unit G3, and the object side surface of the negative meniscus lens having a concave surface directed toward the object side in the fourth lens unit G4.

Figure 4A:
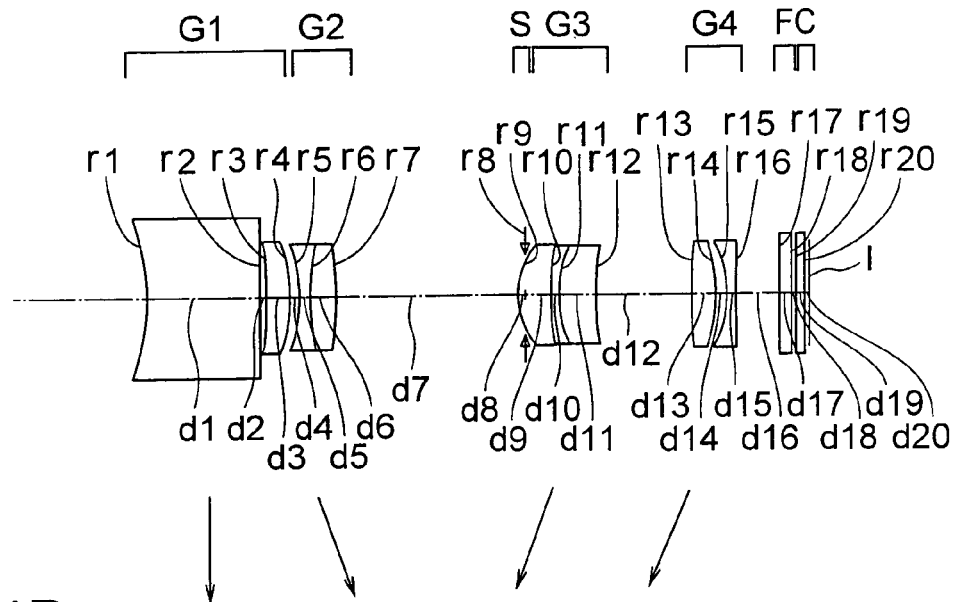
FIGS. 4A, 4B, and 4C are cross sectional views similar to FIGS. 1A, 1B, and 1C, showing a zoom lens according to a fourth embodiment of the present invention.
Figure 4B:
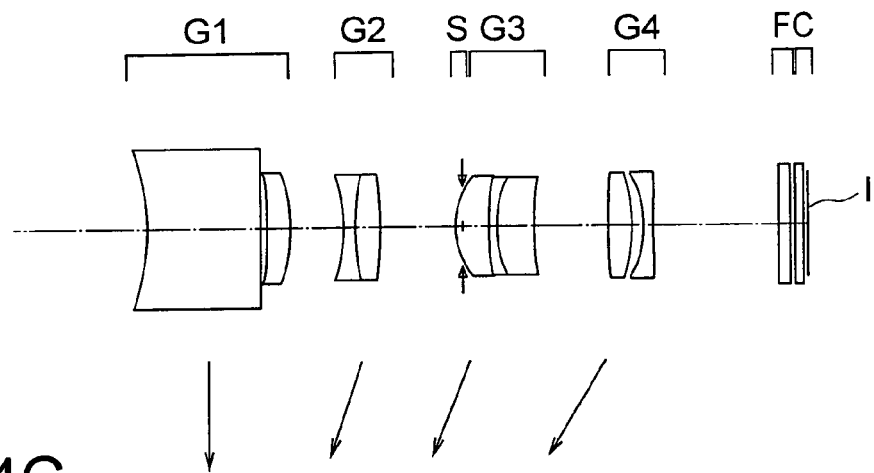
Figure 4C:
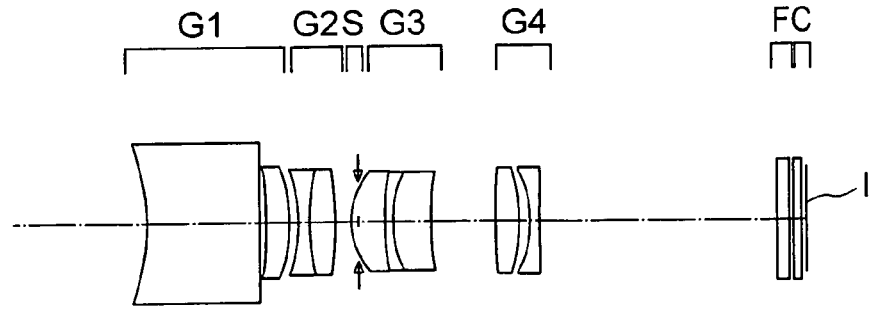

As shown in FIGS. 4A, 4B, and 4C, the zoom lens according to the fourth embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves toward the object side.

The first lens unit G1 is composed of an optical path deflecting prism having a concave surface directed toward the object side and a biconvex positive lens. The second lens unit G2 is composed of a cemented lens made up of a biconcave negative lens and a biconvex positive lens. The third lens unit G3 is composed of a cemented lens made up of a positive meniscus lens having a convex surface directed toward the object side, a negative meniscus lens having a convex surface directed toward the object side, and a biconvex positive lens. The fourth lens unit G4 is composed of a biconvex positive lens and a biconcave negative lens. All the lens elements in each lens unit G1, G2, G3, G4 are arranged in the mentioned order from the object side.

The following seven surfaces are aspheric surfaces: the object side surface of the optical path deflecting prism in the first lens unit G1, both surfaces of the biconvex positive lens in the first lens unit G1, the image side surface of the biconvex positive lens in the second lens unit G2, the object side surface of the positive meniscus lens having a convex surface directed toward the object side in the third lens unit G3, the image side surface of the biconvex positive lens in the third lens unit G3, and the object side surface of the biconcave negative lens in the fourth lens unit G4.

Figure 5A:
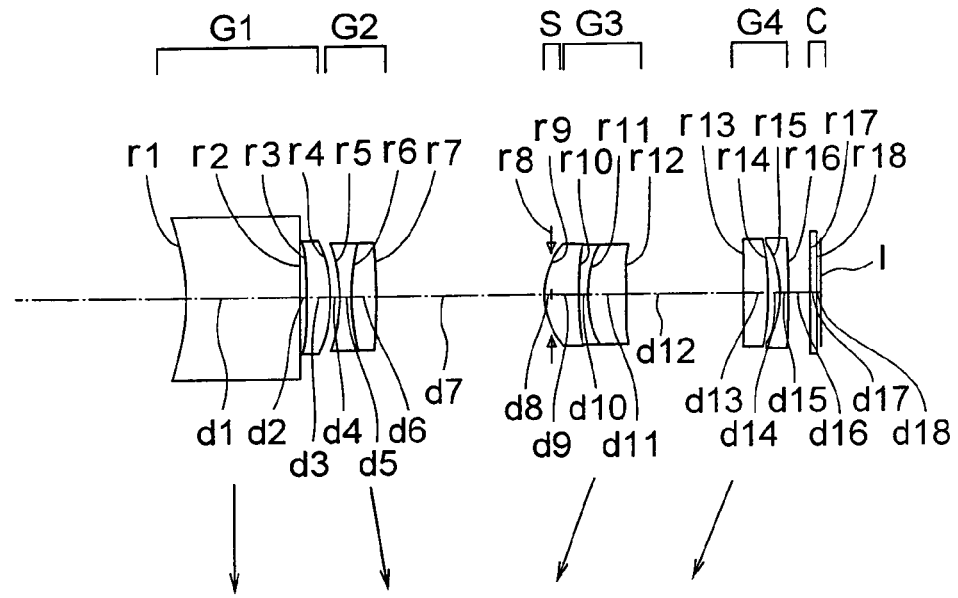
FIGS. 5A, 5B, and 5C are cross sectional views similar to FIGS. 1A, 1B, and 1C, showing a zoom lens according to a fifth embodiment of the present invention.
Figure 5B:
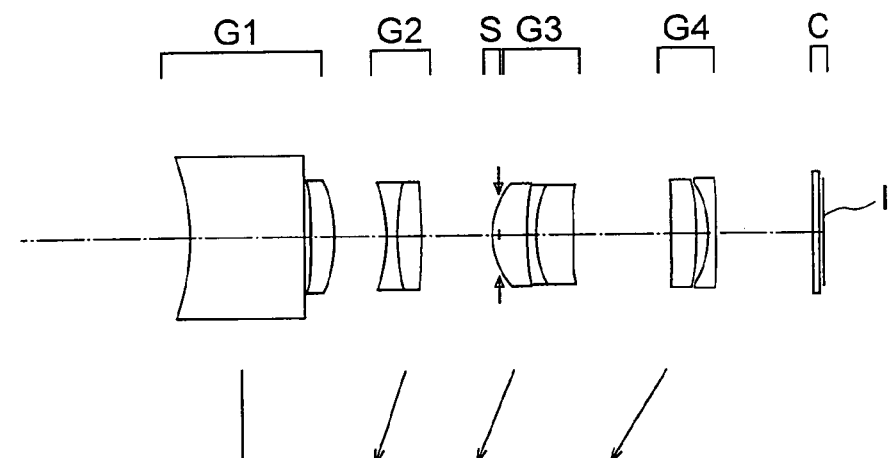
Figure 5C:
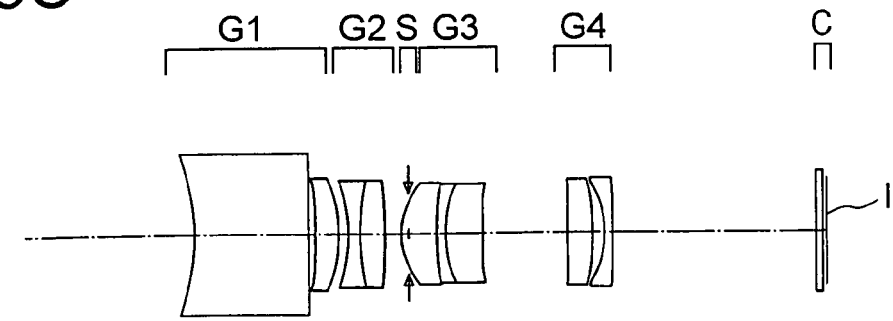

As shown in FIGS. 5A, 5B, and 5C, the zoom lens according to the fifth embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves toward the object side.

The first lens unit G1 is composed of an optical path deflecting prism having a concave surface directed toward the object side and a positive meniscus lens having a concave surface directed toward the object side. The second lens unit G2 is composed of a cemented lens made up of a biconcave negative lens and a biconvex positive lens. The third lens unit G3 is composed of a cemented lens made up of a positive meniscus lens having a convex surface directed toward the object side, a negative meniscus lens having a convex surface directed toward the object side, and a biconvex positive lens. The fourth lens unit G4 is composed of a positive meniscus lens having a concave surface directed toward the object side and a negative meniscus lens having a concave surface directed toward the object side. All the lens elements in each lens unit G1, G2, G3, G4 are arranged in the mentioned order from the object side.

The following seven surfaces are aspheric surfaces: the object side surface of the optical path deflecting prism in the first lens unit G1, the object side surface of the positive meniscus lens having a concave surface directed toward the object side in the first lens unit G1, the image side surface of the biconcave negative lens in the second lens unit G2, the image side surface of the biconvex positive lens in the second lens unit G2, the object side surface of the positive meniscus lens having a convex surface directed toward the object side in the third lens unit G3, the image side surface of the biconvex positive lens in the third lens unit G3, and the object side surface of the negative meniscus lens having a concave surface directed toward the object side in the fourth lens unit G4.

Figure 6A:
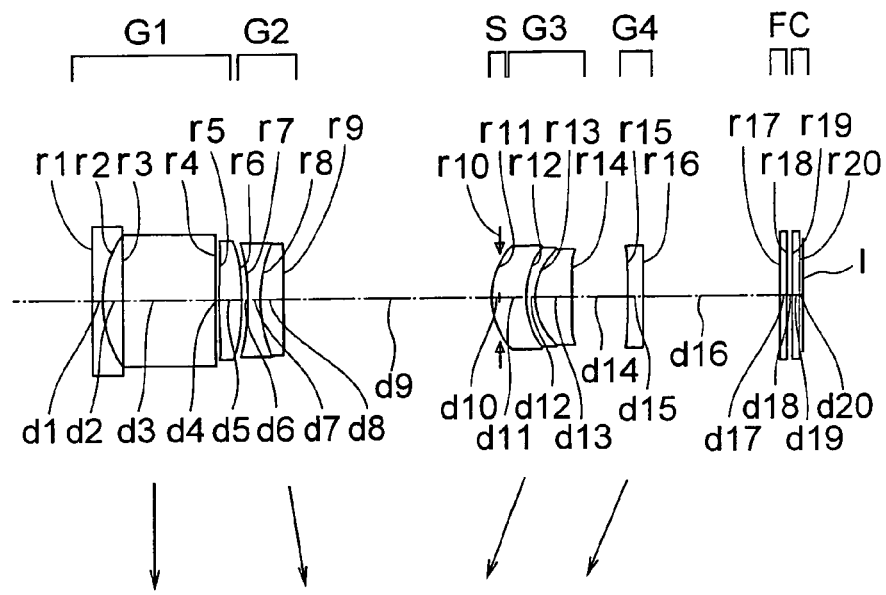
FIGS. 6A, 6B, and 6C are cross sectional views similar to FIGS. 1A, 1B, and 1C, showing a zoom lens according to a sixth embodiment of the present invention.
Figure 6B:
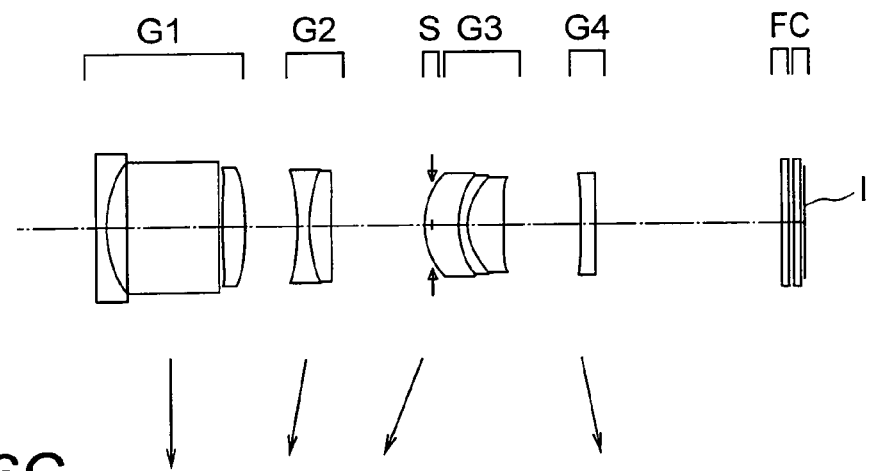
Figure 6C:
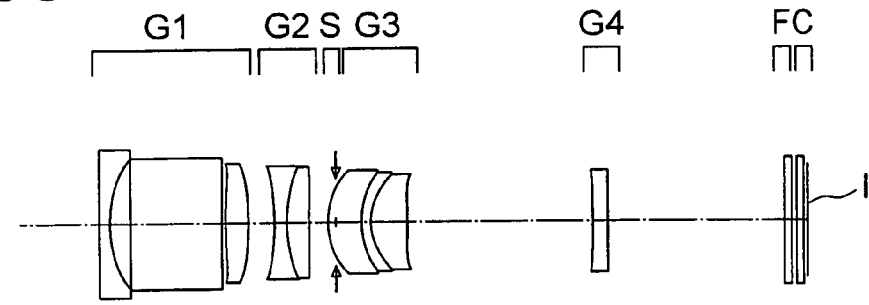

As shown in FIGS. 6A, 6B, and 6C, the zoom lens according to the sixth embodiment includes, in order from the object side, a first lens unit G1 having a negative refracting power, a second lens unit G2 having a negative refracting power, an aperture stop S; a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves first toward the object side and thereafter toward the image side.

The first lens unit G1 is composed of a plano-concave negative lens having a concave surface directed toward the image side, a prism, and a biconvex positive lens. The second lens unit G2 is composed of a cemented lens made up of a biconcave negative lens and a biconvex positive lens. The third lens unit G3 is composed of a cemented lens made up of a positive meniscus lens having a convex surface directed toward the object side, a negative meniscus lens having a convex surface directed toward the object side, and a biconvex positive lens. The fourth lens unit G4 is composed of a negative meniscus lens having a concave surface directed toward the object side. All the lens elements in each lens unit G1, G2, G3, G4 are arranged in the mentioned order from the object side.

The following seven surfaces are aspheric surfaces: the image side surface of the plano-concave negative lens having a concave surface directed toward the image side in the first lens unit G1, both surfaces of the biconvex positive lens in the first lens unit G1, the image side surface of the biconvex positive lens in the second lens unit G2, the object side surface of the positive meniscus lens having a convex surface directed toward the object side in the third lens unit G3, the image side surface of the biconvex positive lens in the third lens unit G3, and the object side surface of the negative meniscus lens having a concave surface directed toward the object side in the fourth lens unit G4.

Figure 7A:
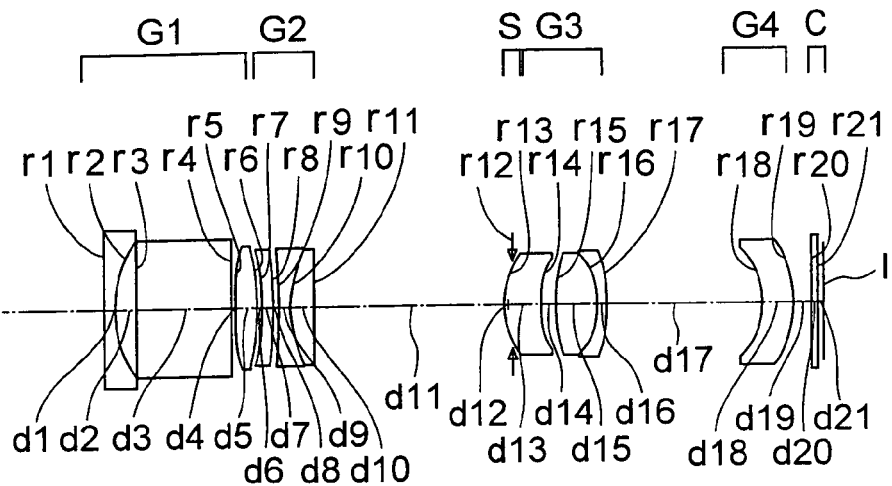
FIGS. 7A, 7B, and 7C are cross sectional views similar to FIGS. 1A, 1B, and 1C, showing a zoom lens according to a seventh embodiment of the present invention.
Figure 7B:
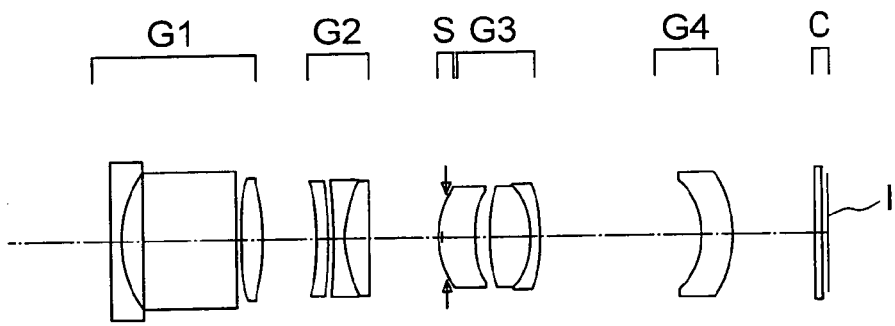
Figure 7C:
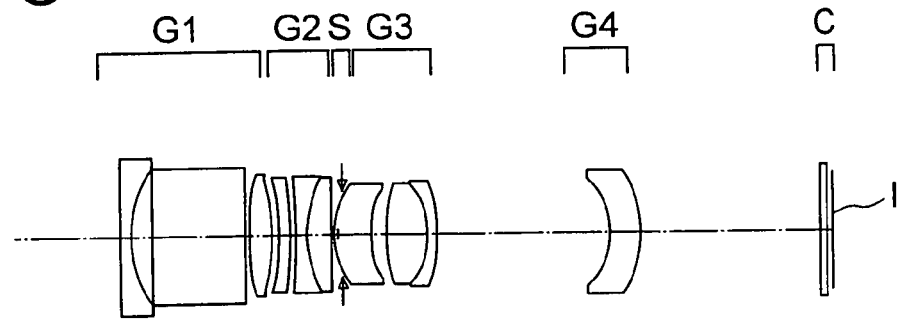

As shown in FIGS. 7A, 7B, and 7C, the zoom lens according to the seventh embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves toward the object side.

The first lens unit G1 is composed of a plano-concave negative lens having a concave surface directed toward the image side, a prism, and a biconvex positive lens. The second lens unit G2 is composed of a negative meniscus lens having a convex surface directed toward the image side and a cemented lens made up of a biconcave negative lens and a positive meniscus lens having a convex surface directed toward the object side. The third lens unit G3 is composed of a positive meniscus lens having a convex surface directed toward the object side and a cemented lens made up of a biconvex positive lens and a negative meniscus lens having a convex surface directed toward the image side. The fourth lens unit G4 is composed of a negative meniscus lens having a convex surface directed toward the image side. All the lens elements in each lens unit G1, G2, G3, G4 are arranged in the mentioned order from the object side.

The following seven surfaces are aspheric surfaces: the image side surface of the plano-concave negative lens having a concave surface directed toward the image side in the first lens unit G1, both surfaces of the biconvex positive lens in the first lens unit G1, the image side surface of the positive meniscus lens having a convex surface directed toward the object side in the second lens unit G2, both surfaces of the positive meniscus lens having a convex surface directed toward the object side in the third lens unit G3, and the object side surface of the negative meniscus lens having a convex surface directed toward the image side in the fourth lens unit G4.

Figure 8A:
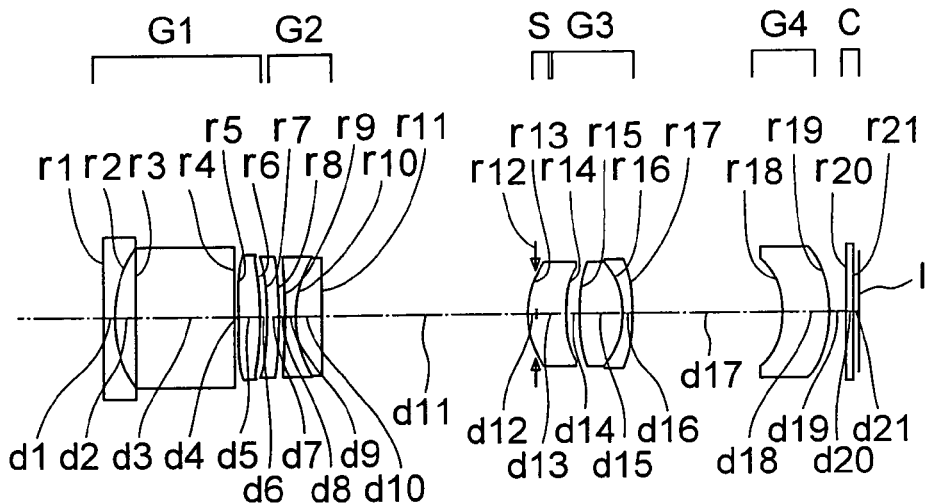
FIGS. 8A, 8B, and 8C are cross sectional views similar to FIGS. 1A, 1B, and 1C, showing a zoom lens according to a eighth embodiment of the present invention.
Figure 8B:
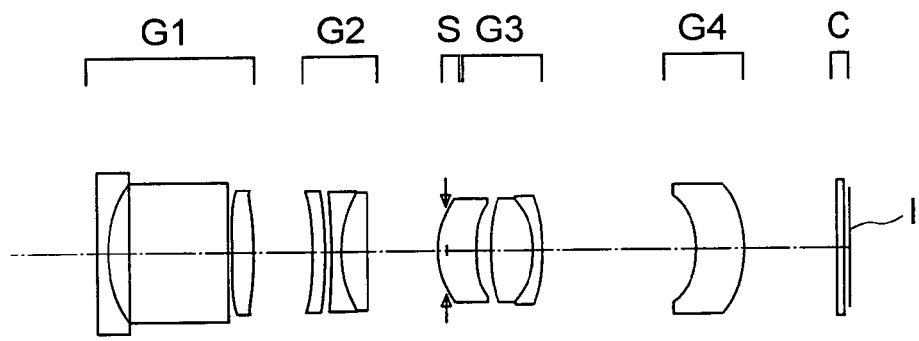
Figure 8C:
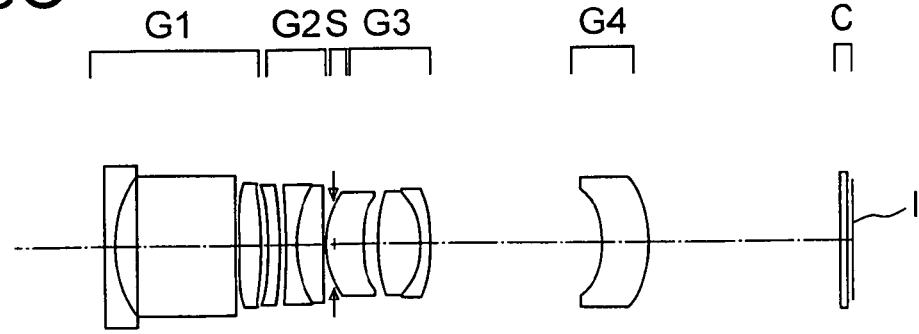

As shown in FIGS. 8A, 8B, and 8C, the zoom lens according to the eighth embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves toward the object side.

The first lens unit G1 is composed of a plano-concave negative lens having a concave surface directed toward the image side, a prism, and a biconvex positive lens. The second lens unit G2 is composed of a negative meniscus lens having a convex surface directed toward the image side and a cemented lens made up of a biconcave negative lens and a positive meniscus lens having a convex surface directed toward the object side. The third lens unit G3 is composed of a positive meniscus lens having a convex surface directed toward the object side and a cemented lens made up of a biconvex positive lens and a negative meniscus lens having a convex surface directed toward the image side. The fourth lens unit G4 is composed of a negative meniscus lens having a convex surface directed toward the image side. All the lens elements in each lens unit G1, G2, G3, G4 are arranged in the mentioned order from the object side.

The following seven surfaces are aspheric surfaces: the image side surface of the plano-concave negative lens having a concave surface directed toward the image side in the first lens unit G1, both surfaces of the biconvex positive lens in the first lens unit G1, the image side surface of the positive meniscus lens having a convex surface directed toward the object side in the second lens unit G2, both surfaces of the positive meniscus lens having a convex surface directed toward the object side in the third lens unit G3, and the object side surface of the negative meniscus lens having a convex surface directed toward the image side in the fourth lens unit G4.

Figure 9A:
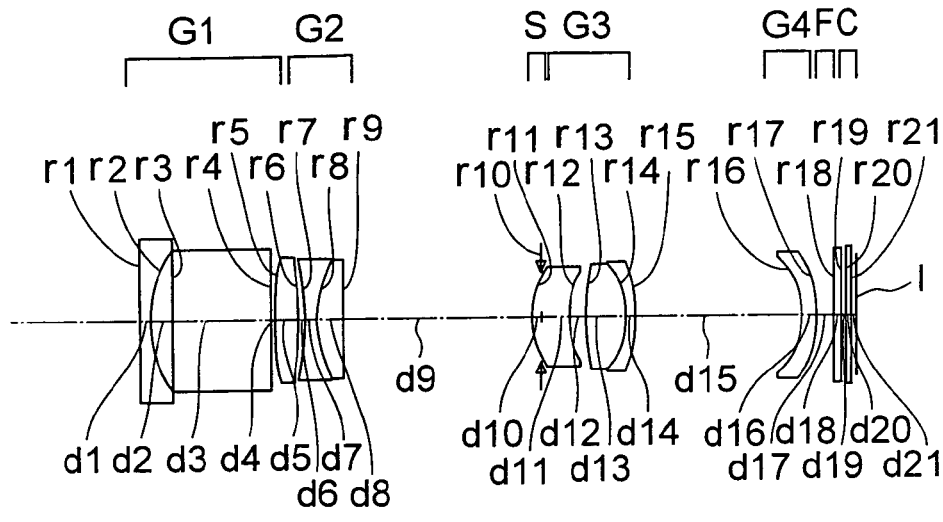
FIGS. 9A, 9B, and 9C are cross sectional views similar to FIGS. 1A, 1B, and 1C, showing a zoom lens according to a ninth embodiment of the present invention.
Figure 9B:
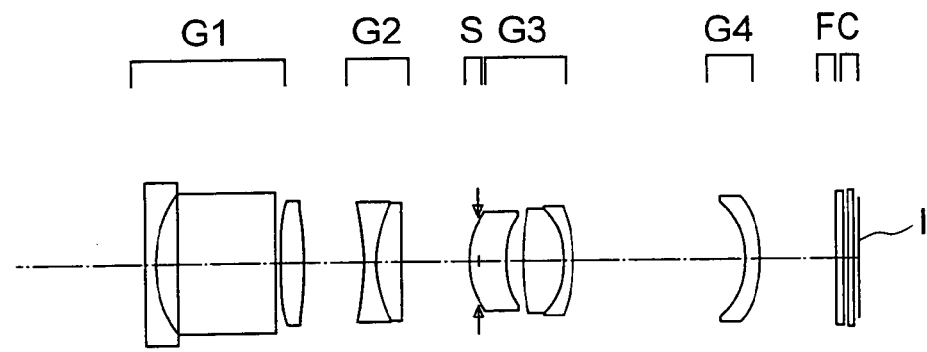
Figure 9C:
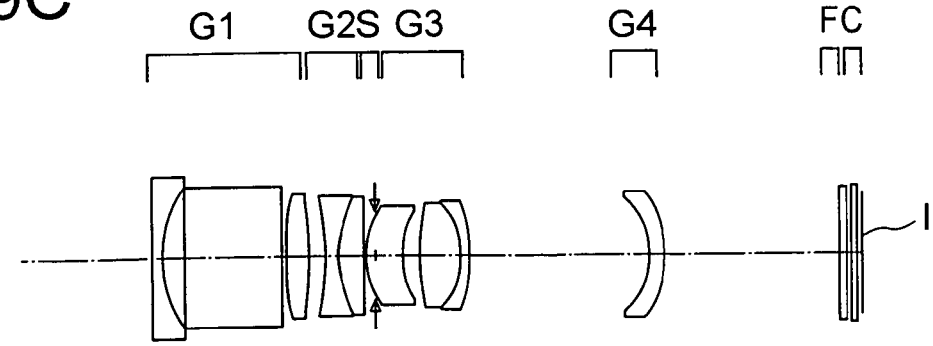

As shown in FIGS. 9A, 9B, and 9C, the zoom lens according to the ninth embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves toward the object side.

The first lens unit G1 is composed of a plano-concave negative lens having a concave surface directed toward the image side, a prism, and a biconvex positive lens. The second lens unit G2 is composed of a cemented lens made up of a biconcave negative lens and a biconvex positive lens. The third lens unit G3 is composed of a positive meniscus lens having a convex surface directed toward the object side and a cemented lens made up of a biconvex positive lens and a negative meniscus lens having a convex surface directed toward the image side. The fourth lens unit G4 is composed of a negative meniscus lens having a convex surface directed toward the image side. All the lens elements in each lens unit G1, G2, G3, G4 are arranged in the mentioned order from the object side.

The following seven surfaces are aspheric surfaces: the image side surface of the plano-concave negative lens having a concave surface directed toward the image side in the first lens unit G1, both surfaces of the biconvex positive lens in the first lens unit G1, the image side surface of the biconvex positive lens in the second lens unit G2, both surfaces of the positive meniscus lens having a convex surface directed toward the object side in the third lens unit G3, and the object side surface of the negative meniscus lens having a convex surface directed toward the image side in the fourth lens unit G4.

Figure 10A:
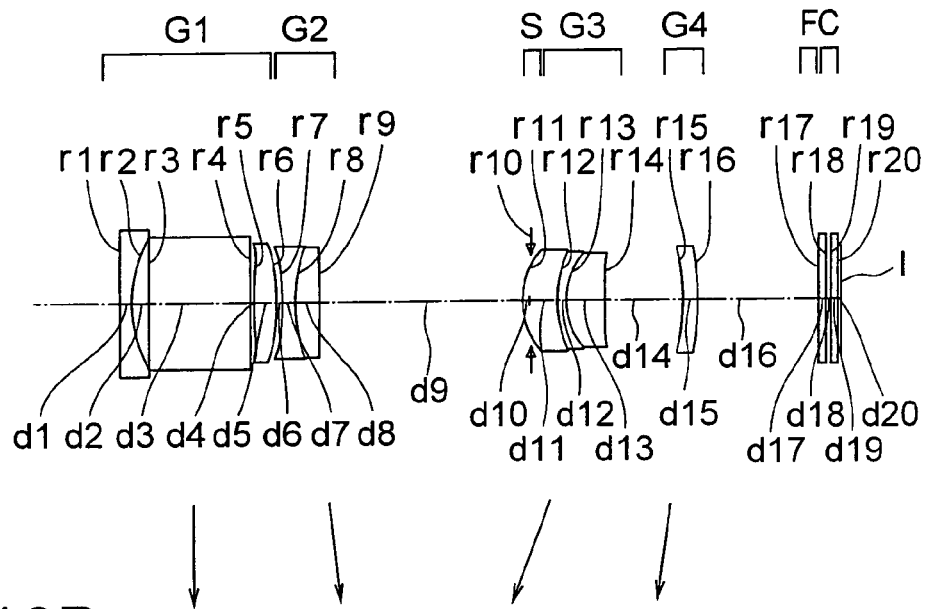
FIGS. 10A, 10B, and 10C are cross sectional views similar to FIGS. 1A, 1B, and 1C, showing a zoom lens according to a tenth embodiment of the present invention.
Figure 10B:
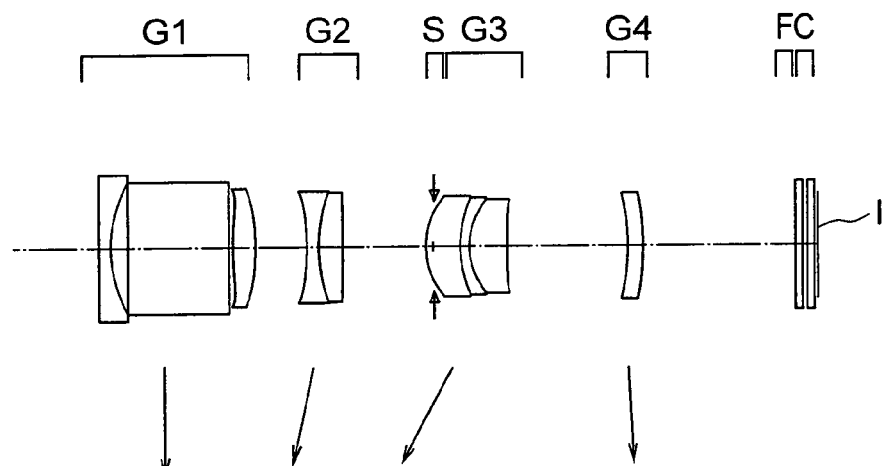
Figure 10C:
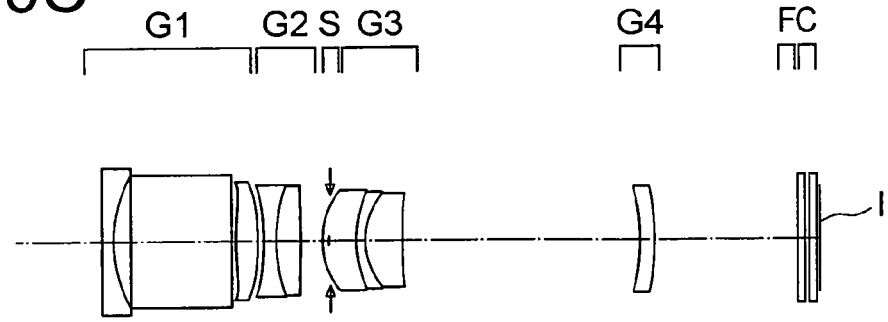

As shown in FIGS. 10A, 10B, and 10C, the zoom lens according to the tenth embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves along a locus that is convex toward the object side.

The first lens unit G1 is composed of a plano-concave negative lens, an optical path deflecting prism having planar surfaces on both sides, and a biconvex positive lens. The second lens unit G2 is composed of a cemented lens made up of a biconcave negative lens and a biconvex positive lens. The third lens unit G3 is composed of a cemented lens made up of a positive meniscus lens having a convex surface directed toward the object side, a negative meniscus lens having a convex surface directed toward the object side, and a biconvex positive lens. The fourth lens unit G4 is composed of a negative meniscus lens having a concave surface directed toward the object side. All the lens elements in each lens unit G1, G2, G3, G4 are arranged in the mentioned order from the object side.

The following six surfaces are aspheric surfaces: both surfaces of the biconvex positive lens in the first lens unit G1, the image side surface of the biconvex positive lens in the second lens unit G2, the object side surface of the positive meniscus lens having a convex surface directed toward the object side in the third lens unit G3, the image side surface of the biconvex positive lens in the third lens unit G3, and the object side surface of the negative meniscus lens having a concave surface directed toward the object side in the fourth lens unit G4.

Figure 11A:
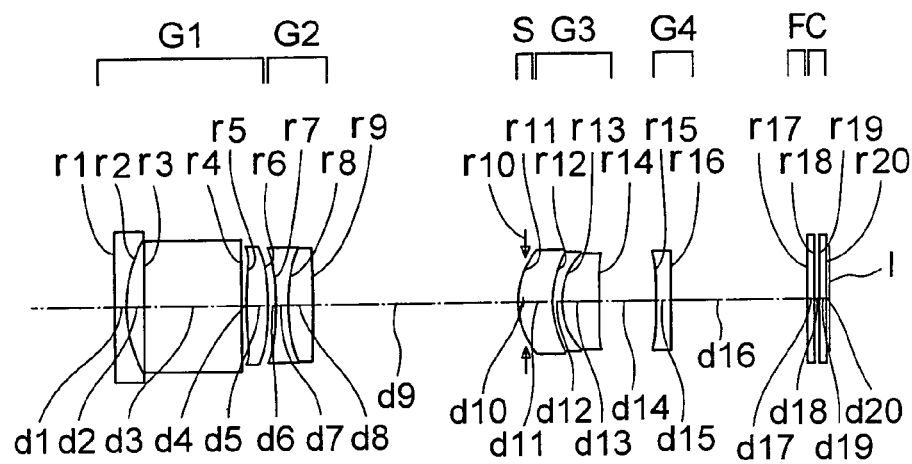
FIGS. 11A, 11B, and 11C are cross sectional views similar to FIGS. 1A, 1B, and 1C, showing a zoom lens according to an eleventh embodiment of the present invention.
Figure 11B:
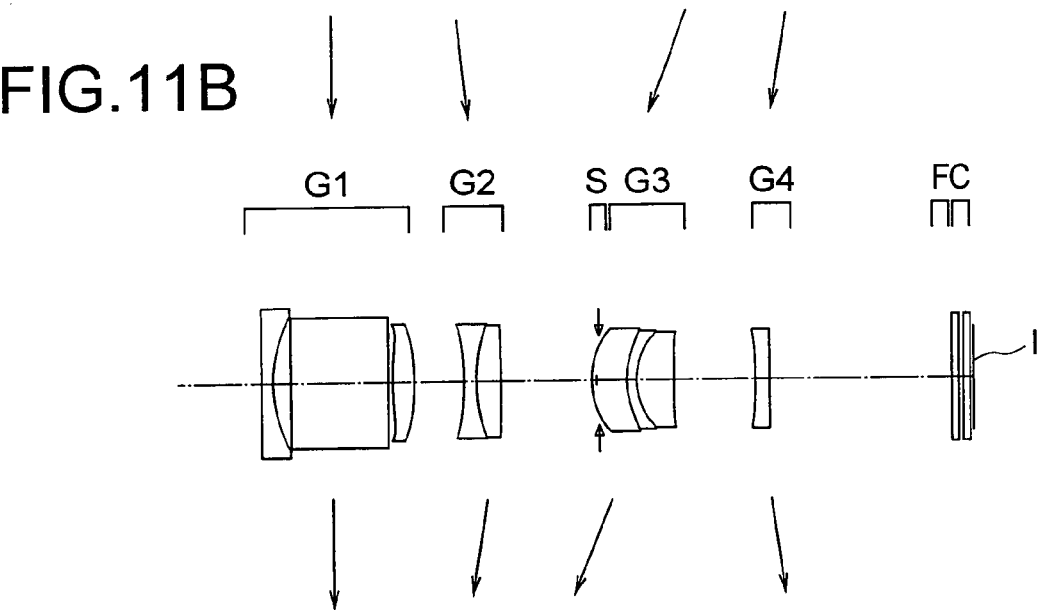
Figure 11C:
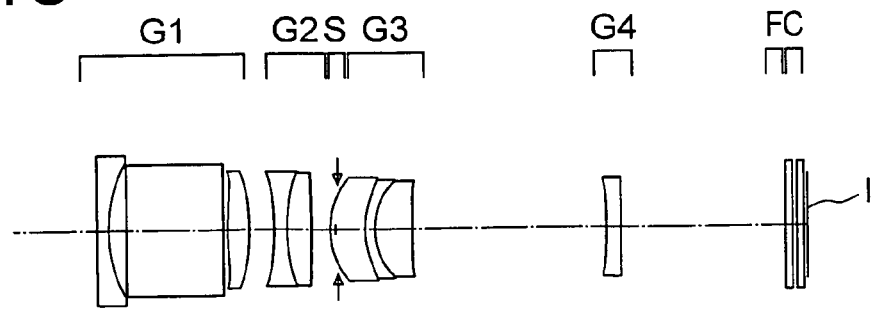

As shown in FIGS. 11A, 11B, and 11C, the zoom lens according to the eleventh embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves along a locus that is convex toward the object side.

The first lens unit G1 is composed of a plano-concave negative lens, an optical path deflecting prism having planar surfaces on both sides, and a biconvex positive lens. The second lens unit G2 is composed of a cemented lens made up of a biconcave negative lens and a biconvex positive lens. The third lens unit G3 is composed of a cemented lens made up of a positive meniscus lens having a convex surface directed toward the object side, a negative meniscus lens having a convex surface directed toward the object side, and a biconvex positive lens. The fourth lens unit G4 is composed of a negative meniscus lens having a concave surface directed toward the object side. All the lens elements in each lens unit G1, G2, G3, G4 are arranged in the mentioned order from the object side.

The following six surfaces are aspheric surfaces: both surfaces of the biconvex positive lens in the first lens unit G1, the image side surface of the biconvex positive lens in the second lens unit G2, the object side surface of the positive meniscus lens having a convex surface directed toward the object side in the third lens unit G3, the image side surface of the biconvex positive lens in the third lens unit G3, and the object side surface of the negative meniscus lens having a concave surface directed toward the object side in the fourth lens unit G4.

Figure 12A:
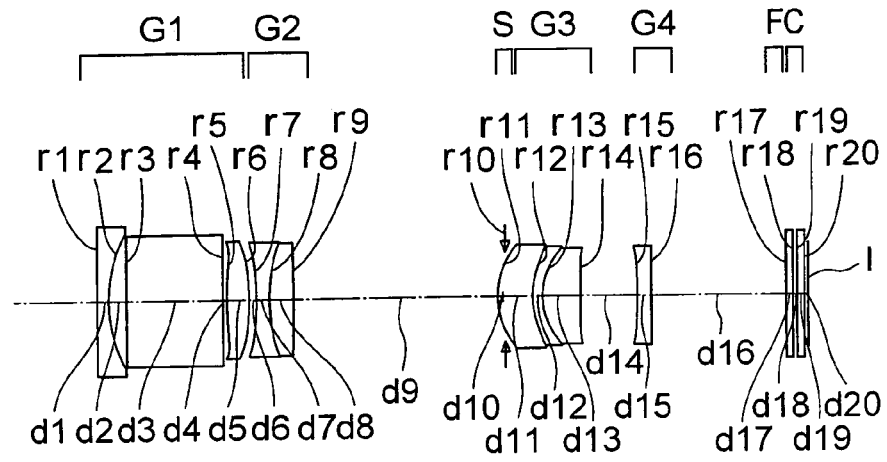
FIGS. 12A, 12B, and 12C are cross sectional views similar to FIGS. 1A, 1B, and 1C, showing a zoom lens according to a twelfth embodiment of the present invention.
Figure 12B:
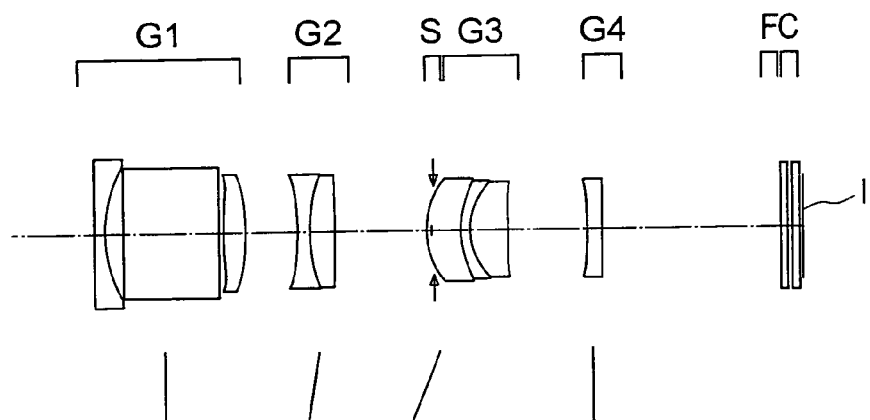
Figure 12C:
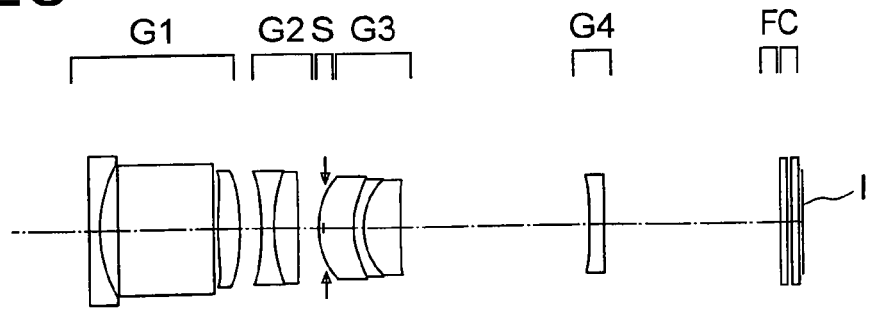

As shown in FIGS. 12A, 12B, and 12C, the zoom lens according to the twelfth embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves along a locus that is convex toward the object side.

The first lens unit G1 is composed of a plano-concave negative lens, an optical path deflecting prism having planar surfaces on both sides, and a biconvex positive lens. The second lens unit G2 is composed of a cemented lens made up of a biconcave negative lens and a biconvex positive lens. The third lens unit G3 is composed of a cemented lens made up of a positive meniscus lens having a convex surface directed toward the object side, a negative meniscus lens having a convex surface directed toward the object side, and a biconvex positive lens. The fourth lens unit G4 is composed of a negative meniscus lens having a concave surface directed toward the object side. All the lens elements in each lens unit G1, G2, G3, G4 are arranged in the mentioned order from the object side.

The following six surfaces are aspheric surfaces: both surfaces of the biconvex positive lens in the first lens unit G1, the image side surface of the biconvex positive lens in the second lens unit G2, the object side surface of the positive meniscus lens having a convex surface directed toward the object side in the third lens unit G3, the image side surface of the biconvex positive lens in the third lens unit G3, and the object side surface of the negative meniscus lens having a concave surface directed toward the object side in the fourth lens unit G4.

Figure 13A:
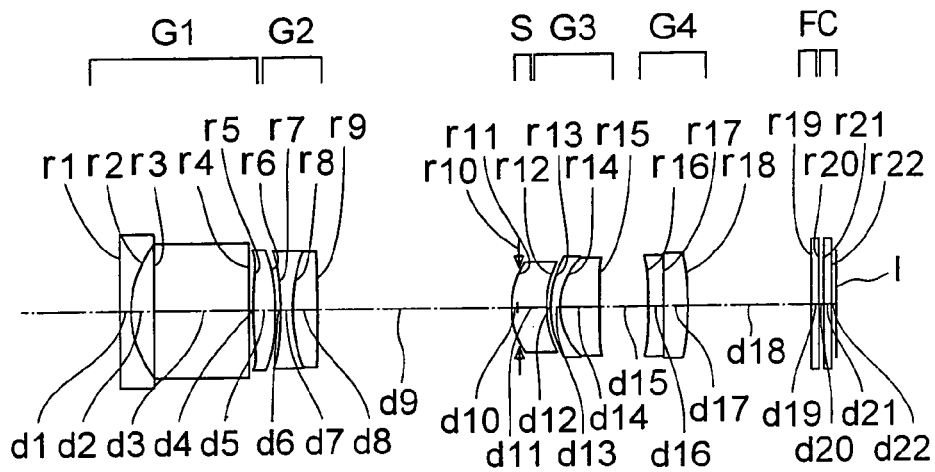
FIGS. 13A, 13B, and 13C are cross sectional views similar to FIGS. 1A, 1B, and 1C, showing a zoom lens according to a thirteenth embodiment of the present invention.
Figure 13B:
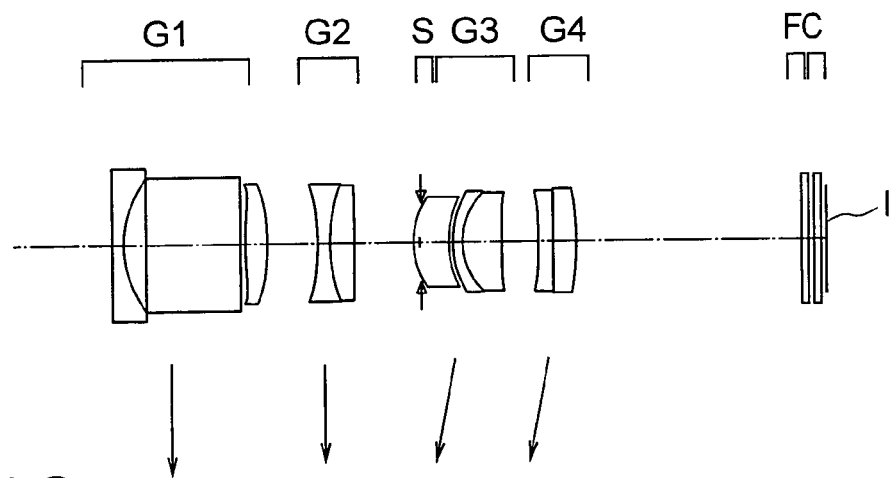
Figure 13C:
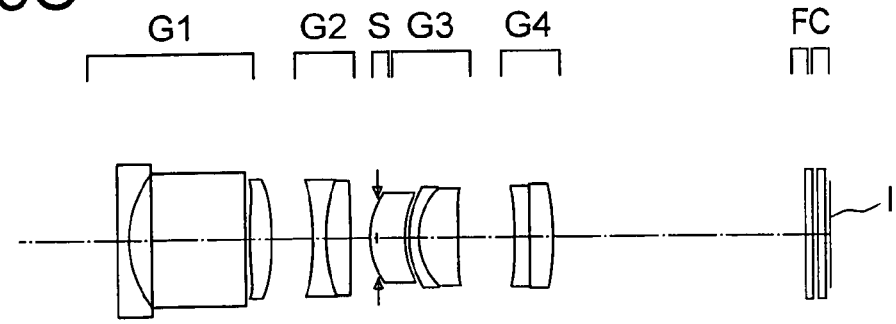

As shown in FIGS. 13A, 13B, and 13C, the zoom lens according to the thirteenth embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves toward the object side.

The first lens unit G1 is composed of a plano-concave negative lens, an optical path deflecting prism having planar surfaces on both sides, and a biconvex positive lens. The second lens unit G2 is composed of a cemented lens made up of a biconcave negative lens and a biconvex positive lens. The third lens unit G3 is composed of a positive meniscus lens having a convex surface directed toward the object side and a cemented lens made up of a negative meniscus lens having a convex surface directed toward the object side and a biconvex positive lens. The fourth lens unit G4 is composed of a cemented lens made up of a biconcave negative lens and a biconvex positive lens. All the lens elements in each lens unit G1, G2, G3, G4 are arranged in the mentioned order from the object side.

The following seven surfaces are aspheric surfaces: the image side surface of the plano-concave negative lens in the first lens unit G1, both surfaces of the biconvex positive lens in the first lens unit G1, the image side surface of the biconvex positive lens in the second lens unit G2, the object side surface of the positive meniscus lens having a convex surface directed toward the object side in the third lens unit G3, the image side surface of the biconvex positive lens in the third lens unit G3, and the object side surface of the biconcave negative lens in the fourth lens unit G4.

Figure 14A:
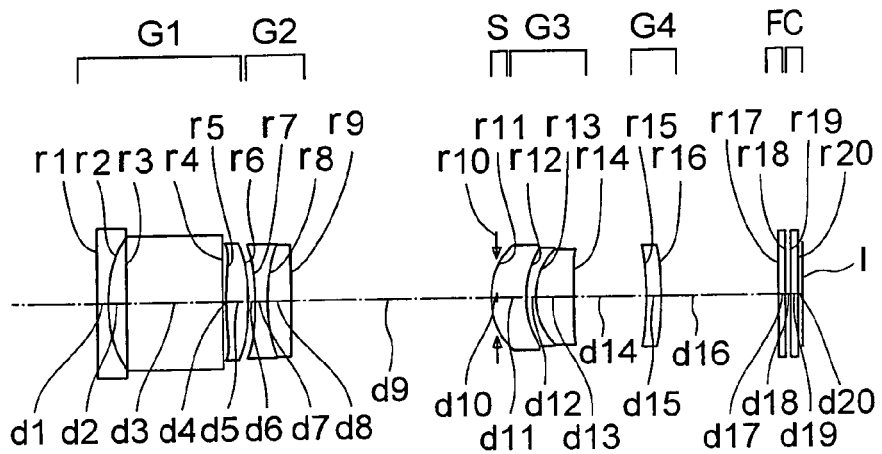
FIGS. 14A, 14B, and 14C are cross sectional views similar to FIGS. 1A, 1B, and 1C, showing a zoom lens according to a fourteenth embodiment of the present invention.
Figure 14B:
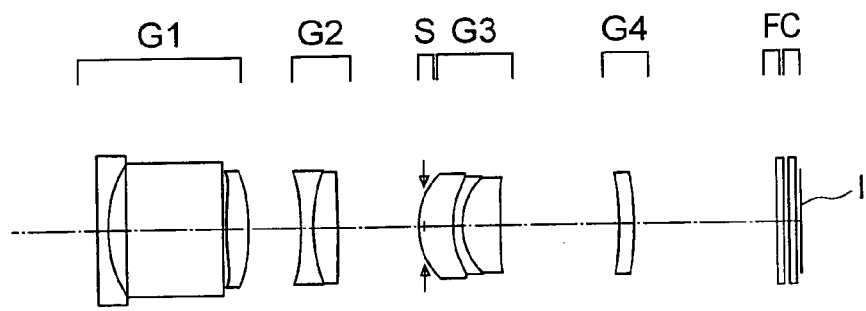
Figure 14C:
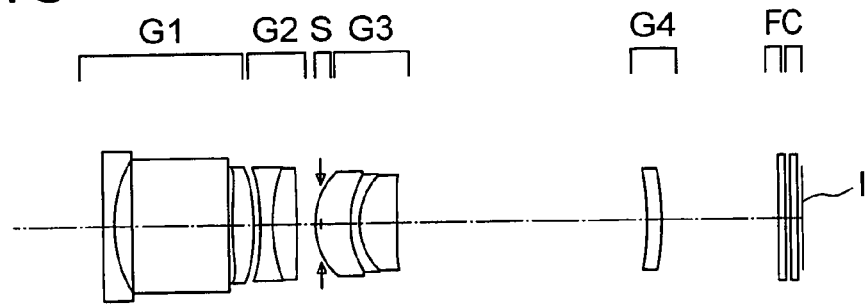

As shown in FIGS. 14A, 14B, and 14C, the zoom lens according to the fourteenth embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves along a locus that is convex toward the object side.

The first lens unit G1 is composed of a plano-concave negative lens, an optical path deflecting prism having planar surfaces on both sides, and a biconvex positive lens. The second lens unit G2 is composed of a cemented lens made up of a biconcave negative lens and a biconvex positive lens. The third lens unit G3 is composed of a cemented lens made up of a positive meniscus lens having a convex surface directed toward the object side, a negative meniscus lens having a convex surface directed toward the object side, and a biconvex positive lens. The fourth lens unit G4 is composed of a negative meniscus lens having a concave surface directed toward the object side. All the lens elements in each lens unit G1, G2, G3, G4 are arranged in the mentioned order from the object side.

The following six surfaces are aspheric surfaces: both surfaces of the biconvex positive lens in the first lens unit G1, the image side surface of the biconvex positive lens in the second lens unit G2, the object side surface of the positive meniscus lens having a convex surface directed toward the object side in the third lens unit G3, the image side surface of the biconvex positive lens in the third lens unit G3, and the object side surface of the negative meniscus lens having a concave surface directed toward the object side in the fourth lens unit G4.

Figure 15A:
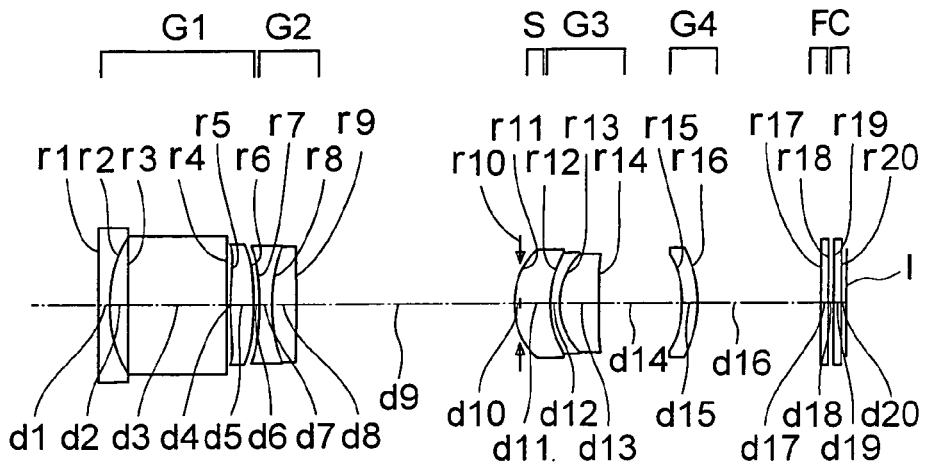
FIGS. 15A, 15B, and 15C are cross sectional views similar to FIGS. 1A, 1B, and 1C, showing a zoom lens according to a fifteenth embodiment of the present invention.
Figure 15B:
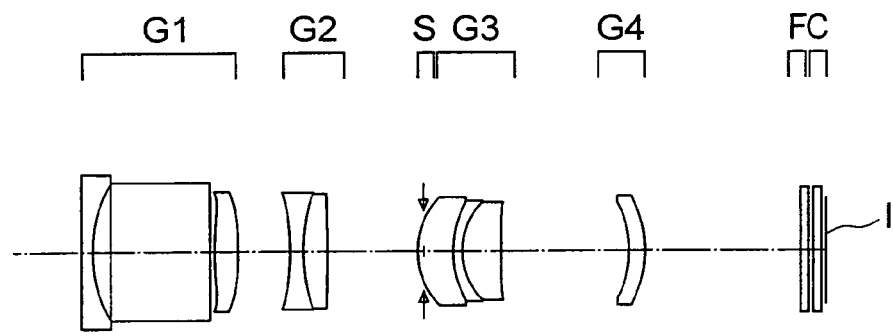
Figure 15C:
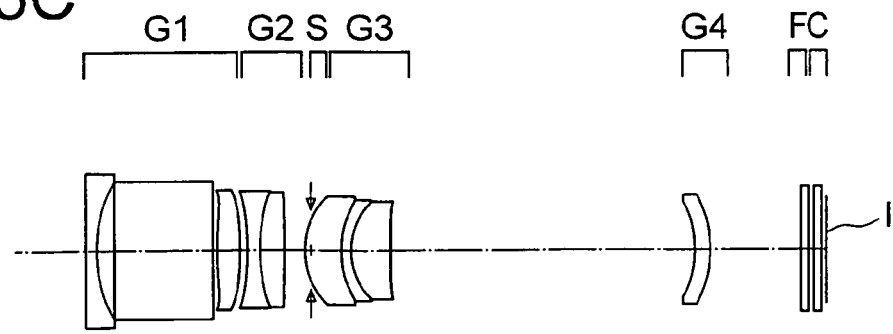

As shown in FIGS. 15A, 15B, and 15C, the zoom lens according to the fifteenth embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves along a locus that is convex toward the object side.

The first lens unit G1 is composed of a plano-concave negative lens, a prism having a convex surface directed toward the image side, and a biconvex positive lens. The second lens unit G2 is composed of a cemented lens made up of a biconcave negative lens and a biconvex positive lens. The third lens unit G3 is composed of a cemented lens made up of a positive meniscus lens having a convex surface directed toward the object side, a negative meniscus lens having a convex surface directed toward the object side, and a positive meniscus lens having a convex surface directed toward the object side. The fourth lens unit G4 is composed of a negative meniscus lens having a concave surface directed toward the object side. All the lens elements in each lens unit G1, G2, G3, G4 are arranged in the mentioned order from the object side.

The following six surfaces are aspheric surfaces: both surfaces of the biconvex positive lens in the first lens unit G1, the image side surface of the biconvex positive lens in the second lens unit G2, the object side surface of the positive meniscus lens having a convex surface directed toward the object side in the third lens unit G3, the image side surface of the positive meniscus lens having a convex surface directed toward the object side in the third lens unit G3, and the object side surface of the negative meniscus lens having a concave surface directed toward the object side in the fourth lens unit G4.

Figure 16A:
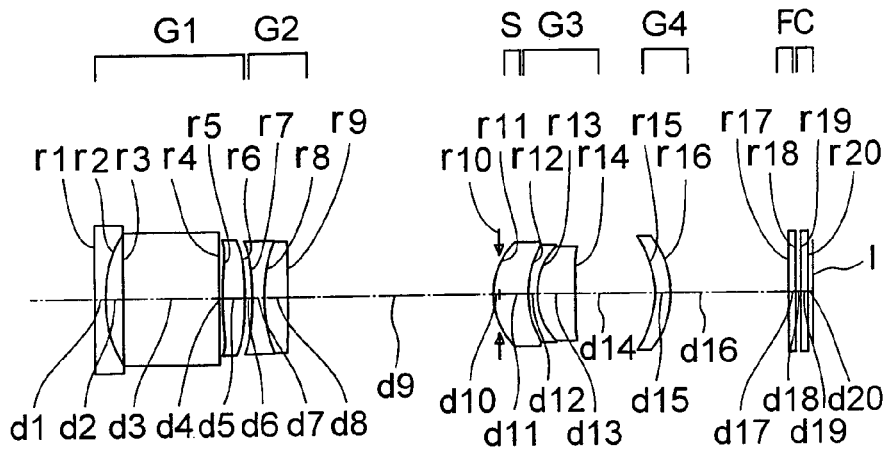
FIGS. 16A, 16B, and 16C are cross sectional views similar to FIGS. 1A, 1B, and 1C, showing a zoom lens according to a sixteenth embodiment of the present invention.
Figure 16B:
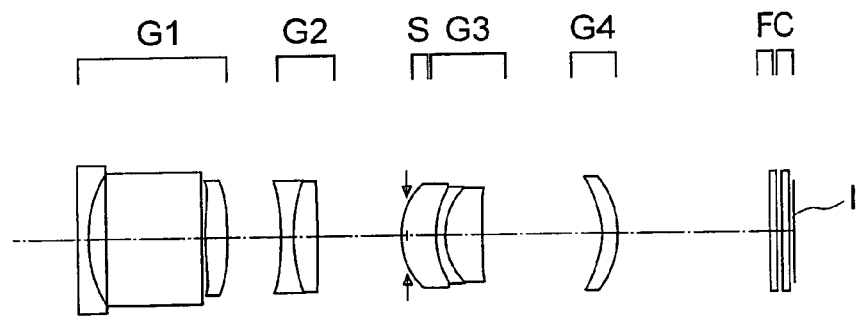
Figure 16C:
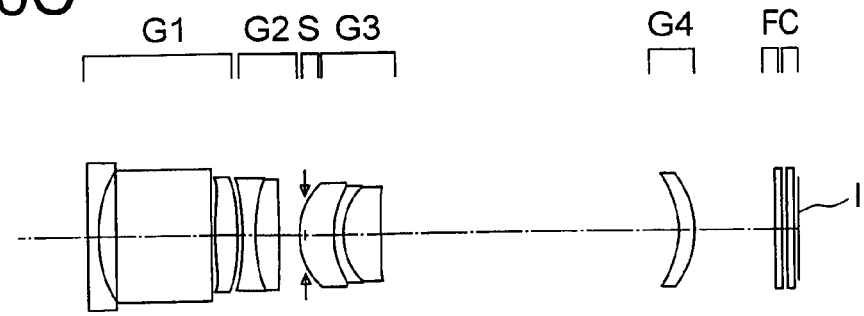

As shown in FIGS. 16A, 16B, and 16C, the zoom lens according to the sixteenth embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves along a locus that is convex toward the object side.

The first lens unit G1 is composed of a plano-concave negative lens, a prism having convex surfaces on both sides, and a biconvex positive lens. The second lens unit G2 is composed of a cemented lens made up of a biconcave negative lens and a biconvex positive lens. The third lens unit G3 is composed of a cemented lens made up of a positive meniscus lens having a convex surface directed toward the object side, a negative meniscus lens having a convex surface directed toward the object side, and a positive meniscus lens having a convex surface directed toward the object side. The fourth lens unit G4 is composed of a negative meniscus lens having a concave surface directed toward the object side. All the lens elements in each lens unit G1, G2, G3, G4 are arranged in the mentioned order from the object side.

The following six surfaces are aspheric surfaces: both surfaces of the biconvex positive lens in the first lens unit G1, the image side surface of the biconvex positive lens in the second lens unit G2, the object side surface of the positive meniscus lens having a convex surface directed toward the object side in the third lens unit G3, the image side surface of the positive meniscus lens having a convex surface directed toward the object side in the third lens unit G3, and the object side surface of the negative meniscus lens having a concave surface directed toward the object side in the fourth lens unit G4.

Figure 17A:
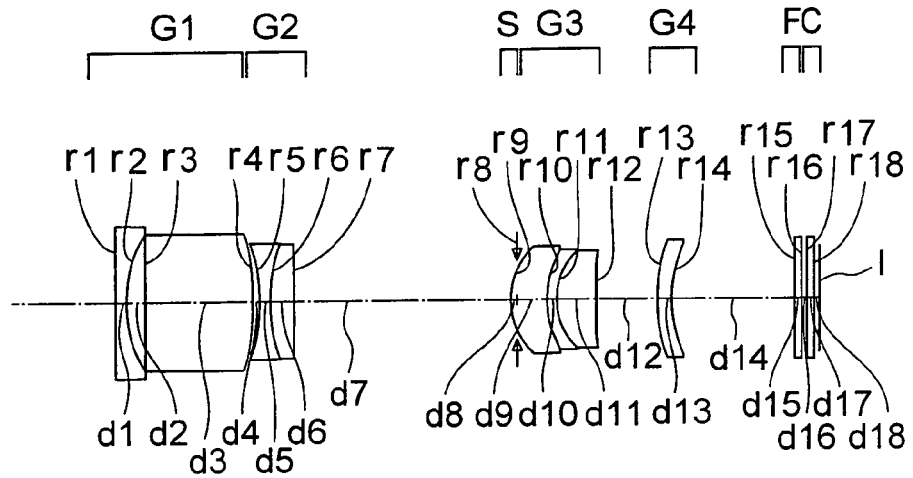
FIGS. 17A, 17B, and 17C are cross sectional views similar to FIGS. 1A, 1B, and 1C, showing a zoom lens according to a seventeenth embodiment of the present invention.
Figure 17B:
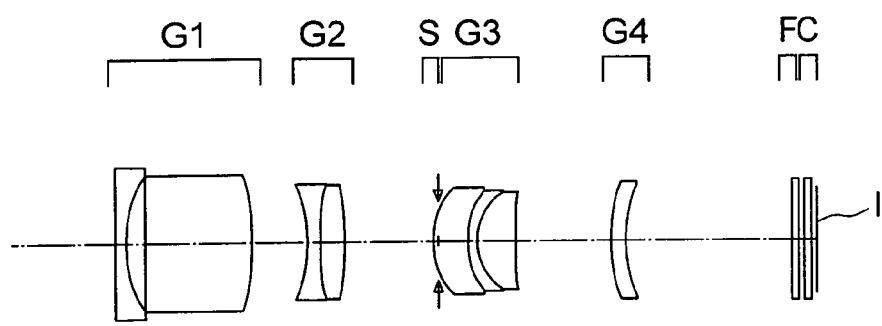
Figure 17C:
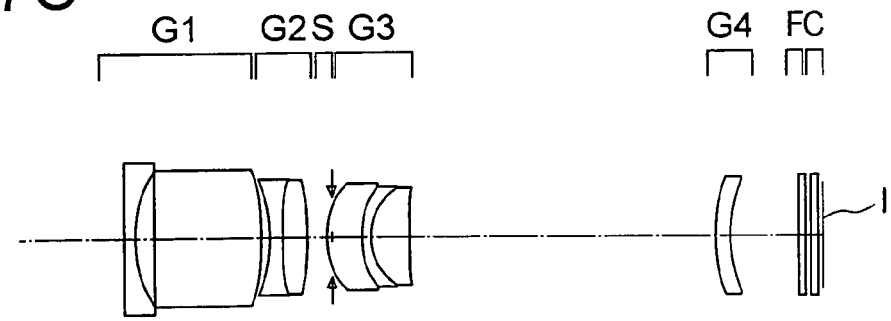
Figure 18A:
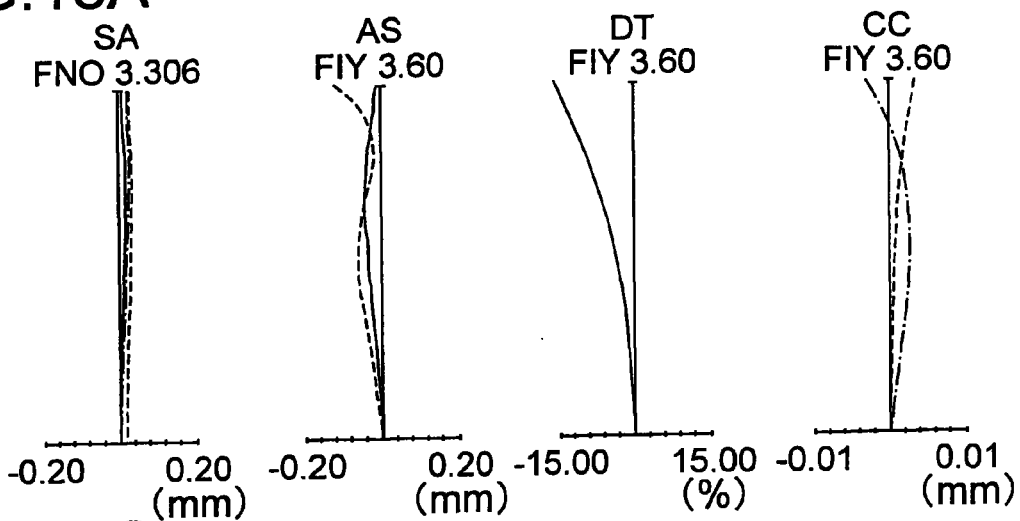
FIGS. 18A, 18B, and 18C are diagrams showing spherical aberration, astigmatism, distortion, and chromatic aberration of magnification of the zoom lens according to the first embodiment in the state in which the zoom lens is focused on an object point at infinity, where
Figure 18B:
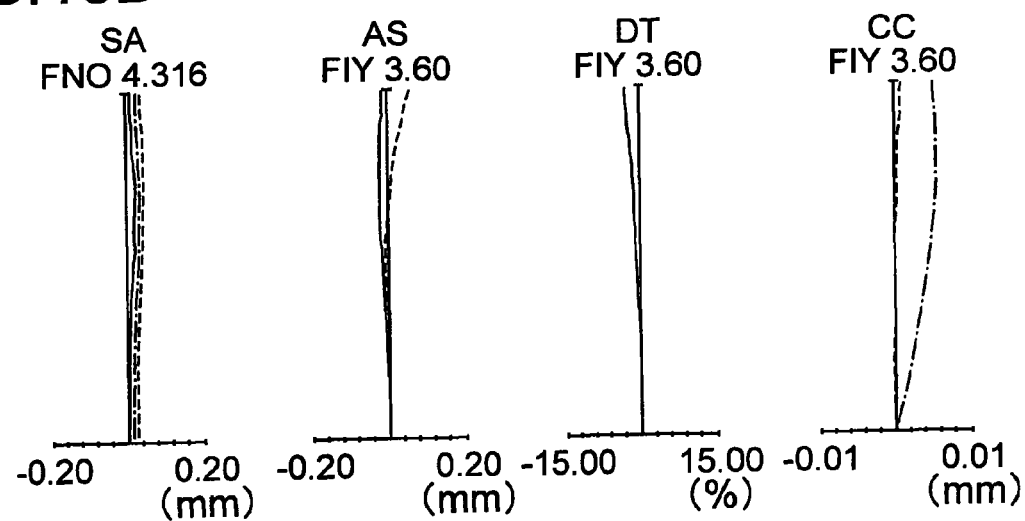
Figure 18C:
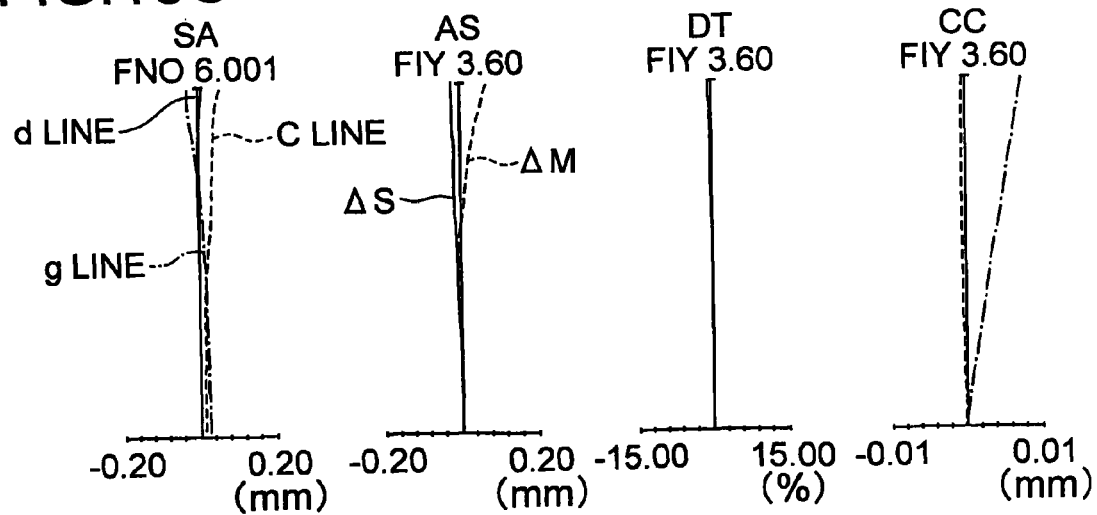
Figure 19A:
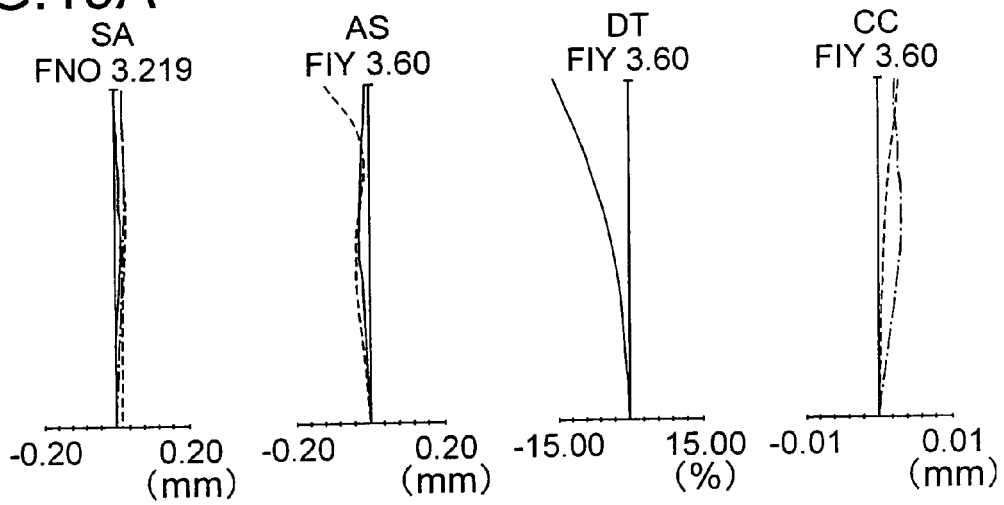
FIGS. 19A, 19B, and 19C are diagrams showing spherical aberration, astigmatism, distortion, and chromatic aberration of magnification of the zoom lens according to the second embodiment in the state in which the zoom lens is focused on an object point at infinity, where
Figure 19B:
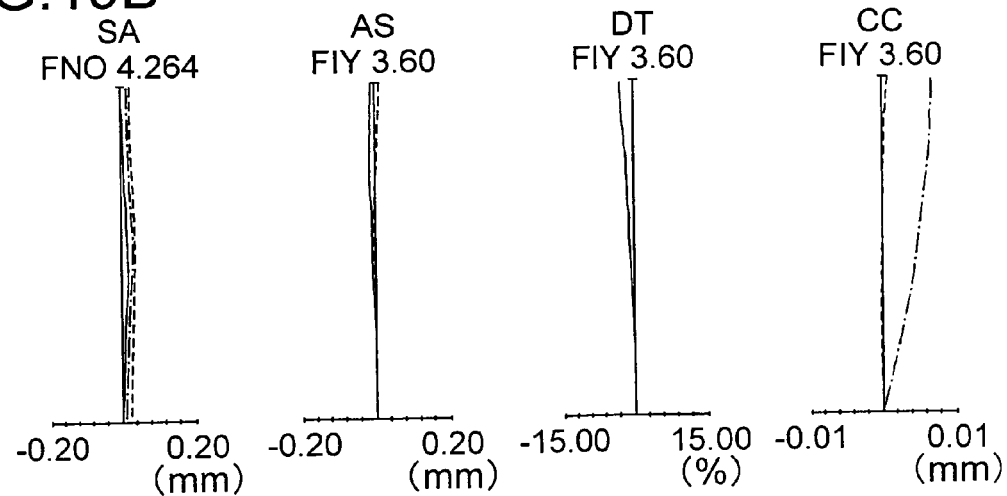
Figure 19C:
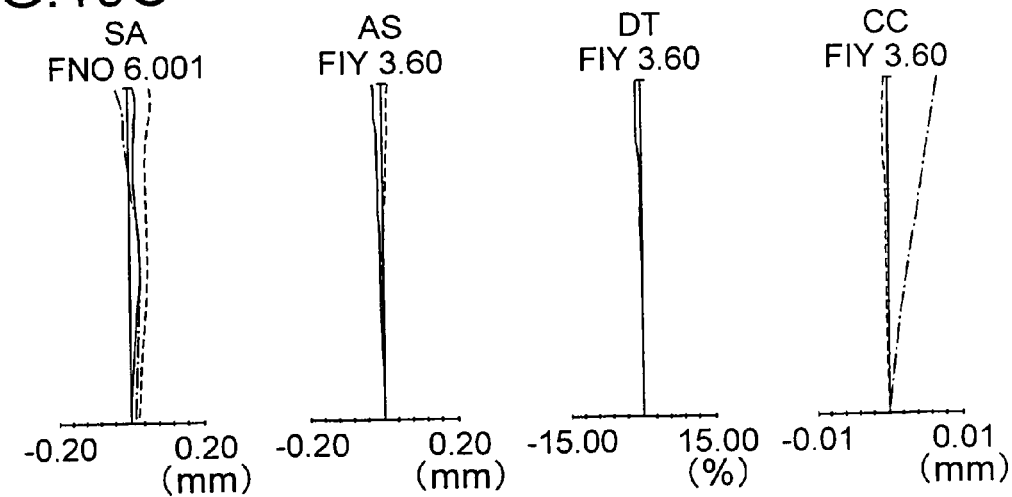
Figure 20A:
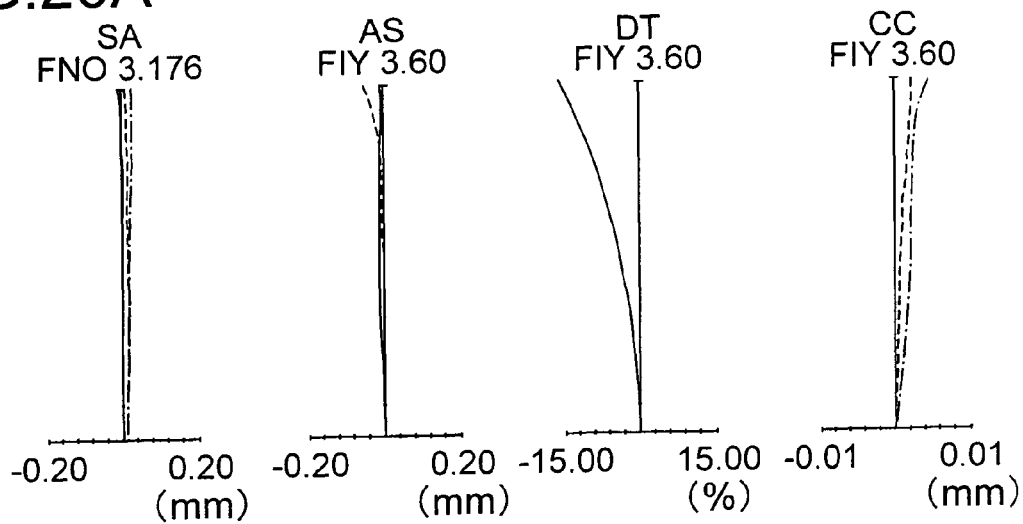
FIGS. 20A, 20B, and 20C are diagrams showing spherical aberration, astigmatism, distortion, and chromatic aberration of magnification of the zoom lens according to the third embodiment in the state in which the zoom lens is focused on an object point at infinity, where
Figure 20B:
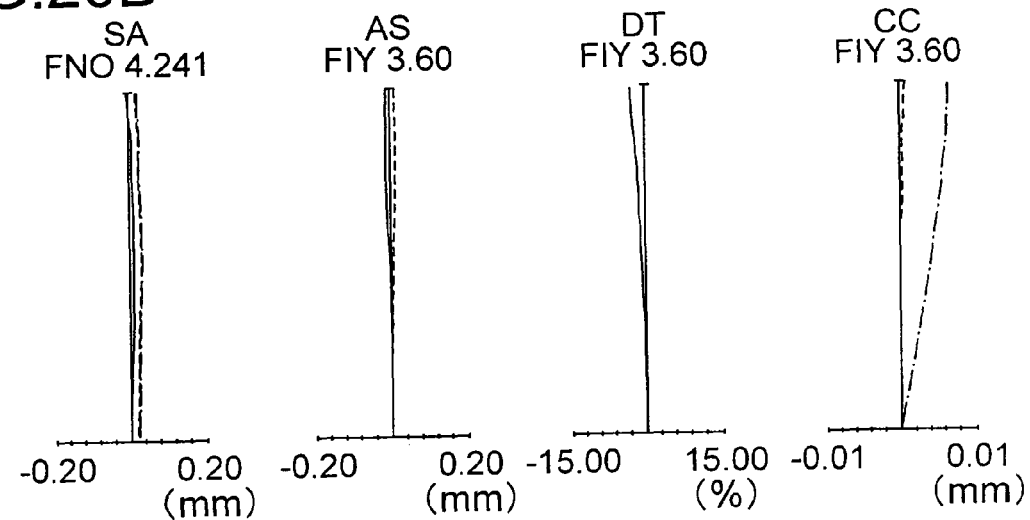
Figure 20C:
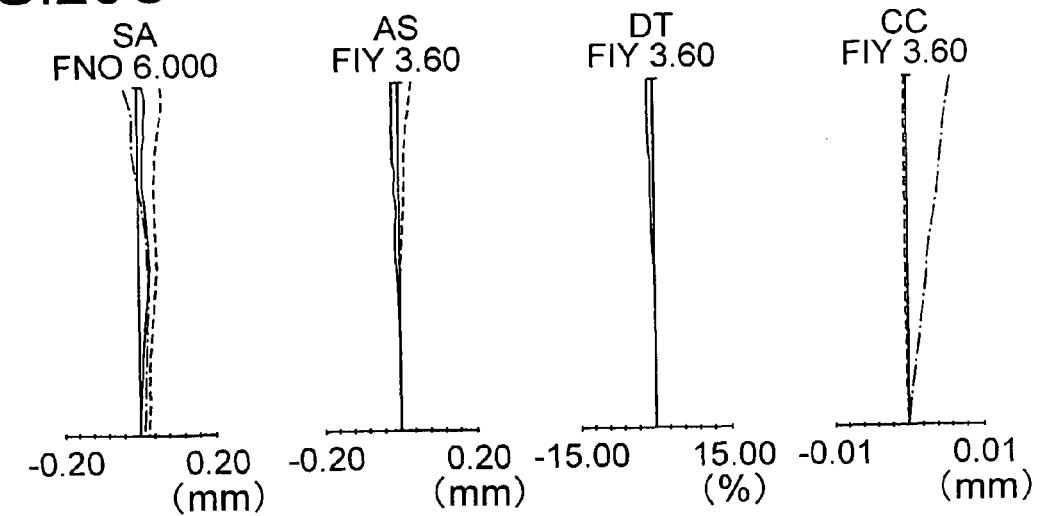
Figure 21A:
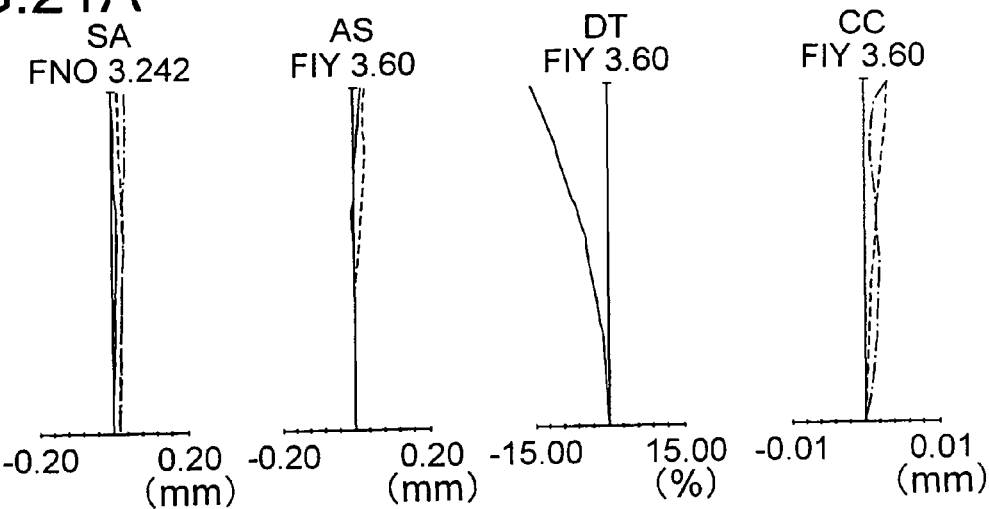
FIGS. 21A, 21B, and 21C are diagrams showing spherical aberration, astigmatism, distortion, and chromatic aberration of magnification of the zoom lens according to the fourth embodiment in the state in which the zoom lens is focused on an object point at infinity, where
Figure 21B:
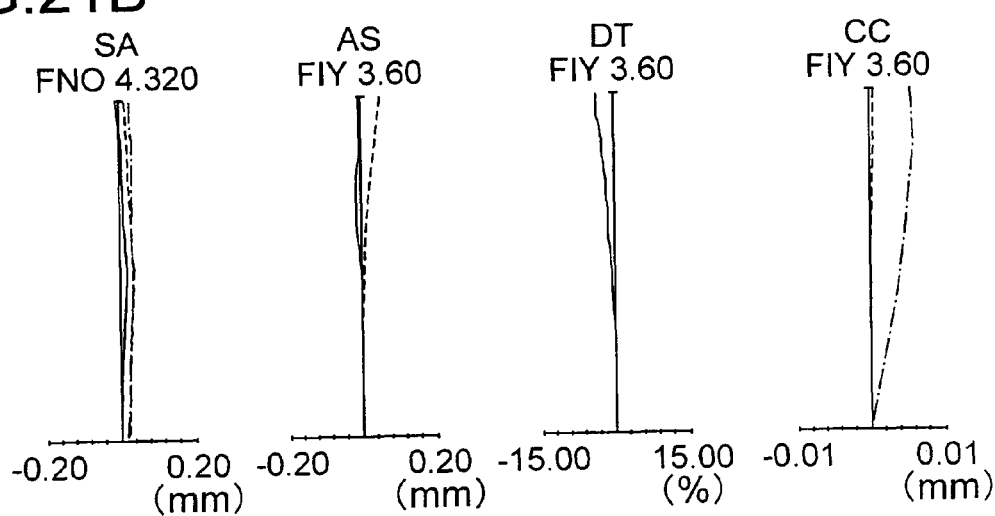
Figure 21C:
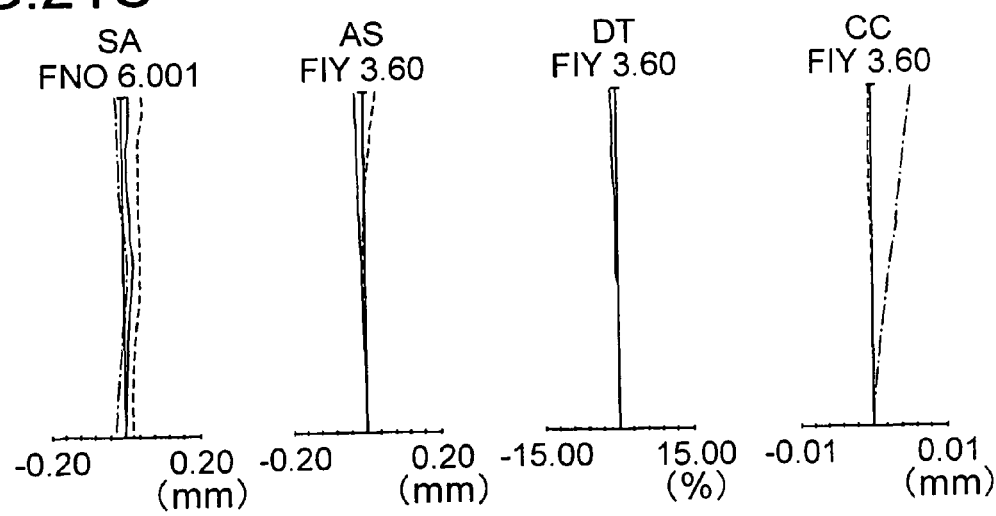
Figure 22A:
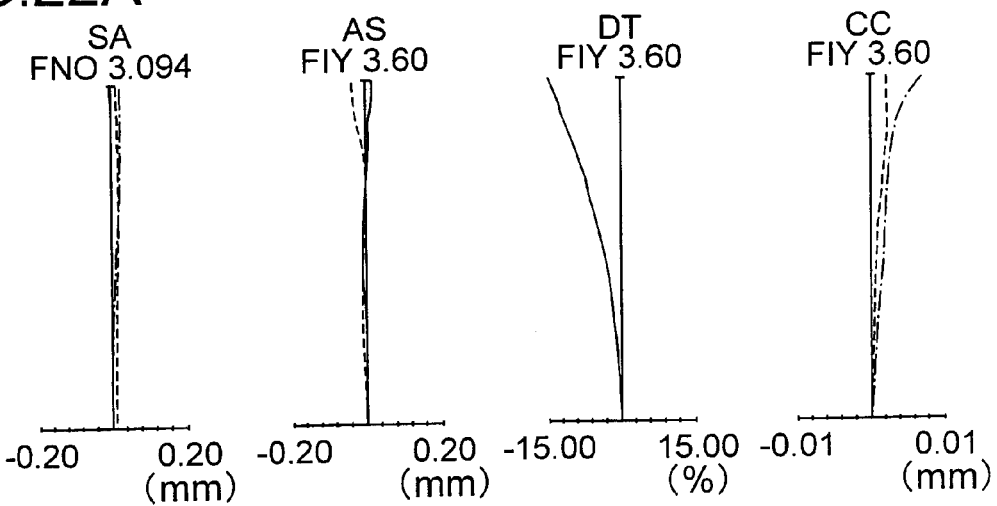
FIGS. 22A, 22B, and 22C are diagrams showing spherical aberration, astigmatism, distortion, and chromatic aberration of magnification of the zoom lens according to the fifth embodiment in the state in which the zoom lens is focused on an object point at infinity, where
Figure 22B:
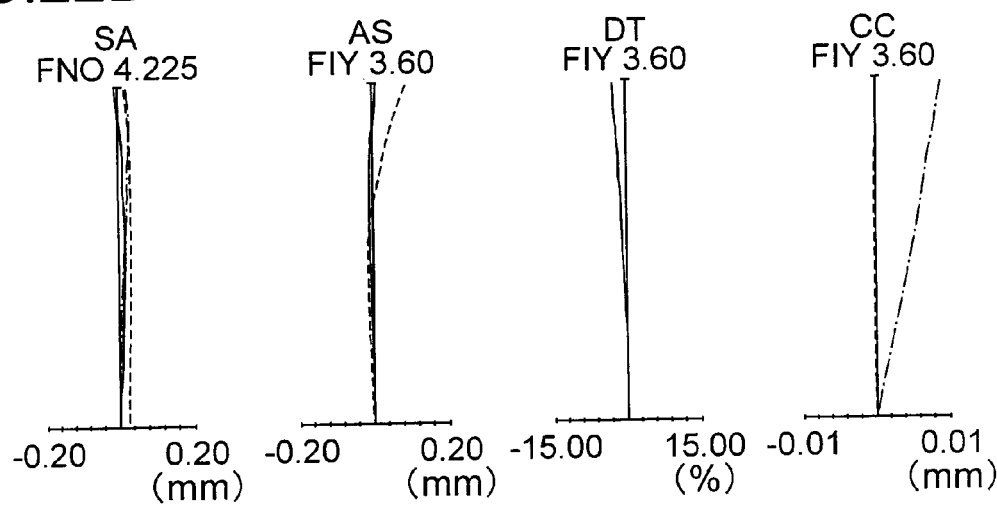
Figure 22C:
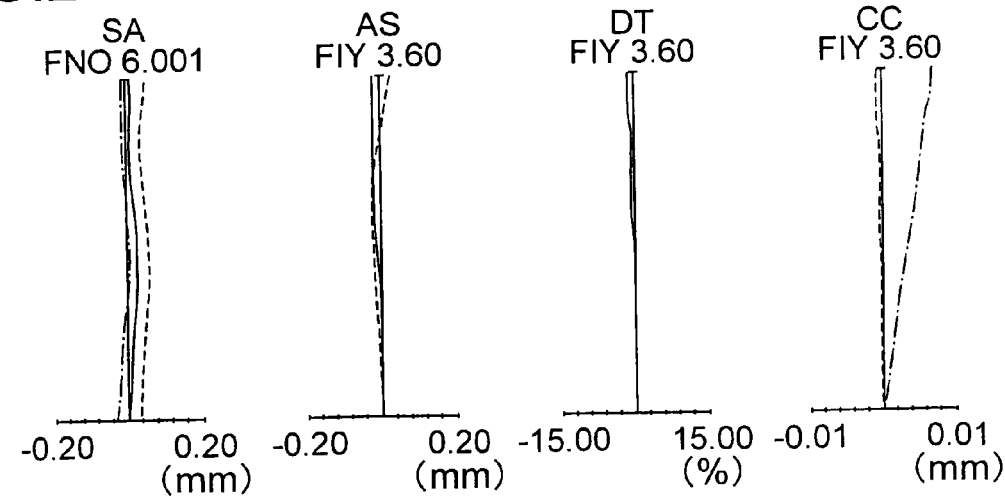
Figure 23A:
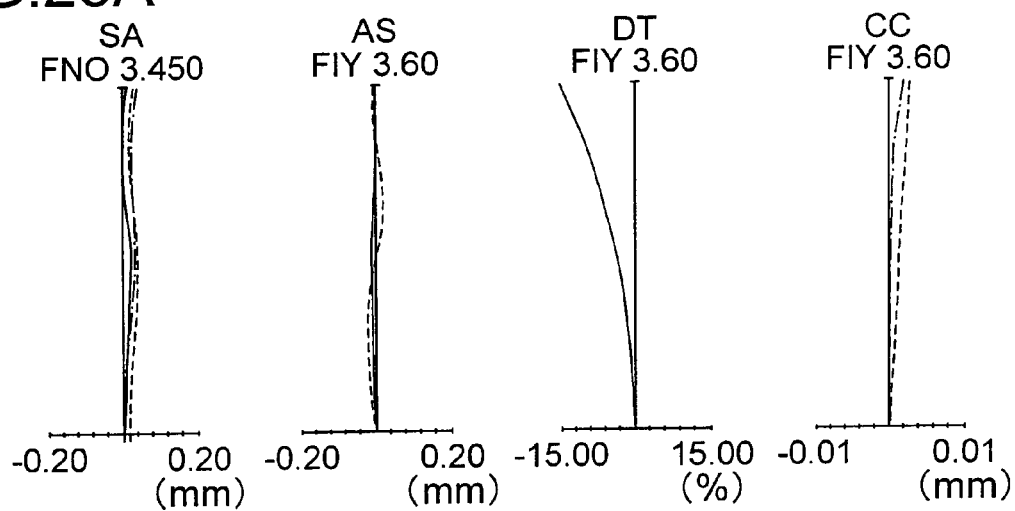
FIGS. 23A, 23B, and 23C are diagrams showing spherical aberration, astigmatism, distortion, and chromatic aberration of magnification of the zoom lens according to the sixth embodiment in the state in which the zoom lens is focused on an object point at infinity, where
Figure 23B:
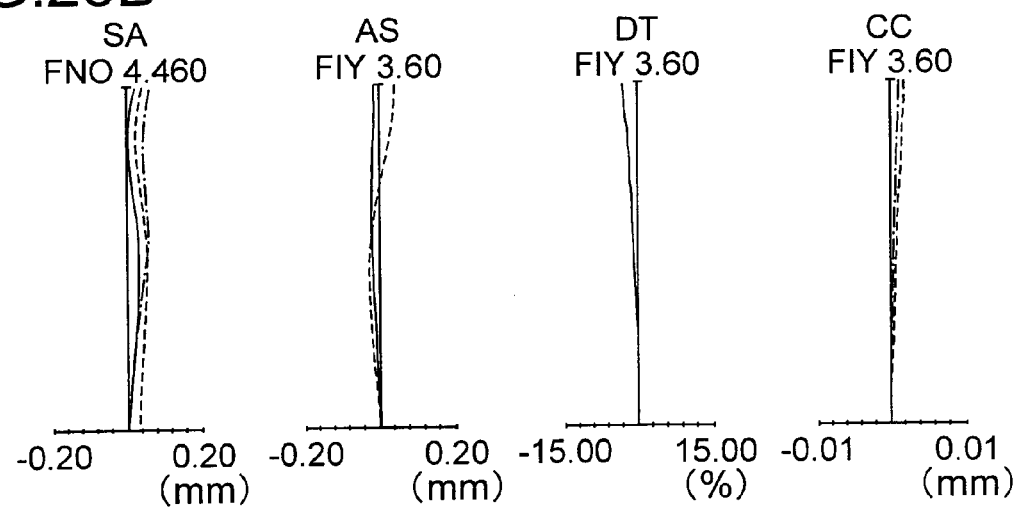
Figure 23C:
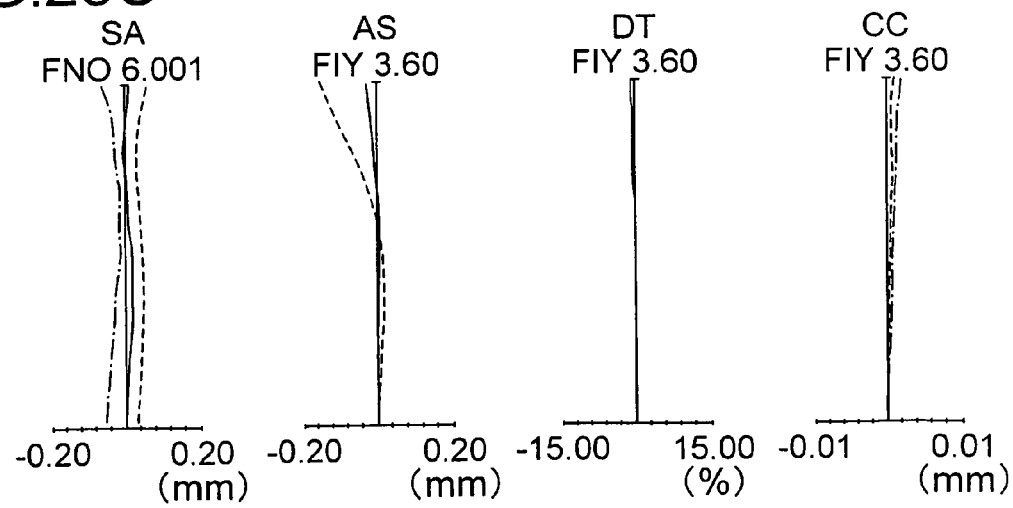
Figure 24A:
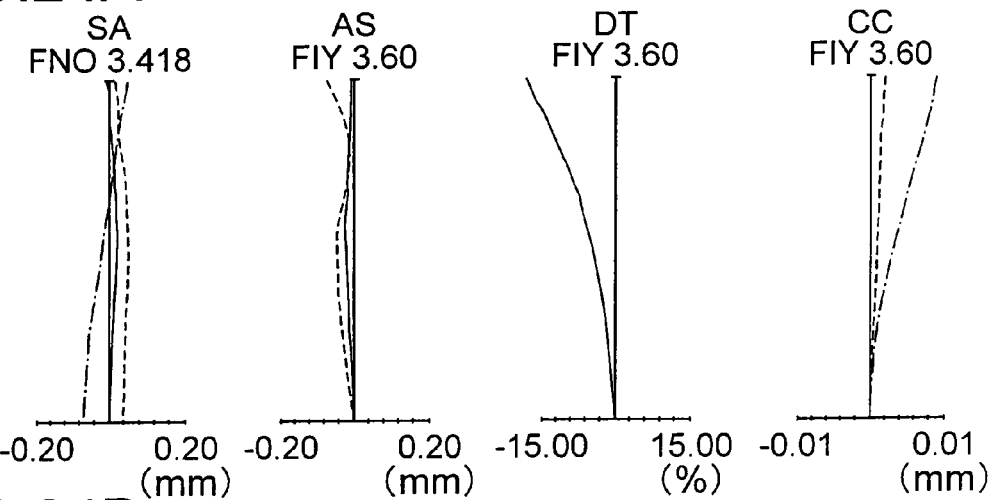
FIGS. 24A, 24B, and 24C are diagrams showing spherical aberration, astigmatism, distortion, and chromatic aberration of magnification of the zoom lens according to the seventh embodiment in the state in which the zoom lens is focused on an object point at infinity, where
Figure 24B:
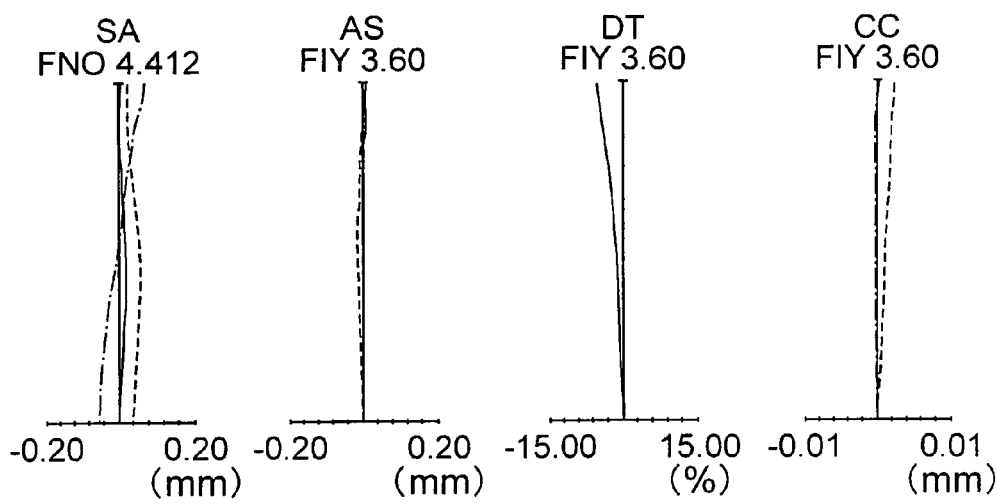
Figure 24C:
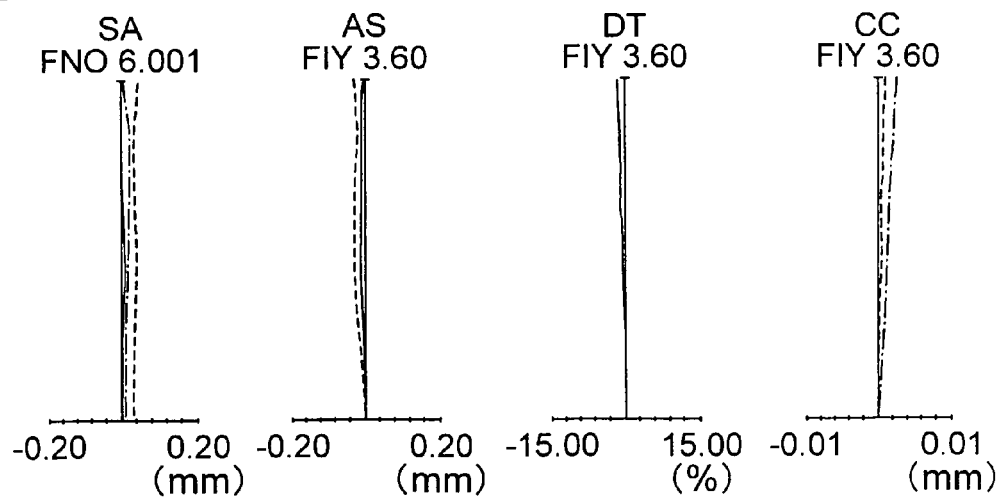
Figure 25A:
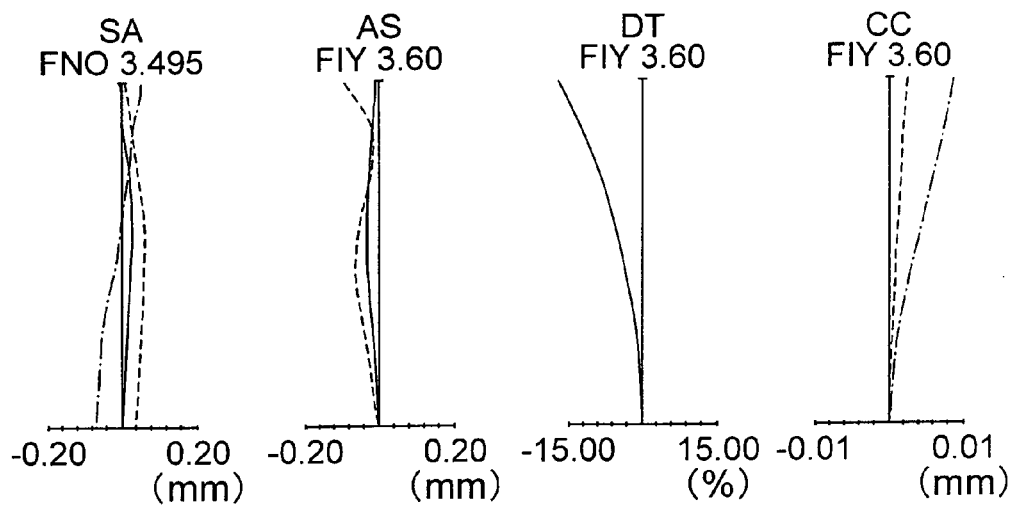
FIGS. 25A, 25B, and 25C are diagrams showing spherical aberration, astigmatism, distortion, and chromatic aberration of magnification of the zoom lens according to the eighth embodiment in the state in which the zoom lens is focused on an object point at infinity, where
Figure 25B:
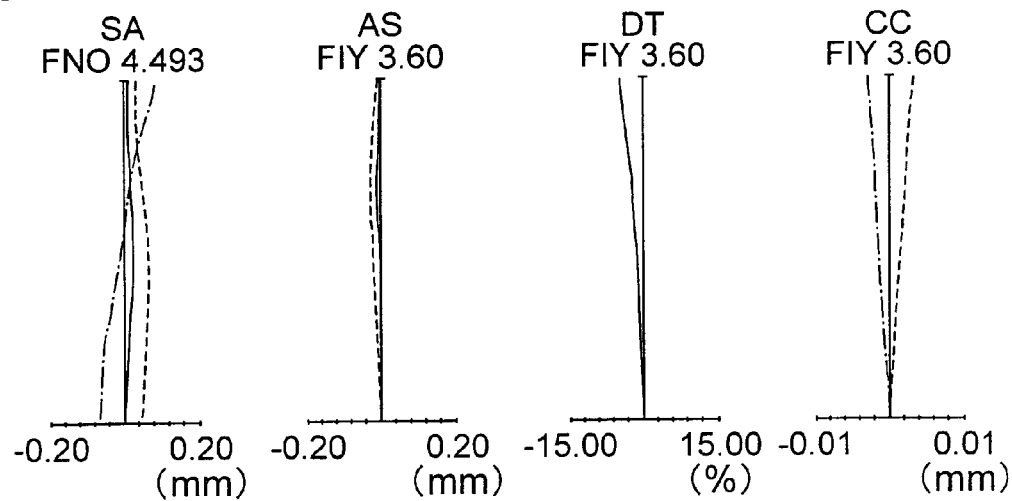
Figure 25C:
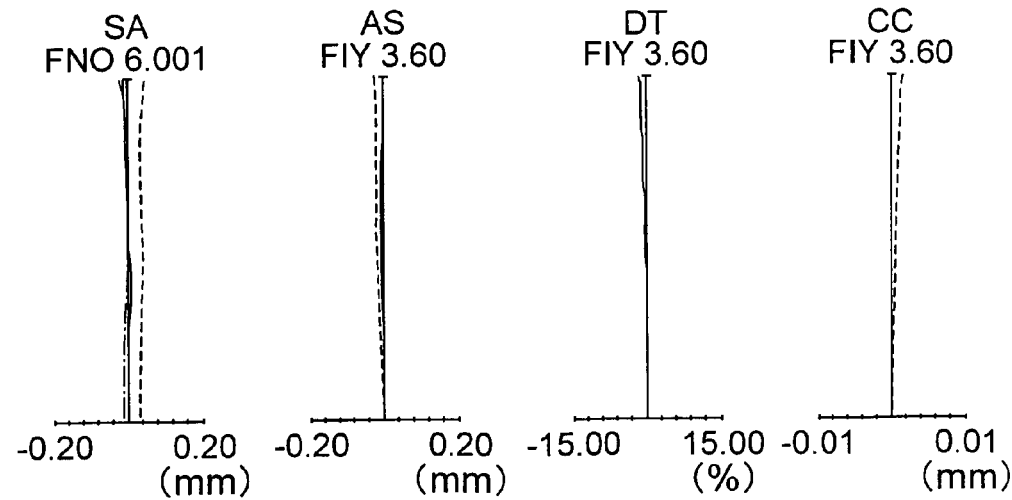
Figure 26A:
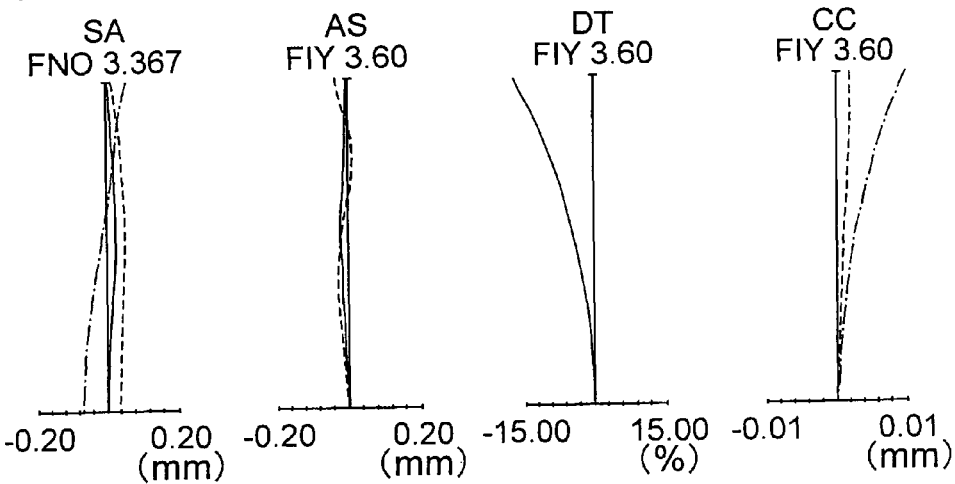
FIGS. 26A, 26B, and 26C are diagrams showing spherical aberration, astigmatism, distortion, and chromatic aberration of magnification of the zoom lens according to the ninth embodiment in the state in which the zoom lens is focused on an object point at infinity, where
Figure 26B:
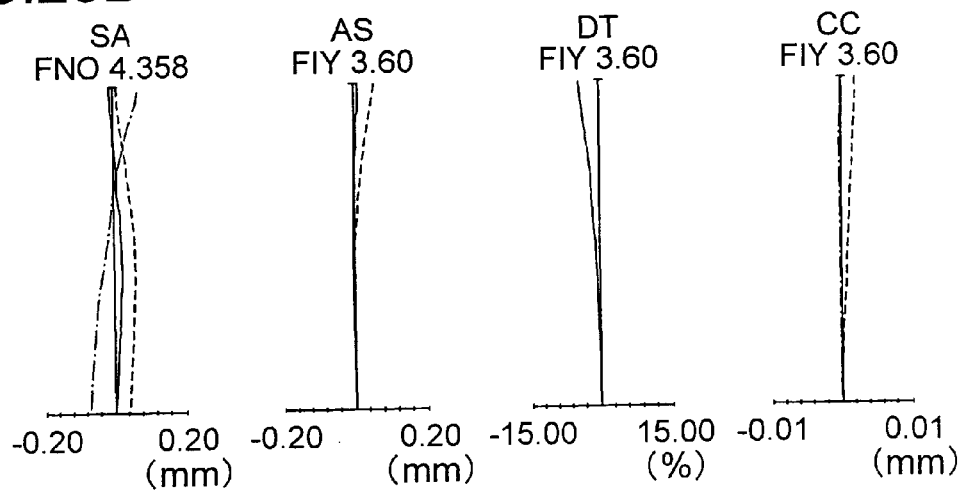
Figure 26C:
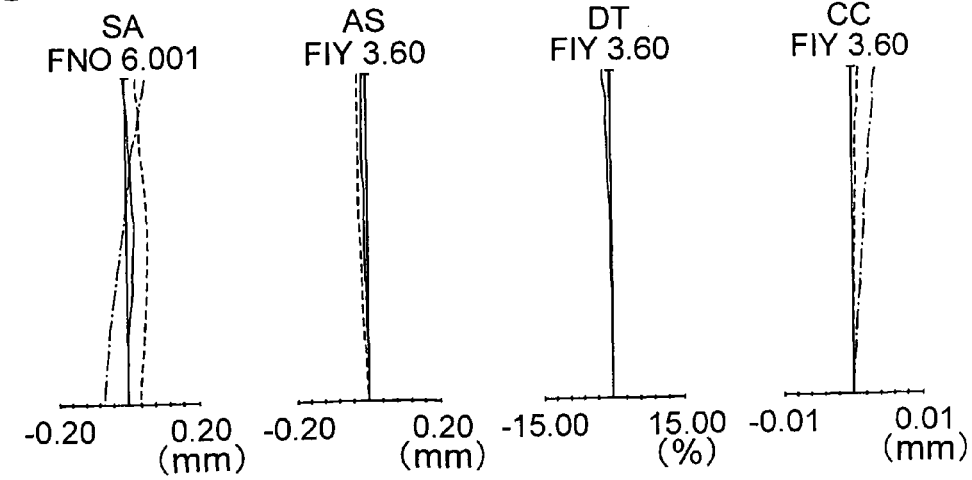
Figure 27A:
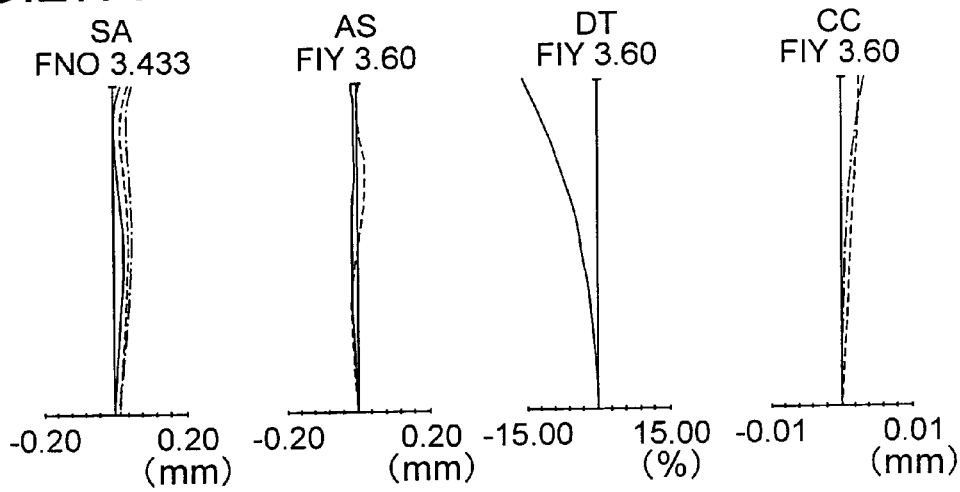
FIGS. 27A, 27B, and 27C are diagrams showing spherical aberration, astigmatism, distortion, and chromatic aberration of magnification of the zoom lens according to the tenth embodiment in the state in which the zoom lens is focused on an object point at infinity, where
Figure 27B:
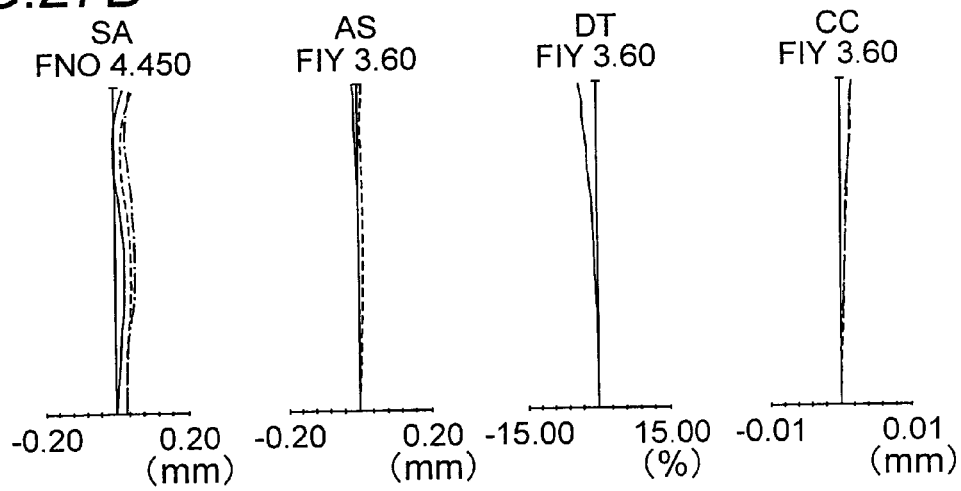
Figure 27C:
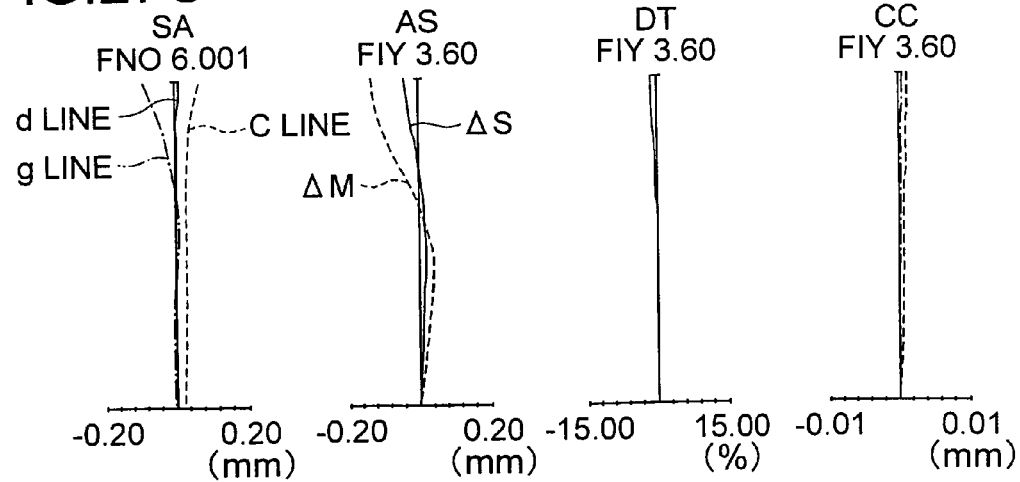
Figure 28A:
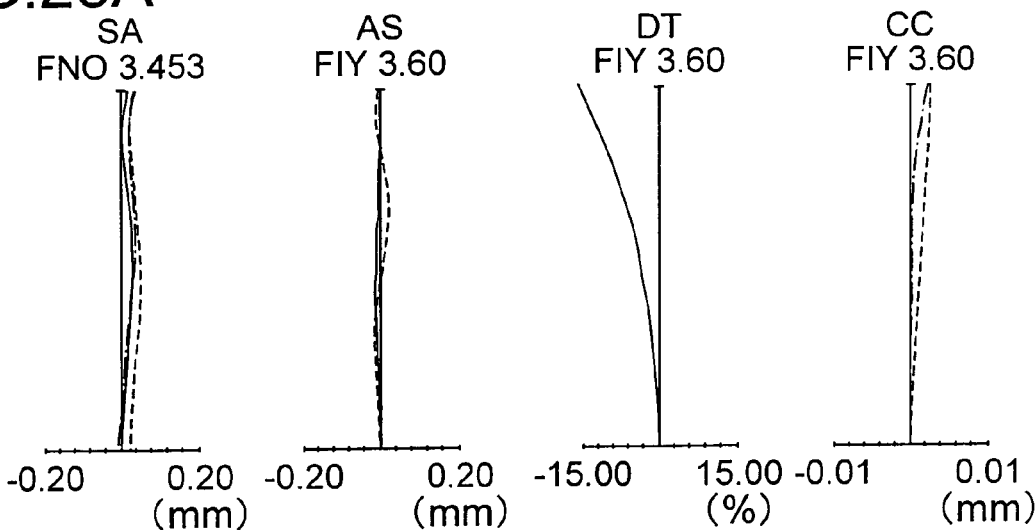
FIGS. 28A, 28B, and 28C are diagrams showing spherical aberration, astigmatism, distortion, and chromatic aberration of magnification of the zoom lens according to the eleventh embodiment in the state in which the zoom lens is focused on an object point at infinity, where
Figure 28B:
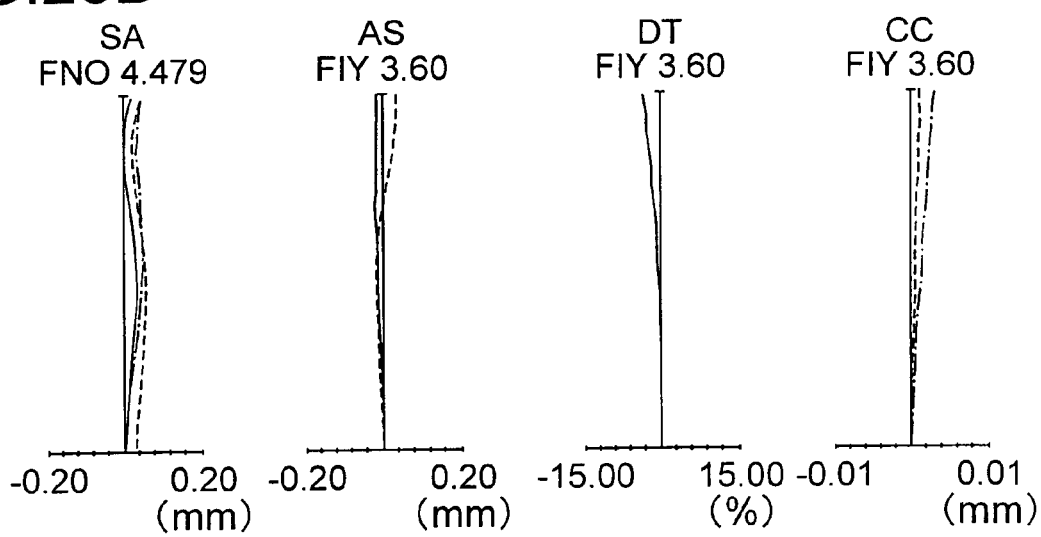
Figure 28C:
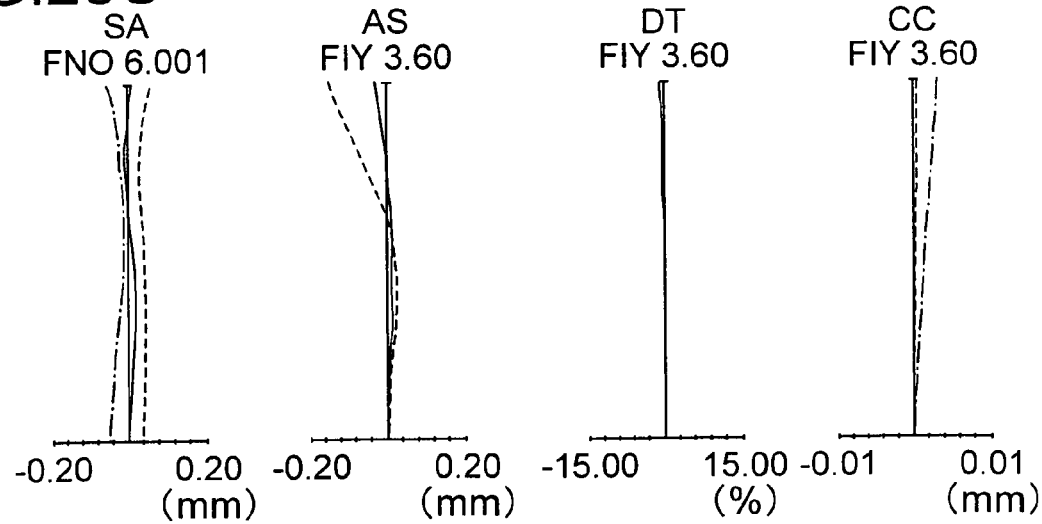
Figure 29A:
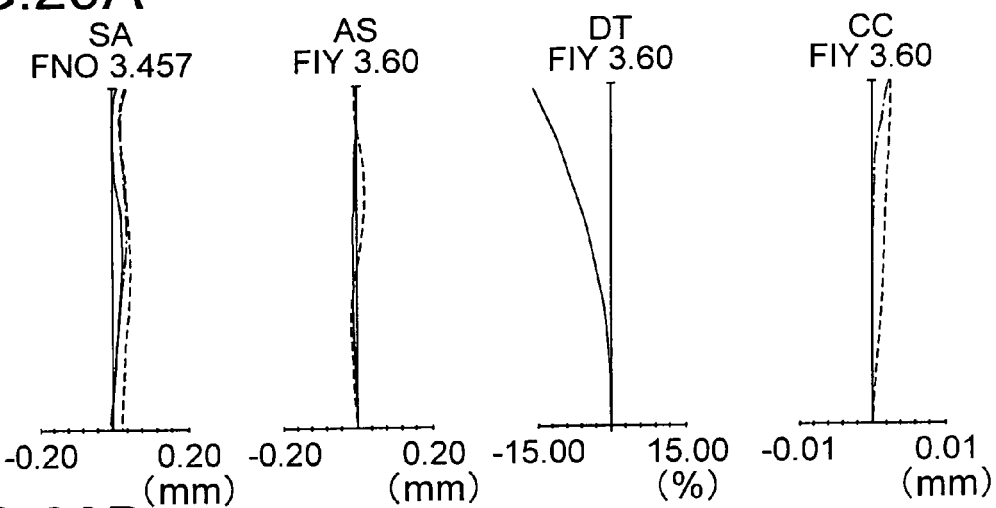
FIGS. 29A, 29B, and 29C are diagrams showing spherical aberration, astigmatism, distortion, and chromatic aberration of magnification of the zoom lens according to the twelfth embodiment in the state in which the zoom lens is focused on an object point at infinity, where
Figure 29B:
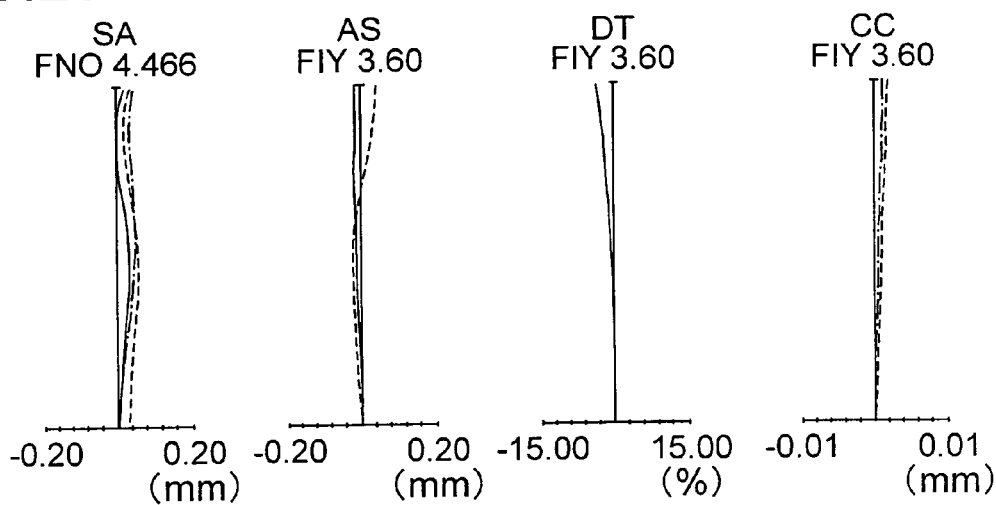
Figure 29C:
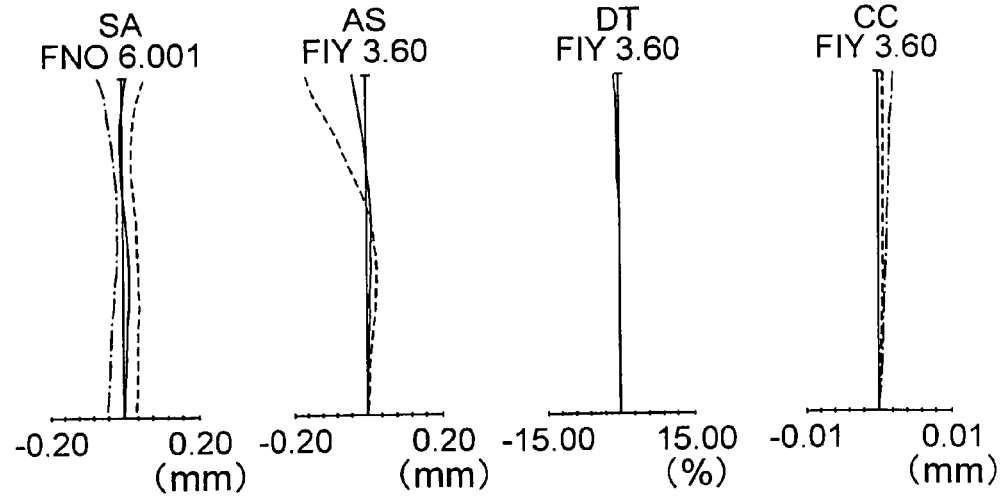
Figure 30A:
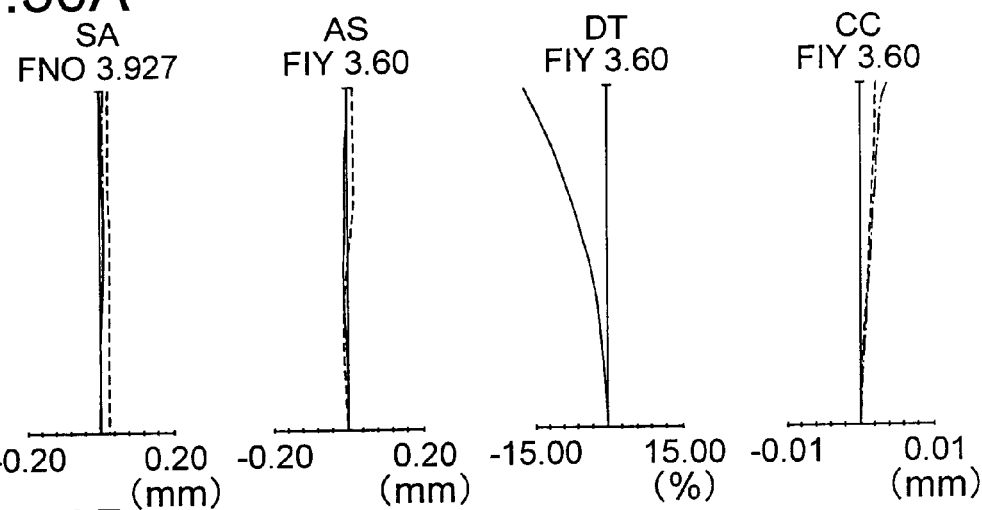
FIGS. 30A, 30B, and 30C are diagrams showing spherical aberration, astigmatism, distortion, and chromatic aberration of magnification of the zoom lens according to the thirteenth embodiment in the state in which the zoom lens is focused on an object point at infinity, where
Figure 30B:
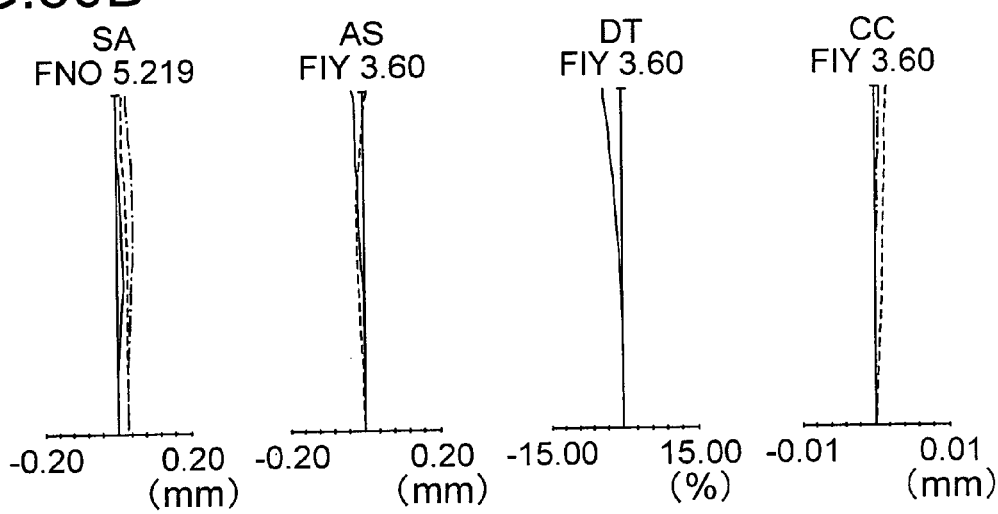
Figure 30C:
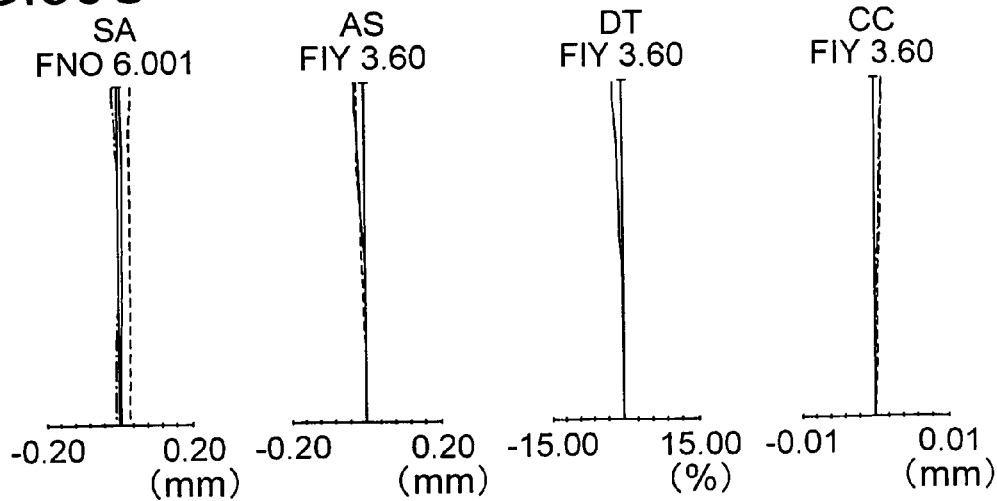
Figure 31A:
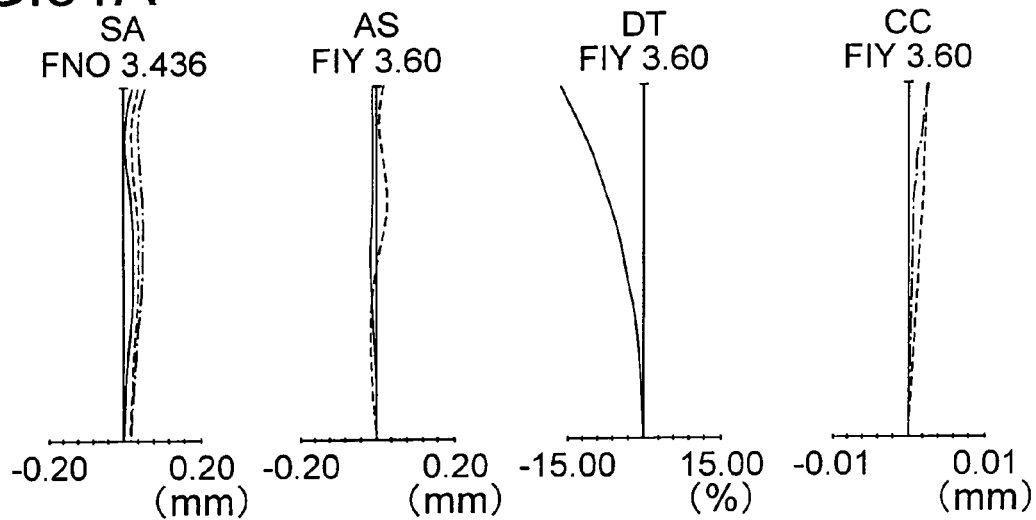
FIGS. 31A, 31B, and 31C are diagrams showing spherical aberration, astigmatism, distortion, and chromatic aberration of magnification of the zoom lens according to the fourteenth embodiment in the state in which the zoom lens is focused on an object point at infinity, where
Figure 31B:
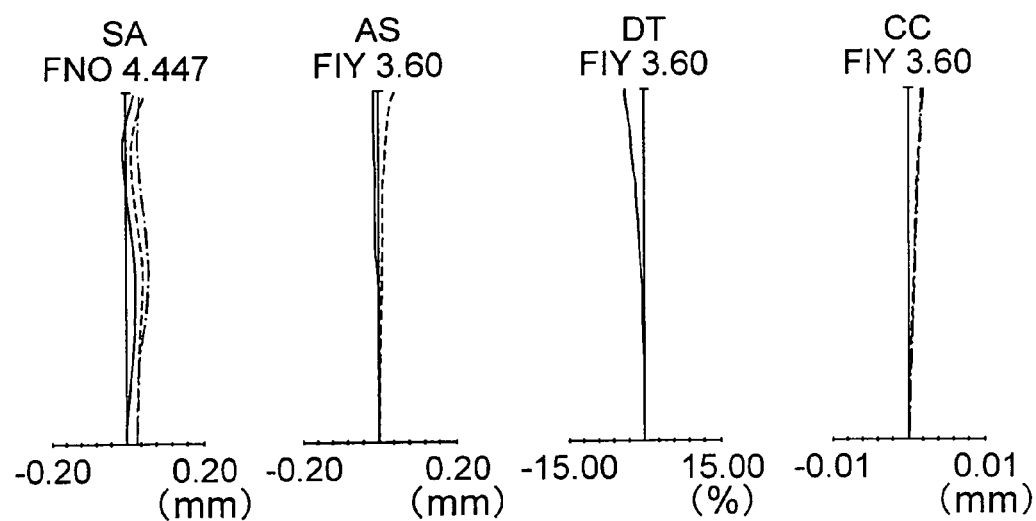
Figure 31C:
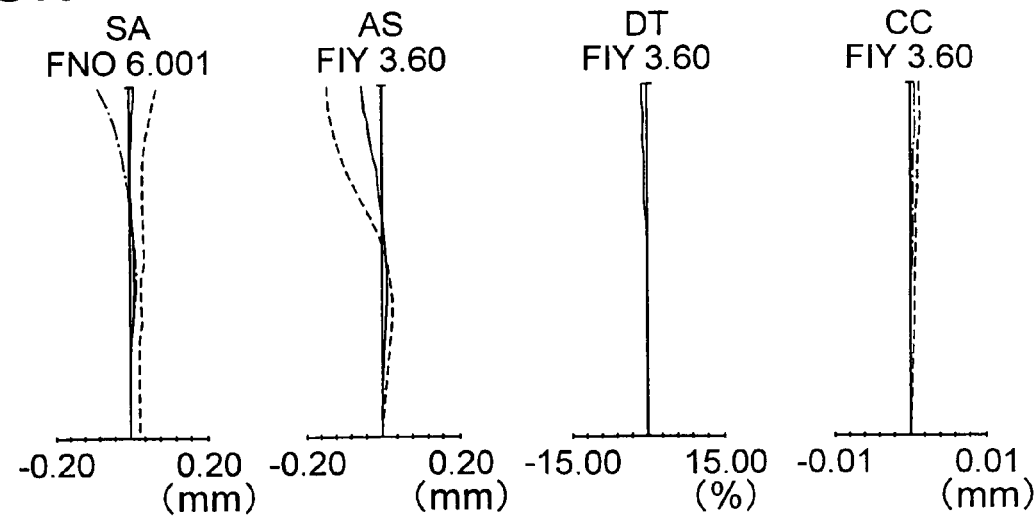
Figure 32A:
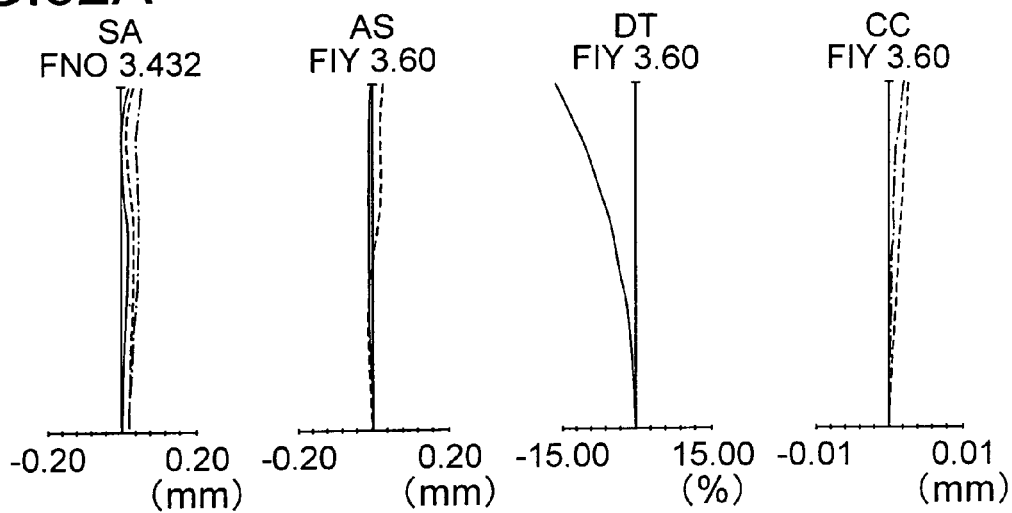
FIGS. 32A, 32B, and 32C are diagrams showing spherical aberration, astigmatism, distortion, and chromatic aberration of magnification of the zoom lens according to the fifteenth embodiment in the state in which the zoom lens is focused on an object point at infinity, where
Figure 32B:
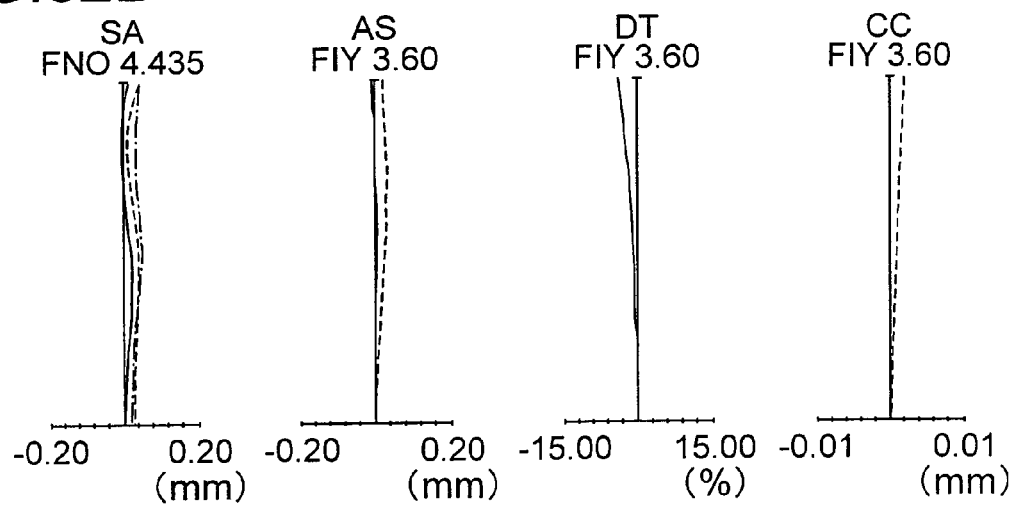
Figure 32C:
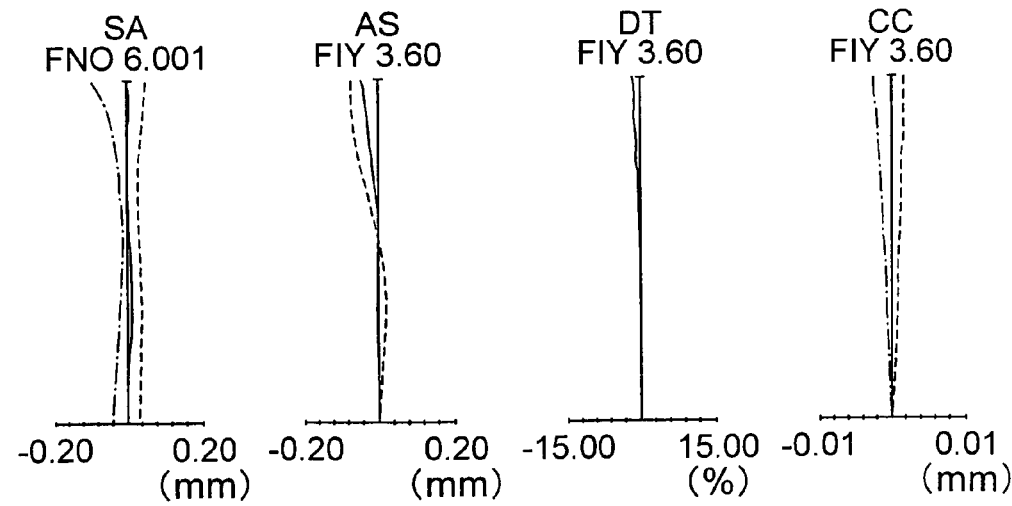
Figure 33A:
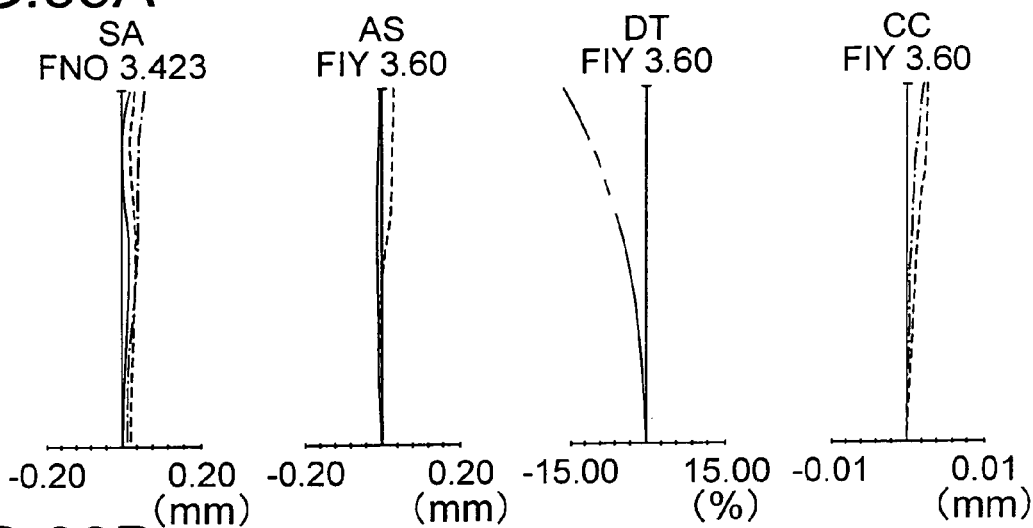
FIGS. 33A, 33B, and 33C are diagrams showing spherical aberration, astigmatism, distortion, and chromatic aberration of magnification of the zoom lens according to the sixteenth embodiment in the state in which the zoom lens is focused on an object point at infinity, where
Figure 33B:
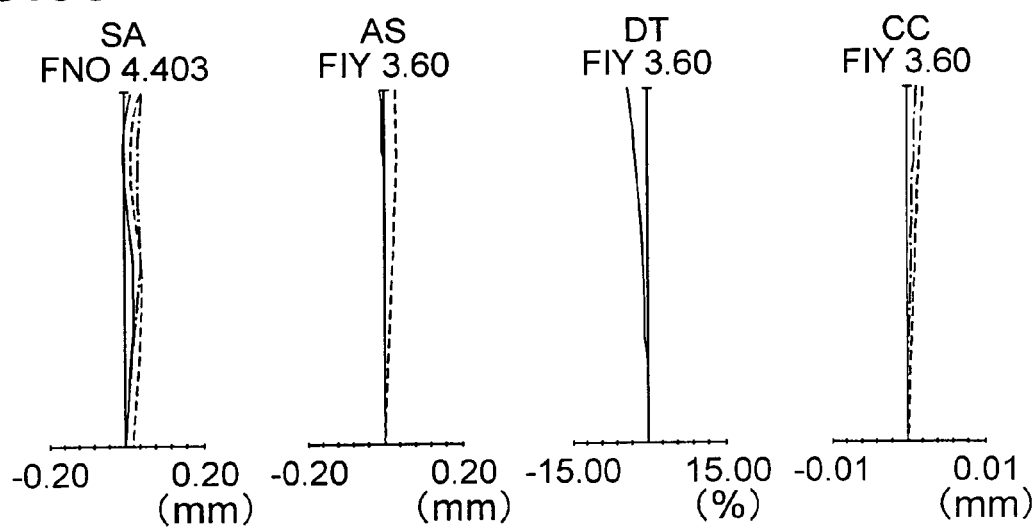
Figure 33C:
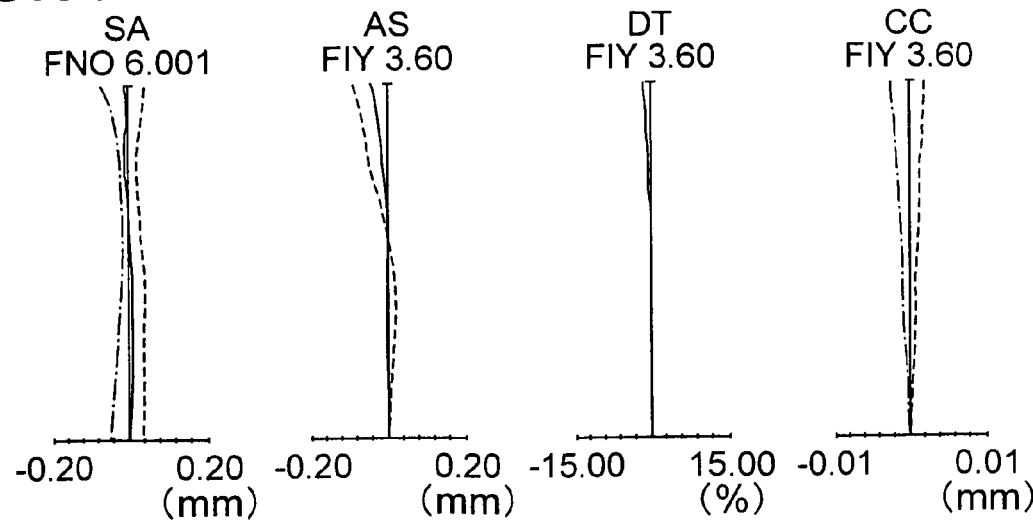
Figure 34A:
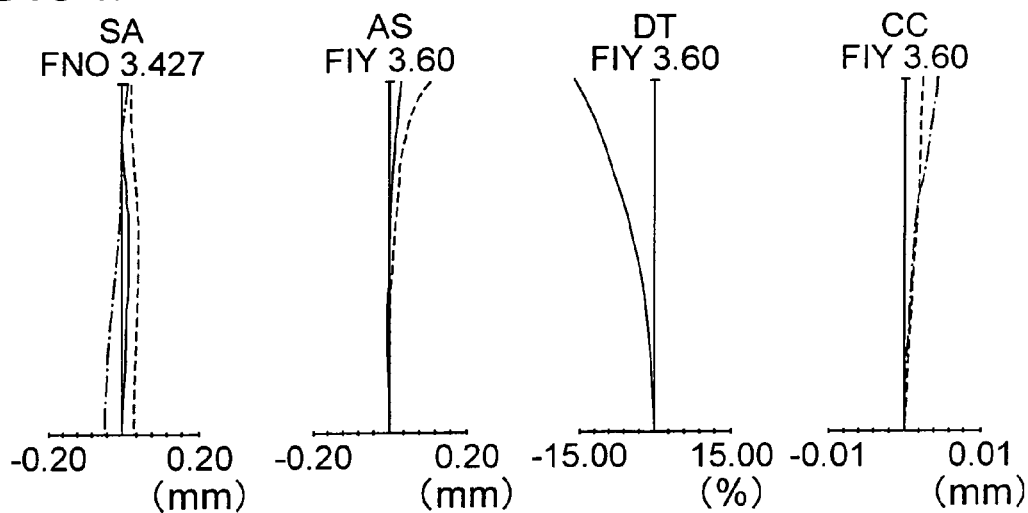
FIGS. 34A, 34B, and 34C are diagrams showing spherical aberration, astigmatism, distortion, and chromatic aberration of magnification of the zoom lens according to the seventeenth embodiment in the state in which the zoom lens is focused on an object point at infinity, where
Figure 34B:
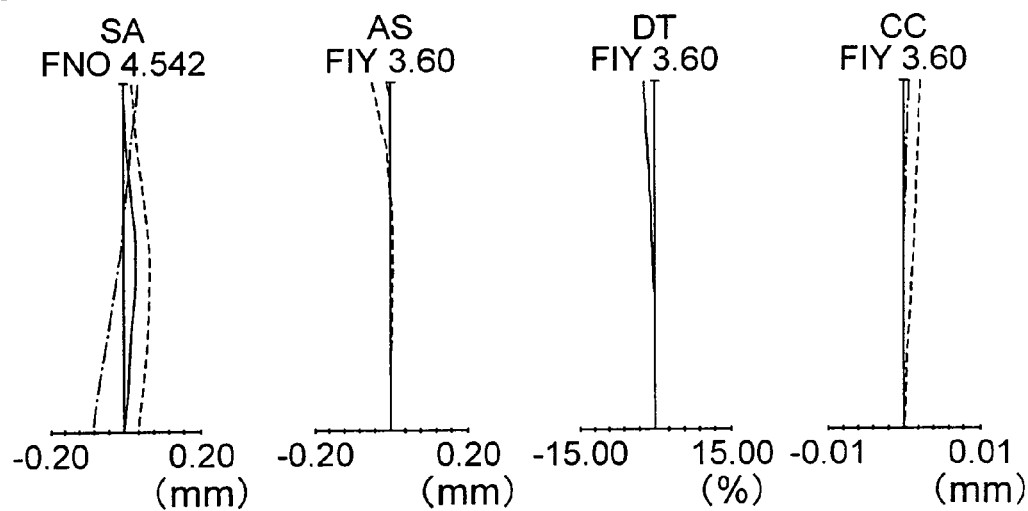
Figure 34C:
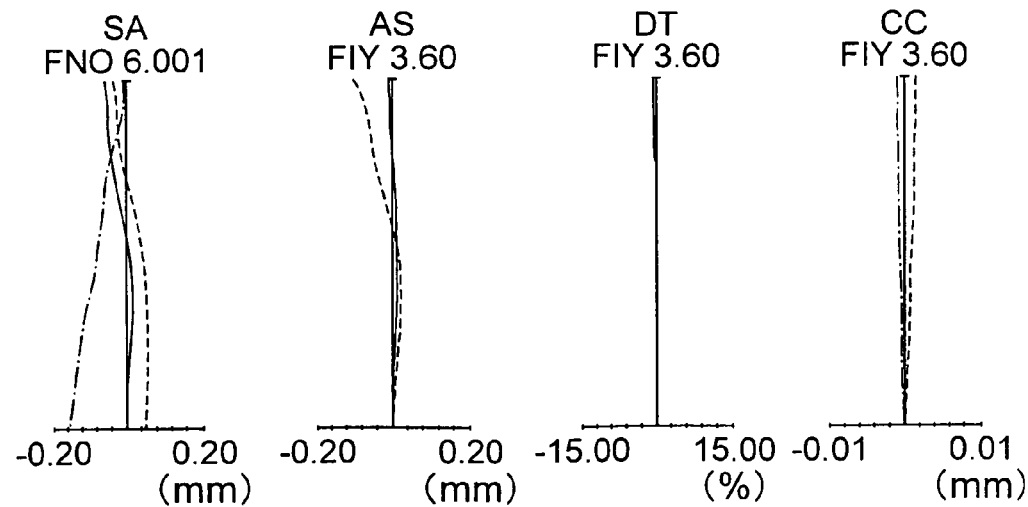

As shown in FIGS. 17A, 17B, and 17C, the zoom lens according to the seventeenth embodiment includes, in order from the object side, a first lens unit G1 having a negative refracting power, a second lens unit G2 having a negative refracting power, an aperture stop S, a third lens unit G3 having a positive refracting power, and a fourth lens unit G4 having a negative refracting power.

During zooming from the wide angle end to the telephoto end, the first lens unit G1 is kept stationary, the second unit G2 moves along a locus that is convex toward the image side, the third lens unit G3 moves toward the object side, and the fourth lens unit G4 moves along a locus that is convex toward the object side.

The first lens unit G1 is composed of a plano-concave negative lens and a prism having convex surfaces on both sides. The second lens unit G2 is composed of a cemented lens made up of a biconcave negative lens and a biconvex positive lens. The third lens unit G3 is composed of a cemented lens made up of a positive meniscus lens having a convex surface directed toward the object side, a negative meniscus lens having a convex surface directed toward the object side, and a positive meniscus lens having a convex surface directed toward the object side. The fourth lens unit G4 is composed of a negative meniscus lens having a convex surface directed toward the object side. All the lens elements in each lens unit G1, G2, G3, G4 are arranged in the mentioned order from the object side.

The following five surfaces are aspheric surfaces: the image side surface of the prism having convex surfaces on both sides in the first lens unit G1, the image side surface of the biconvex positive lens in the second lens unit G2, the object side surface of the positive meniscus lens having a convex surface directed toward the object side in the third lens unit G3, the image side surface of the positive meniscus lens having a convex surface directed toward the object side in the third lens unit G3, and the object side surface of the negative meniscus lens having a convex surface directed toward the object side in the fourth lens unit G4.

Example 1 unit mm

Surface data

| Surface No | r | d | nd | νd |
|---|---|---|---|---|
| 1* | −9.669 | 7.20 | 1.88300 | 40.76 |
| 2 | ∞ | 0.20 | | |
| 3* | 12.688 | 1.50 | 1.80610 | 40.92 |
| 4* | −462.757 | Variable | | |
| 5 | −10.258 | 0.80 | 1.88300 | 40.76 |
| 6 | 14.005 | 1.54 | 1.82114 | 24.06 |
| 7* | −34.185 | Variable | | |
| 8 (S) | ∞ | −0.50 | | |
| 9* | 4.980 | 2.30 | 1.58313 | 59.38 |
| 10 | 22.870 | 0.58 | 1.84666 | 23.78 |
| 11 | 7.514 | 2.50 | 1.59201 | 67.02 |
| 12* | −75.687 | Variable | | |
| 13* | −9.866 | 1.00 | 1.52542 | 55.78 |
| 14 | −18.904 | Variable | | |
| 15 | ∞ | 0.50 | 1.53996 | 59.45 |
| 16 | ∞ | 0.27 | | |
| 17 | ∞ | 0.50 | 1.51633 | 64.14 |
| 18 | ∞ | 0.23 | | |
| Image plane (Light receiving surface) | | | | |

Aspherical data

1st surface $K = -6.995$, $A4 = 8.86364e-05$, $A6 = -1.36794e-06$, $A8 = 9.48088e-08$, $A10 = -1.27868e-09$ 3rd surface $K = 0.000$, $A4 = -8.08906e-04$, $A6 = 4.52266e-07$, $A8 = -1.05791e-06$ 4th surface $K = 13073.884$, $A4 = -1.96823e-04$, $A6 = -1.48392e-05$, $A8 = -5.72156e-07$, $A10 = 4.81467e-09$ 7th surface $K = 0.000$, $A4 = -1.20746e-04$, $A6 = 5.92893e-06$, $A8 = -2.74132e-07$, $A10 = 1.07999e-08$ 9th surface $K = 0.000$, $A4 = -2.41925e-04$, $A6 = 4.71805e-06$, $A8 = 3.96700e-08$ 12th surface $K = 0.000$, $A4 = 1.81119e-03$, $A6 = 8.41610e-05$, $A8 = 3.96164e-07$, $A10 = 7.96156e-07$ 13th surface $K = -11.682$, $A4 = -1.68789e-03$, $A6 = 5.61511e-05$, $A8 = -4.53373e-07$, $A10 = -1.35706e-07$

-continued unit mm

Zoom data

| | WE | ST | TE |
|---|---|---|---|
| IH | 3.60 | 3.60 | 3.60 |
| Focal length | 6.46 | 10.90 | 18.61 |
| Fno. | 3.31 | 4.32 | 6.00 |
| 2ω (°) | 66.88 | 37.47 | 22.04 |
| BF | 5.95 | 10.45 | 17.51 |
| Total length | 41.46 | 41.46 | 41.46 |
| d4 | 0.60 | 3.37 | 0.60 |
| d7 | 12.57 | 5.68 | 1.50 |
| d12 | 5.22 | 4.84 | 4.72 |
| d14 | 4.79 | 9.29 | 16.35 |

Unit focal length

| f1 = −487.12 | f2 = −15.65 | f3 = 9.54 | f4 = −40.83 |
|---|---|---|---|

Example 2 unit mm

Surface data

| Surface No | r | d | nd | νd |
|---|---|---|---|---|
| 1* | −10.060 | 7.20 | 1.88300 | 40.76 |
| 2 | ∞ | 0.20 | | |
| 3* | 21.209 | 1.50 | 1.80610 | 40.92 |
| 4* | −31.550 | Variable | | |
| 5 | −11.016 | 0.80 | 1.88300 | 40.76 |
| 6 | 13.255 | 1.54 | 1.82114 | 24.06 |
| 7* | −39.143 | Variable | | |
| 8 (S) | ∞ | −0.50 | | |
| 9* | 4.970 | 2.30 | 1.58313 | 59.38 |
| 10 | 22.888 | 0.58 | 1.84666 | 23.78 |
| 11 | 7.309 | 2.50 | 1.59201 | 67.02 |
| 12* | −200.331 | Variable | | |
| 13* | −7.210 | 1.00 | 1.49700 | 81.54 |
| 14 | −11.462 | Variable | | |
| 15 | ∞ | 0.40 | 1.51633 | 64.14 |
| 16 | ∞ | 0.35 | | |
| Image plane (Light receiving surface) | | | | |

Aspherical data

1st surface $K = -5.778$, $A4 = 1.53140e-04$, $A6 = -1.85187e-06$, $A8 = 8.77509e-08$, $A10 = -1.31368e-09$ 3rd surface $K = 0.000$, $A4 = -1.04142e-03$, $A6 = -2.26093e-05$, $A8 = -1.10204e-06$ 4th surface $K = 0.000$, $A4 = -5.76267e-04$, $A6 = -2.99028e-05$, $A8 = -4.64492e-07$, $A10 = 9.30735e-09$ 7th surface $K = 0.000$, $A4 = -9.75685e-05$, $A6 = 5.99005e-06$, $A8 = -5.52928e-07$, $A10 = 2.30371e-08$ 9th surface $K = 0.000$, $A4 = -2.12306e-04$, $A6 = 1.61498e-06$, $A8 = 1.84162e-07$ 12th surface $K = 0.000$, $A4 = 1.97988e-03$, $A6 = 3.82461e-05$, $A8 = 1.14127e-05$ -continued unit mm 13th surface K = −6.478, A4 = −2.11125e−03, A6 = 9.00702e−05,
A8 = −3.77657e−06, A10 = 7.39411e−08

Zoom data

|  | WE | ST | TE |
|---|---|---|---|
| IH | 3.60 | 3.60 | 3.60 |
| Focal length | 6.46 | 10.90 | 18.61 |
| FNO. | 3.22 | 4.26 | 6.00 |
| 2ω (°) | 66.79 | 37.67 | 22.10 |
| BF | 1.52 | 6.69 | 14.32 |
| Total length | 40.75 | 40.75 | 40.75 |
| d4 | 0.60 | 3.29 | 0.60 |
| d7 | 12.14 | 5.60 | 1.50 |
| d12 | 9.38 | 8.05 | 7.22 |
| d14 | 0.90 | 6.08 | 13.70 |

Unit focal length

| f1 = −1001.62 | f2 = −16.19 | f3 = 9.88 | f4 = −42.42 |
|---|---|---|---|

Example 3 unit mm

Surface data

| Surface No | r | d | nd | vd |
|---|---|---|---|---|
| 1* | −10.666 | 7.20 | 1.88300 | 40.76 |
| 2 | ∞ | 0.20 |  |  |
| 3* | 42.875 | 1.50 | 1.80610 | 40.92 |
| 4* | −19.626 | Variable |  |  |
| 5 | −10.516 | 0.80 | 1.88300 | 40.76 |
| 6 | 13.808 | 1.54 | 1.82114 | 24.06 |
| 7* | −33.671 | Variable |  |  |
| 8 (S) | ∞ | −0.50 |  |  |
| 9* | 5.114 | 2.30 | 1.58313 | 59.38 |
| 10 | 23.448 | 0.58 | 1.84666 | 23.78 |
| 11 | 7.427 | 2.50 | 1.59201 | 67.02 |
| 12* | −100.639 | Variable |  |  |
| 13 | 59.530 | 1.00 | 1.49700 | 81.54 |
| 14 | −56.357 | 0.70 |  |  |
| 15* | −9.457 | 1.20 | 1.49700 | 81.54 |
| 16 | −54.366 | Variable |  |  |
| 17 | ∞ | 0.40 | 1.51633 | 64.14 |
| 18 | ∞ | 0.32 |  |  |
| Image plane (Light receiving surface) |  |  |  |  |

Aspherical data

1st surface

K = −5.642, A4 = 1.74468e−04, A6 = −9.25278e−07, A8 = 3.88088e−08,
A10 = −7.40724e−10
3rd surface K = 0.000, A4 = −1.27036e−03, A6 = −3.11260e−05,
A8 = −8.83439e−07
4th surface K = 0.000, A4 = −8.02474e−04, A6 = −3.16970e−05,
A8 = −9.15728e−08, A10 = 1.44356e−09

-continued unit mm

7th surface

K = 0.000, A4 = −8.79701e−05, A6 = 1.93385e−06, A8 = −2.39948e−07,
A10 = 1.33126e−08
9th surface K = 0.000, A4 = −1.80618e−04, A6 = 4.46534e−07, A8 = 3.40266e−07
12th surface K = 0.000, A4 = 1.77865e−03, A6 = 3.53295e−05, A8 = 8.80257e−06
15th surface K = −11.971, A4 = −1.77410e−03, A6 = 9.02388e−05,
A8 = −4.31984e−06, A10 = 9.59109e−08

Zoom data

|  | WE | ST | TE |
|---|---|---|---|
| IH | 3.60 | 3.60 | 3.60 |
| Focal length | 6.46 | 10.90 | 18.61 |
| FNO. | 3.18 | 4.24 | 6.00 |
| 2ω (°) | 66.74 | 37.66 | 22.10 |
| BF | 1.62 | 6.90 | 14.52 |
| Total length | 41.08 | 41.08 | 41.08 |
| d4 | 0.60 | 3.23 | 0.60 |
| d7 | 11.82 | 5.51 | 1.50 |
| d12 | 8.02 | 6.42 | 5.44 |
| D16 | 1.03 | 6.31 | 13.93 |

Unit focal length

| f1 = −1000.03 | f2 = −16.25 | f3 = 10.01 | f4 = −39.56 |
|---|---|---|---|

Example 4 unit mm

Surface data

| Surface No | r | d | nd | vd |
|---|---|---|---|---|
| 1* | −11.115 | 7.40 | 1.90366 | 31.32 |
| 2 | ∞ | 0.40 |  |  |
| 3* | 128.034 | 1.50 | 1.75520 | 27.51 |
| 4* | −17.211 | Variable |  |  |
| 5 | −10.244 | 0.80 | 1.88300 | 40.76 |
| 6 | 18.146 | 1.54 | 1.82114 | 24.06 |
| 7* | −26.128 | Variable |  |  |
| 8 (S) | ∞ | −0.50 |  |  |
| 9* | 5.441 | 2.30 | 1.58313 | 59.38 |
| 10 | 35.722 | 0.58 | 1.84666 | 23.78 |
| 11 | 8.821 | 2.50 | 1.59201 | 67.02 |
| 12* | −84.061 | Variable |  |  |
| 13 | 74.330 | 1.60 | 1.49700 | 81.54 |
| 14 | −9.800 | 0.70 |  |  |
| 15* | −6.800 | 0.60 | 1.53996 | 59.46 |
| 16 | 1315.793 | Variable |  |  |
| 17 | ∞ | 0.86 | 1.53996 | 59.45 |
| 18 | ∞ | 0.27 |  |  |
| 19 | ∞ | 0.50 | 1.51633 | 64.14 |
| 20 | ∞ | 0.36 |  |  |
| Image plane (Light receiving surface) |  |  |  |  |

Aspherical data

1st surface

K = −6.463, A4 = 1.14372e−04, A6 = 1.27139e−06, A8 = 7.72338e−09,
A10 = −5.79803e−10

-continued unit mm

3rd surface

K = 0.000, A4 = −1.56736e−03, A6 = −3.43864e−05,
A8 = −1.16280e−06

4th surface

K = 0.000, A4 = −1.05374e−03, A6 = −3.06515e−05,
A8 = −2.23376e−07, A10 = 3.46638e−09

7th surface

K = 0.000, A4 = −5.65781e−05, A6 = 5.12392e−07,
A8 = −1.28807e−07, A10 = 9.30988e−09

9th surface

K = 0.000, A4 = −1.19217e−04, A6 = 9.45301e−07, A8 = 3.71159e−07

12th surface

K = 0.000, A4 = 1.46563e−03, A6 = 2.40652e−05, A8 = 5.48591e−06

15th surface

K = −7.143, A4 = −2.70642e−03, A6 = 1.40791e−04,
A8 = −7.41075e−06, A10 = 1.86143e−07

Zoom data

|  | WE | ST | TE |
|---|---|---|---|
| IH | 3.60 | 3.60 | 3.60 |
| Focal length | 6.46 | 10.90 | 18.61 |
| FNO. | 3.24 | 4.32 | 6.00 |
| 2ω (°) | 66.83 | 37.78 | 22.13 |
| BF | 4.42 | 9.85 | 17.19 |
| Total length | 43.13 | 43.13 | 43.13 |
| d4 | 0.60 | 3.43 | 0.60 |
| d7 | 12.51 | 5.51 | 1.50 |
| d12 | 6.18 | 4.92 | 4.41 |
| d16 | 2.90 | 8.33 | 15.67 |

Unit focal length

| f1 = −87.54 | f2 = −18.26 | f3 = 10.55 | f4 = −52.58 |
|---|---|---|---|

Example 5 unit mm

Surface data

| Surface No | r | d | nd | vd |
|---|---|---|---|---|
| 1* | −11.583 | 7.40 | 1.90366 | 31.32 |
| 2 | ∞ | 0.40 |  |  |
| 3* | −436.681 | 1.50 | 1.75520 | 27.51 |
| 4* | −14.913 | Variable |  |  |
| 5 | −10.244 | 0.80 | 1.88300 | 40.76 |
| 6 | 20.030 | 1.54 | 1.82114 | 24.06 |
| 7* | −25.471 | Variable |  |  |
| 8 (S) | ∞ | −0.50 |  |  |
| 9* | 5.440 | 2.30 | 1.58313 | 59.38 |
| 10 | 36.600 | 0.58 | 1.84666 | 23.78 |
| 11 | 8.535 | 2.50 | 1.59201 | 67.02 |
| 12* | −34.209 | Variable |  |  |
| 13 | −61.840 | 1.60 | 1.49700 | 81.54 |
| 14 | −16.411 | 0.70 |  |  |
| 15* | −7.459 | 0.60 | 1.53996 | 59.46 |
| 16 | −58.332 | Variable |  |  |
| 17 | ∞ | 0.40 | 1.51633 | 64.14 |
| 18 | ∞ | 0.34 |  |  |
| Image plane (Light receiving surface) |  |  |  |  |

-continued unit mm

Aspherical data

1st surface

K = −7.120, A4 = 6.91729e−05, A6 = 3.81177e−07, A8 = 8.49052e−08,
A10 = −1.93952e−09

3rd surface

K = 0.000, A4 = −1.64212e−03, A6 = −3.39862e−05,
A8 = −1.11973e−06

4th surface

K = 0.000, A4 = −1.12011e−03, A6 = −2.95328e−05,
A8 = −4.30068e−08, A10 = −3.29865e−09

7th surface

K = 0.000, A4 = −5.13040e−05, A6 = −1.65894e−06, A8 = 1.31797e−08,
A10 = 8.57360e−09

9th surface

K = 0.000, A4 = −1.71801e−04, A6 = −7.56342e−07, A8 = 5.13068e−07

12th surface

K = 0.000, A4 = 1.37457e−03, A6 = 1.95338e−05, A8 = 5.13111e−06

15th surface

K = −8.443, A4 = −2.51401e−03, A6 = 1.13928e−04,
A8 = −4.62845e−06, A10 = 5.61581e−09

Zoom data

|  | WE | ST | TE |
|---|---|---|---|
| IH | 3.60 | 3.60 | 3.60 |
| Focal length | 6.46 | 10.90 | 18.61 |
| FNO. | 3.09 | 4.23 | 6.00 |
| 2ω (°) | 66.63 | 37.64 | 22.07 |
| BF | 2.04 | 6.99 | 14.02 |
| Total length | 41.13 | 41.13 | 41.13 |
| d4 | 0.60 | 3.14 | 0.60 |
| d7 | 11.48 | 5.26 | 1.50 |
| d12 | 7.60 | 6.32 | 5.59 |
| d16 | 1.43 | 6.38 | 13.42 |

Unit focal length

| f1 = −107.88 | f2 = −18.68 | f3 = 9.93 | f4 = −25.00 |
|---|---|---|---|

Example 6 unit mm

Surface data

| Surface No | r | d | nd | vd |
|---|---|---|---|---|
| 1 | ∞ | 0.70 | 1.85135 | 40.10 |
| 2* | 8.726 | 1.27 |  |  |
| 3 | ∞ | 6.10 | 1.88300 | 40.76 |
| 4 | ∞ | 0.20 |  |  |
| 5* | 39.249 | 1.50 | 1.80139 | 45.45 |
| 6* | −20.113 | Variable |  |  |
| 7 | −14.379 | 0.80 | 1.88300 | 40.76 |
| 8 | 10.498 | 1.54 | 1.82114 | 24.06 |
| 9* | −115.856 | Variable |  |  |
| 10 (S) | ∞ | −0.50 |  |  |
| 11* | 5.585 | 2.30 | 1.58313 | 59.38 |
| 12 | 6.528 | 0.60 | 1.84666 | 23.78 |
| 13 | 4.297 | 2.50 | 1.59201 | 67.02 |
| 14* | −231.788 | Variable |  |  |
| 15* | −37.172 | 1.00 | 1.52542 | 55.78 |

-continued unit mm

| | | | | |
|---|---|---|---|---|
| 16 | −3936.644 | Variable | | |
| 17 | ∞ | 0.50 | 1.53996 | 59.45 |
| 18 | ∞ | 0.27 | | |
| 19 | ∞ | 0.50 | 1.51633 | 64.14 |
| 20 | ∞ | 0.24 | | |
| Image plane (Light receiving surface) | | | | |

Aspherical data

2nd surface

K = −0.322, A4 = 5.65948e−05, A6 = 4.01499e−06, A8 = −2.16394e−07, A10 = 4.03005e−09

5th surface

K = 0.000, A4 = −2.48024e−04, A6 = −7.10601e−06, A8 = −1.45377e−06

6th surface

K = 20.718, A4 = −4.65244e−05, A6 = 1.26188e−05, A8 = −2.70762e−06, A10 = 1.11238e−07

9th surface

K = 0.000, A4 = 5.80216e−06, A6 = 3.86474e−08, A8 = 1.43464e−08, A10 = 1.16997e−09

11th surface

K = 0.000, A4 = −6.65874e−05, A6 = 5.13875e−06, A8 = −4.60090e−08

14th surface

K = 0.000, A4 = 1.23863e−03, A6 = 2.47834e−05, A8 = 5.00000e−06

15th surface

K = 0.000, A4 = −1.14790e−04, A6 = 3.62905e−05, A8 = −4.29689e−06, A10 = 1.89880e−07

Zoom data

| | WE | ST | TE |
|---|---|---|---|
| IH | 3.60 | 3.60 | 3.60 |
| Focal length | 6.46 | 10.90 | 18.61 |
| FNO. | 3.45 | 4.46 | 6.00 |
| 2ω (°) | 66.94 | 37.81 | 22.05 |
| BF | 10.16 | 13.51 | 12.85 |
| Total length | 46.64 | 46.64 | 46.64 |
| d6 | 0.40 | 3.35 | 1.58 |
| d9 | 14.41 | 6.73 | 1.80 |
| d14 | 3.66 | 5.05 | 12.41 |
| d16 | 8.99 | 12.35 | 11.69 |

Unit focal length

| f1 = −135.45 | f2 = −16.73 | f3 = 10.78 | f4 = −71.43 |
|---|---|---|---|

Example 7 unit mm

Surface data

| Surface No | r | d | nd | vd |
|---|---|---|---|---|
| 1 | ∞ | 0.70 | 1.90366 | 31.32 |
| 2* | 9.474 | 1.30 | | |
| 3 | ∞ | 6.10 | 1.88300 | 40.80 |
| 4 | ∞ | 0.20 | | |
| 5* | 214.997 | 1.37 | 1.80139 | 45.45 |
| 6* | −15.441 | Variable | | |
| 7 | −14.080 | 0.70 | 1.89800 | 34.01 |
| 8 | −23.787 | 0.30 | | |
| 9 | −46.122 | 0.70 | 1.88300 | 40.76 |
| 10 | 7.919 | 1.54 | 1.82114 | 24.06 |
| 11* | 730.111 | Variable | | |

-continued unit mm

| | | | | |
|---|---|---|---|---|
| 12 (S) | ∞ | −0.50 | | |
| 13* | 6.342 | 2.34 | 1.88300 | 40.80 |
| 14* | 8.000 | 1.00 | | |
| 15 | 16.989 | 2.66 | 1.60738 | 56.81 |
| 16 | −5.076 | 0.60 | 1.92286 | 20.88 |
| 17 | −10.130 | Variable | | |
| 18* | −4.872 | 2.00 | 1.49700 | 81.54 |
| 19 | −7.000 | Variable | | |
| 20 | ∞ | 0.40 | 1.51633 | 64.14 |
| 21 | ∞ | 0.35 | | |
| Image plane (Light receiving surface) | | | | |

Aspherical data

2nd surface

K = 0.235, A4 = 1.93221e−04, A6 = 3.57769e−06, A8 = 3.77560e−07, A10 = −1.36353e−08

5th surface

K = 0.000, A4 = 4.74769e−04, A6 = 4.43554e−07, A8 = 9.55336e−07

6th surface

K = 0.000, A4 = 3.03478e−04, A6 = −5.80636e−06, A8 = 1.15211e−06

11th surface

K = 0.000, A4 = −8.91666e−05, A6 = 1.03333e−05, A8 = −8.97361e−07, A10 = 3.17188e−08

13th surface

K = 0.000, A4 = 2.27107e−04, A6 = 2.64978e−06, A8 = 8.96538e−07

14th surface

K = 0.000, A4 = 9.16289e−04, A6 = 2.65625e−06, A8 = 3.86325e−06, A10 = 3.51954e−09

18th surface

K = 0.000, A4 = 3.14352e−04, A6 = −1.45033e−05, A8 = 4.52807e−06, A10 = −2.48295e−07

Zoom data

| | WE | ST | TE |
|---|---|---|---|
| IH | 3.60 | 3.60 | 3.60 |
| Focal length | 6.46 | 10.90 | 18.70 |
| FNO. | 3.42 | 4.41 | 6.00 |
| 2ω (°) | 68.46 | 38.40 | 22.14 |
| BF | 1.76 | 6.04 | 12.38 |
| Total length | 45.78 | 45.78 | 45.78 |
| d6 | 0.40 | 3.46 | 0.50 |
| d11 | 12.74 | 4.99 | 0.60 |
| d17 | 9.88 | 10.29 | 11.30 |
| d19 | 1.15 | 5.43 | 11.76 |

Unit focal length

| f1 = −90.35 | f2 = −18.42 | f3 = 10.67 | f4 = −46.86 |
|---|---|---|---|

Example 8 unit mm

Surface data

| Surface No | r | d | nd | vd |
|---|---|---|---|---|
| 1 | ∞ | 0.70 | 1.90366 | 31.32 |
| 2* | 9.319 | 1.30 | | |
| 3 | ∞ | 6.10 | 1.88300 | 40.80 |
| 4 | ∞ | 0.20 | | |
| 5* | 76.833 | 1.37 | 1.80139 | 45.45 |
| 6* | −19.455 | Variable | | |

-continued unit mm

| | | | | |
|---|---|---|---|---|
| 7 | −13.947 | 0.70 | 1.89800 | 34.01 |
| 8 | −23.872 | 0.30 | | |
| 9 | −61.238 | 0.70 | 1.88300 | 40.76 |
| 10 | 7.884 | 1.54 | 1.82114 | 24.06 |
| 11* | 1064.449 | Variable | | |
| 12 (S) | ∞ | −0.50 | | |
| 13* | 6.337 | 2.34 | 1.88300 | 40.80 |
| 14* | 8.032 | 1.00 | | |
| 15 | 16.358 | 2.66 | 1.60738 | 56.81 |
| 16 | −5.076 | 0.60 | 1.92286 | 20.88 |
| 17 | −10.232 | Variable | | |
| 18* | −4.811 | 3.00 | 1.49700 | 81.54 |
| 19 | −7.000 | Variable | | |
| 20 | ∞ | 0.50 | 1.51633 | 64.14 |
| 21 | ∞ | 0.36 | | |
| Image plane (Light receiving surface) | | | | |

Aspherical data

2nd surface

K = −0.130, A4 = 1.49423e−04, A6 = 3.98047e−06, A8 = 2.85983e−07, A10 = −1.22151e−08

5th surface

K = 0.000, A4 = 4.31902e−04, A6 = 1.03352e−06, A8 = 6.40435e−07

6th surface

K = 0.000, A4 = 3.01985e−04, A6 = −5.22165e−06, A8 = 8.38311e−07

11th surface

K = 0.000, A4 = −9.15326e−05, A6 = 1.09818e−05, A8 = −8.91733e−07, A10 = 3.13179e−08

13th surface

K = 0.000, A4 = 2.19372e−04, A6 = 2.60634e−06, A8 = 8.86538e−07

14th surface

K = 0.000, A4 = 9.02367e−04, A6 = 5.48721e−07, A8 = 3.95804e−06, A10 = −2.56278e−09

18th surface

K = 0.000, A4 = 1.39268e−04, A6 = −8.05906e−06, A8 = 2.76445e−06, A10 = −1.57684e−07

Zoom data

| | WE | ST | TE |
|---|---|---|---|
| IH | 3.60 | 3.60 | 3.60 |
| Focal length | 6.46 | 10.90 | 18.70 |
| FNO. | 3.49 | 4.49 | 6.00 |
| 2ω (°) | 67.85 | 38.22 | 22.08 |
| BF | 1.68 | 6.42 | 12.58 |
| Total length | 46.71 | 46.71 | 46.71 |
| d6 | 0.40 | 3.58 | 0.50 |
| d11 | 13.39 | 5.05 | 0.61 |
| d17 | 9.24 | 9.66 | 11.01 |
| d19 | 0.99 | 5.73 | 11.89 |

Unit focal length

| | | | |
|---|---|---|---|
| f1 = −52.45 | f2 = −20.08 | f3 = 10.58 | f4 = −56.78 |

Example 9 unit mm

Surface data

| Surface No | r | d | nd | vd |
|---|---|---|---|---|
| 1 | ∞ | 0.70 | 1.90366 | 31.32 |
| 2* | 9.671 | 1.30 | | |
| 3 | ∞ | 6.10 | 1.88300 | 40.80 |
| 4 | ∞ | 0.20 | | |
| 5* | 49.879 | 1.50 | 1.80139 | 45.45 |
| 6* | −19.966 | Variable | | |
| 7 | −17.951 | 0.80 | 1.88300 | 40.76 |
| 8 | 8.378 | 1.54 | 1.82114 | 24.06 |
| 9* | −305.609 | Variable | | |
| 10 (S) | ∞ | −0.50 | | |
| 11* | 6.506 | 2.30 | 1.88300 | 40.80 |
| 12* | 8.000 | 1.00 | | |
| 13 | 16.763 | 2.50 | 1.60738 | 56.81 |
| 14 | −5.076 | 0.60 | 1.92286 | 20.88 |
| 15 | −9.625 | Variable | | |
| 16* | −4.863 | 1.00 | 1.49700 | 81.54 |
| 17 | −7.000 | Variable | | |
| 18 | ∞ | 0.50 | 1.53996 | 59.45 |
| 19 | ∞ | 0.27 | | |
| 20 | ∞ | 0.40 | 1.51633 | 64.14 |
| 21 | ∞ | 0.31 | | |
| Image plane (Light receiving surface) | | | | |

Aspherical data

2nd surface

K = 0.024, A4 = 1.70072e−04, A6 = 5.04323e−06, A8 = 1.47597e−07, A10 = −1.76747e−09

5th surface

K = 0.000, A4 = 3.90268e−04, A6 = −9.13537e−06, A8 = 1.67246e−06

6th surface

K = 0.000, A4 = 2.39852e−04, A6 = −1.57725e−05, A8 = 1.97072e−06

9th surface

K = 0.000, A4 = −6.51307e−05, A6 = 1.28635e−05, A8 = −1.34323e−06, A10 = 5.12631e−08

11th surface

K = 0.000, A4 = 1.41690e−04, A6 = 2.43034e−06, A8 = 6.60052e−07

12th surface

K = 0.000, A4 = 7.51383e−04, A6 = −4.90855e−06, A8 = 3.96495e−06, A10 = −8.30497e−08

16th surface

K = 0.000, A4 = 3.49376e−04, A6 = 3.80029e−07, A8 = 1.98719e−06, A10 = −5.63213e−08

Zoom data

| | WE | ST | TE |
|---|---|---|---|
| IH | 3.60 | 3.60 | 3.60 |
| Focal length | 6.46 | 10.90 | 18.70 |
| FNO. | 3.37 | 4.36 | 6.00 |
| 2ω (°) | 68.05 | 38.25 | 22.11 |
| BF | 2.18 | 5.90 | 12.14 |
| Total length | 44.11 | 44.11 | 44.11 |
| d6 | 0.40 | 3.66 | 0.99 |
| d9 | 12.29 | 4.78 | 0.60 |
| d15 | 10.20 | 10.73 | 11.34 |
| d17 | 1.01 | 4.73 | 10.97 |

-continued unit mm

Unit focal length f1 = −100.00    f2 = −18.57    f3 = 10.61    f4 = −37.94

Example 10 unit mm

Surface data

| Surface No | r | d | nd | vd |
|---|---|---|---|---|
| 1 | ∞ | 0.70 | 1.88300 | 40.76 |
| 2 | 9.353 | 1.18 | | |
| 3 | ∞ | 6.50 | 1.88300 | 40.76 |
| 4 | ∞ | 0.20 | | |
| 5* | 54.585 | 1.50 | 1.80610 | 40.92 |
| 6* | −21.467 | Variable | | |
| 7 | −15.367 | 0.80 | 1.88300 | 40.76 |
| 8 | 11.186 | 1.54 | 1.82114 | 24.06 |
| 9* | −108.680 | Variable | | |
| 10 (S) | ∞ | −0.50 | | |
| 11* | 5.595 | 2.30 | 1.58313 | 59.38 |
| 12 | 8.264 | 0.60 | 1.84666 | 23.78 |
| 13 | 4.944 | 2.50 | 1.59201 | 67.02 |
| 14* | −285.753 | Variable | | |
| 15* | −13.834 | 1.00 | 1.52542 | 55.78 |
| 16 | −18.397 | Variable | | |
| 17 | ∞ | 0.50 | 1.53996 | 59.45 |
| 18 | ∞ | 0.27 | | |
| 19 | ∞ | 0.50 | 1.51633 | 64.14 |
| 20 | ∞ | 0.24 | | |
| Image plane (Light receiving surface) | | | | |

Aspherical data

5th surface

K = 0.000, A4 = −1.95494e−04, A6 = −2.35465e−05,
A8 = −5.44605e−07
6th surface

K = 24.418, A4 = 4.24267e−05, A6 = −7.20819e−06,
A8 = −1.31597e−06, A10 = 9.20504e−08
9th surface K = 0.000, A4 = −3.04196e−05, A6 = 8.34662e−06, A8 = −8.84818e−07,
A10 = 3.58403e−08
11th surface K = 0.000, A4 = −7.59773e−05, A6 = 7.56590e−06, A8 = −1.00701e−07
14th surface K = 0.000, A4 = 1.28869e−03, A6 = 3.25747e−05, A8 = 5.00000e−06
15th surface K = 0.000, A4 = −1.76067e−04, A6 = 6.45703e−05, A8 = −8.47416e−06,
A10 = 4.24595e−07

Zoom data

| | WE | ST | TE |
|---|---|---|---|
| IH | 3.60 | 3.60 | 3.60 |
| Focal length | 6.46 | 10.90 | 18.61 |
| FNO. | 3.43 | 4.45 | 6.00 |
| 2ω (°) | 67.05 | 37.90 | 22.11 |
| BF | 9.06 | 11.14 | 10.66 |
| Total length | 46.84 | 46.84 | 46.84 |
| d6 | 0.40 | 3.35 | 0.50 |

-continued unit mm

| | | | |
|---|---|---|---|
| d9 | 14.02 | 6.17 | 1.80 |
| d14 | 5.04 | 7.86 | 15.56 |
| d16 | 7.90 | 9.97 | 9.50 |

Unit focal length f1 = −62.73    f2 = −18.19    f3 = 10.97    f4 = −114.82

Example 11 unit mm

Surface data

| Surface No | r | d | nd | vd |
|---|---|---|---|---|
| 1 | ∞ | 0.70 | 1.88300 | 40.76 |
| 2 | 9.112 | 1.21 | | |
| 3 | ∞ | 6.10 | 1.88300 | 40.76 |
| 4 | ∞ | 0.20 | | |
| 5* | 43.613 | 1.50 | 1.80610 | 40.92 |
| 6* | −20.721 | Variable | | |
| 7 | −14.328 | 0.80 | 1.88300 | 40.76 |
| 8 | 12.319 | 1.54 | 1.82114 | 24.06 |
| 9* | −94.067 | Variable | | |
| 10 (S) | ∞ | −0.50 | | |
| 11* | 5.609 | 2.30 | 1.58313 | 59.38 |
| 12 | 6.847 | 0.60 | 1.84666 | 23.78 |
| 13 | 4.464 | 2.50 | 1.59201 | 67.02 |
| 14* | −248.323 | Variable | | |
| 15* | −37.147 | 1.00 | 1.52542 | 55.78 |
| 16 | −3936.644 | Variable | | |
| 17 | ∞ | 0.50 | 1.53996 | 59.45 |
| 18 | ∞ | 0.27 | | |
| 19 | ∞ | 0.50 | 1.51633 | 64.14 |
| 20 | ∞ | 0.24 | | |
| Image plane (Light receiving surface) | | | | |

Aspherical data

5th surface

K = 0.000, A4 = −2.15101e−04, A6 = −1.73342e−05,
A8 = −7.70234e−07
6th surface

K = 22.501, A4 = −9.99274e−06, A6 = 4.36337e−06,
A8 = −2.12295e−06, A10 = 1.12329e−07
9th surface K = 0.000, A4 = 4.41280e−06, A6 = 1.64793e−06, A8 = −1.68116e−07,
A10 = 8.31726e−09
11th surface K = 0.000, A4 = −6.97115e−05, A6 = 5.91045e−06, A8 = −5.27998e−08
14th surface K = 0.000, A4 = 1.24098e−03, A6 = 2.63151e−05, A8 = 5.00000e−06
15th surface K = 0.000, A4 = −1.48264e−04, A6 = 4.56530e−05, A8 = −5.99304e−06,
A10 = 2.96418e−07

Zoom data

| | WE | ST | TE |
|---|---|---|---|
| IH | 3.60 | 3.60 | 3.60 |
| Focal length | 6.46 | 10.93 | 18.61 |
| FNO. | 3.45 | 4.48 | 6.00 |

-continued

| unit mm | | | |
|---|---|---|---|
| 2ω (°) | 66.99 | 37.70 | 22.05 |
| BF | 10.16 | 13.23 | 12.25 |
| Total length | 46.81 | 46.81 | 46.81 |
| d6 | 0.40 | 3.50 | 1.68 |
| d9 | 14.56 | 6.66 | 1.80 |
| d14 | 3.74 | 5.46 | 13.13 |
| d16 | 9.00 | 12.07 | 11.08 |

| Unit focal length | | | |
|---|---|---|---|
| f1 = −87.91 | f2 = −17.44 | f3 = 10.83 | f4 = −71.38 |

Example 12

| unit mm | | | |
|---|---|---|---|
| Surface data | | | |
| Surface No | r | d | nd | vd |
|---|---|---|---|---|
| 1 | ∞ | 0.70 | 1.88300 | 40.76 |
| 2 | 9.032 | 1.22 | | |
| 3 | ∞ | 6.10 | 1.88300 | 40.76 |
| 4 | ∞ | 0.20 | | |
| 5* | 41.629 | 1.50 | 1.80139 | 45.45 |
| 6* | −19.789 | Variable | | |
| 7 | −14.224 | 0.80 | 1.88300 | 40.76 |
| 8 | 11.048 | 1.54 | 1.82114 | 24.06 |
| 9* | −98.307 | Variable | | |
| 10 (S) | ∞ | −0.50 | | |
| 11* | 5.593 | 2.30 | 1.58313 | 59.38 |
| 12 | 6.682 | 0.60 | 1.84666 | 23.78 |
| 13 | 4.377 | 2.50 | 1.59201 | 67.02 |
| 14* | −301.863 | Variable | | |
| 15* | −36.896 | 1.00 | 1.52542 | 55.78 |
| 16 | −3936.644 | Variable | | |
| 17 | ∞ | 0.50 | 1.53996 | 59.45 |
| 18 | ∞ | 0.27 | | |
| 19 | ∞ | 0.50 | 1.51633 | 64.14 |
| 20 | ∞ | 0.23 | | |
| Image plane (Light receiving surface) | | | | |

Aspherical data

5th surface

K = 0.000, A4 = −2.51545e−04, A6 = −1.39542e−05,
A8 = −1.03098e−06
6th surface

K = 20.180, A4 = −3.60247e−05, A6 = 8.08672e−06,
A8 = −2.36692e−06, A10 = 1.12404e−07
9th surface K = 0.000, A4 = 4.00371e−06, A6 = 4.88468e−07, A8 = −7.59255e−08,
A10 = 5.60939e−09
11th surface K = 0.000, A4 = −6.71385e−05, A6 = 5.65756e−06, A8 = −5.44207e−08
14th surface K = 0.000, A4 = 1.24426e−03, A6 = 2.67466e−05, A8 = 5.00000e−06
15th surface K = 0.000, A4 = −1.29666e−04, A6 = 3.85564e−05, A8 = −4.52432e−06,
A10 = 1.98277e−07

| unit mm | | | |
|---|---|---|---|
| Zoom data | | | |
| | WE | ST | TE |
| IH | 3.60 | 3.60 | 3.60 |
| Focal length | 6.46 | 10.90 | 18.61 |
| FNO. | 3.46 | 4.47 | 6.00 |
| 2ω (°) | 66.98 | 37.78 | 22.05 |
| BF | 10.16 | 13.24 | 12.43 |
| Total length | 46.84 | 46.84 | 46.84 |
| d6 | 0.40 | 3.54 | 1.81 |
| d9 | 14.62 | 6.77 | 1.80 |
| d14 | 3.70 | 5.34 | 12.85 |
| d16 | 9.01 | 12.08 | 11.27 |

| Unit focal length | | | |
|---|---|---|---|
| f1 = −118.68 | f2 = −17.02 | f3 = 10.84 | f4 = −70.89 |

Example 13

| unit mm | | | |
|---|---|---|---|
| Surface data | | | |
| Surface No | r | d | nd | vd |
|---|---|---|---|---|
| 1 | ∞ | 0.70 | 1.85135 | 40.10 |
| 2* | 7.333 | 1.52 | | |
| 3 | ∞ | 6.10 | 1.88300 | 40.76 |
| 4 | ∞ | 0.20 | | |
| 5* | 39.616 | 1.50 | 1.80139 | 45.45 |
| 6* | −20.144 | Variable | | |
| 7 | −20.151 | 0.80 | 1.88300 | 40.76 |
| 8 | 11.329 | 1.54 | 1.82114 | 24.06 |
| 9* | −275.016 | Variable | | |
| 10 (S) | ∞ | −0.50 | | |
| 11* | 5.454 | 2.30 | 1.58313 | 59.38 |
| 12 | 6.541 | 0.30 | | |
| 13 | 6.669 | 0.60 | 1.84666 | 23.78 |
| 14 | 4.423 | 2.50 | 1.59201 | 67.02 |
| 15* | −125.446 | Variable | | |
| 16* | −14.975 | 1.00 | 1.56732 | 42.82 |
| 17 | 264.294 | 1.50 | 1.49700 | 81.54 |
| 18 | −19.957 | Variable | | |
| 19 | ∞ | 0.50 | 1.53996 | 59.45 |
| 20 | ∞ | 0.30 | | |
| 21 | ∞ | 0.50 | 1.51633 | 64.14 |
| 22 | ∞ | 0.36 | | |
| Image plane (Light receiving surface) | | | | |

Aspherical data

2nd surface

K = −0.043, A4 = 1.17983e−04, A6 = 6.55920e−06, A8 = −4.98744e−07,
A10 = 1.30306e−08
5th surface K = 0.000, A4 = −1.66741e−04, A6 = −1.72272e−06,
A8 = −1.85162e−06
6th surface K = 17.698, A4 = −1.04265e−04, A6 = 9.53257e−06,
A8 = −2.47236e−06, A10 = 6.91668e−08
9th surface K = 0.000, A4 = 4.52346e−05, A6 = 4.42125e−07, A8 = 1.29363e−07,
A10 = −1.01530e−08

-continued unit mm

11th surface

K = 0.000, A4 = −8.78437e−05, A6 = 2.23735e−06, A8 = −4.95027e−08

15th surface

K = 0.000, A4 = 1.32099e−03, A6 = 2.73111e−05, A8 = 5.00000e−06

16th surface

K = 0.000, A4 = 9.50164e−05, A6 = 4.56970e−06, A8 = 1.09110e−06, A10 = −6.15435e−08

Zoom data

| | WE | ST | TE |
|---|---|---|---|
| IH | 3.60 | 3.60 | 3.60 |
| Focal length | 6.25 | 11.10 | 14.40 |
| FNO. | 3.93 | 5.22 | 6.00 |
| 2ω (°) | 69.59 | 37.34 | 28.64 |
| BF | 9.26 | 15.72 | 17.66 |
| Total length | 45.92 | 45.92 | 45.92 |
| d6 | 0.40 | 3.28 | 2.66 |
| d9 | 13.07 | 4.35 | 1.83 |
| d15 | 3.13 | 2.50 | 3.72 |
| d18 | 7.95 | 14.40 | 16.34 |

Unit focal length

| f1 = −53.35 | f2 = −21.64 | f3 = 10.51 | f4 = −85.47 |
|---|---|---|---|

Example 14 unit mm

Surface data

| Surface No | r | d | nd | vd |
|---|---|---|---|---|
| 1 | ∞ | 0.70 | 1.88300 | 40.76 |
| 2 | 9.344 | 1.18 | | |
| 3 | ∞ | 6.50 | 1.88300 | 40.76 |
| 4 | ∞ | 0.20 | | |
| 5* | 50.714 | 1.50 | 1.80610 | 40.92 |
| 6* | −21.604 | Variable | | |
| 7 | −15.086 | 0.80 | 1.88300 | 40.76 |
| 8 | 11.246 | 1.54 | 1.82114 | 24.06 |
| 9* | −107.602 | Variable | | |
| 10 (S) | ∞ | −0.50 | | |
| 11* | 5.589 | 2.30 | 1.58313 | 59.38 |
| 12 | 8.235 | 0.60 | 1.84666 | 23.78 |
| 13 | 4.936 | 2.50 | 1.59201 | 67.02 |
| 14* | −321.369 | Variable | | |
| 15* | −15.870 | 1.00 | 1.52542 | 55.78 |
| 16 | −22.081 | Variable | | |
| 17 | ∞ | 0.50 | 1.53996 | 59.45 |
| 18 | ∞ | 0.30 | | |
| 19 | ∞ | 0.50 | 1.51633 | 64.14 |
| 20 | ∞ | 0.36 | | |
| Image plane (Light receiving surface) | | | | |

Aspherical data

5th surface

K = 0.000, A4 = −1.52267e−04, A6 = −2.41321e−05, A8 = −5.09857e−07

-continued unit mm

6th surface

K = 25.185, A4 = 7.80396e−05, A6 = −4.41609e−06, A8 = −1.67386e−06, A10 = 1.09764e−07

9th surface

K = 0.000, A4 = −2.27094e−05, A6 = 4.97956e−06, A8 = −5.13970e−07, A10 = 2.18806e−08

11th surface

K = 0.000, A4 = −7.48440e−05, A6 = 7.22007e−06, A8 = −8.53979e−08

14th surface

K = 0.000, A4 = 1.29550e−03, A6 = 3.33359e−05, A8 = 5.00000e−06

15th surface

K = 0.000, A4 = −1.82701e−04, A6 = 6.99789e−05, A8 = −9.58644e−06, A10 = 4.94067e−07

Zoom data

| | WE | ST | TE |
|---|---|---|---|
| IH | 3.60 | 3.60 | 3.60 |
| Focal length | 6.46 | 10.90 | 18.61 |
| FNO. | 3.44 | 4.45 | 6.00 |
| 2ω (°) | 67.06 | 37.89 | 22.12 |
| BF | 9.22 | 10.96 | 10.15 |
| Total length | 46.83 | 46.83 | 46.83 |
| d6 | 0.40 | 3.37 | 0.50 |
| d9 | 14.01 | 6.19 | 1.80 |
| d14 | 4.88 | 7.99 | 16.06 |
| d16 | 7.90 | 9.64 | 8.84 |

Unit focal length

| f1 = −67.73 | f2 = −17.88 | f3 = 10.97 | f4 = −113.70 |
|---|---|---|---|

Example 15 unit mm

Surface data

| Surface No | r | d | nd | vd |
|---|---|---|---|---|
| 1 | ∞ | 0.70 | 1.88300 | 40.76 |
| 2 | 9.152 | 1.21 | | |
| 3 | ∞ | 6.50 | 1.88300 | 40.76 |
| 4 | −1000.000 | 0.20 | | |
| 5* | 51.283 | 1.50 | 1.80610 | 40.92 |
| 6* | −21.625 | Variable | | |
| 7 | −15.169 | 0.80 | 1.88300 | 40.76 |
| 8 | 11.431 | 1.54 | 1.82114 | 24.06 |
| 9* | −89.018 | Variable | | |
| 10 (S) | ∞ | −0.50 | | |
| 11* | 5.630 | 2.30 | 1.58313 | 59.38 |
| 12 | 7.689 | 0.60 | 1.84666 | 23.78 |
| 13 | 4.717 | 2.50 | 1.59201 | 67.02 |
| 14* | 562.504 | Variable | | |
| 15* | −7.272 | 1.00 | 1.52542 | 55.78 |
| 16 | −7.839 | Variable | | |
| 17 | ∞ | 0.50 | 1.53996 | 59.45 |
| 18 | ∞ | 0.27 | | |
| 19 | ∞ | 0.50 | 1.51633 | 64.14 |
| 20 | ∞ | 0.36 | | |
| Image plane (Light receiving surface) | | | | |

-continued unit mm

Aspherical data

5th surface

K = 0.000, A4 = −1.77490e−04, A6 = −1.55278e−05,
A8 = −6.83985e−07
6th surface

K = 23.898, A4 = 4.73950e−05, A6 = −1.10132e−06,
A8 = −1.38050e−06, A10 = 7.82556e−08
9th surface K = 0.000, A4 = −2.27353e−05, A6 = 5.04715e−06, A8 = −4.74407e−07,
A10 = 1.83306e−08
11th surface K = 0.000, A4 = −3.96094e−05, A6 = 5.49406e−06, A8 = −1.74382e−08
14th surface K = 0.000, A4 = 1.28142e−03, A6 = 2.91554e−05, A8 = 5.00000e−06
15th surface K = 0.000, A4 = −1.21219e−04, A6 = 4.28440e−05, A8 = −4.23539e−06,
A10 = 1.57593e−07

Zoom data

|  | WE | ST | TE |
|---|---|---|---|
| IH | 3.60 | 3.60 | 3.60 |
| Focal length | 6.46 | 10.90 | 18.61 |
| FNO. | 3.43 | 4.43 | 6.00 |
| 2ω (°) | 67.05 | 37.95 | 22.19 |
| BF | 9.19 | 11.29 | 7.14 |
| Total length | 47.62 | 47.62 | 47.62 |
| d6 | 0.40 | 3.40 | 0.50 |
| d9 | 14.32 | 6.23 | 1.80 |
| d14 | 5.37 | 8.35 | 19.83 |
| d16 | 7.90 | 10.01 | 5.85 |

Unit focal length

| f1 = −66.07 | f2 = −18.58 | f3 = 11.30 | f4 = −485.54 |
|---|---|---|---|

Example 16 unit mm

Surface data

| Surface No | r | d | nd | vd |
|---|---|---|---|---|
| 1 | ∞ | 0.70 | 1.88300 | 40.76 |
| 2 | 8.928 | 1.23 | | |
| 3 | 986.240 | 6.50 | 1.88300 | 40.76 |
| 4 | −501.230 | 0.20 | | |
| 5* | 45.459 | 1.50 | 1.80610 | 40.92 |
| 6* | −21.131 | Variable | | |
| 7 | −15.577 | 0.80 | 1.88300 | 40.76 |
| 8 | 11.157 | 1.54 | 1.82114 | 24.06 |
| 9* | −139.139 | Variable | | |
| 10 (S) | ∞ | −0.50 | | |
| 11* | 5.644 | 2.30 | 1.58313 | 59.38 |
| 12 | 7.012 | 0.60 | 1.84666 | 23.78 |
| 13 | 4.460 | 2.50 | 1.59201 | 67.02 |
| 14* | 344.818 | Variable | | |
| 15* | −6.264 | 1.00 | 1.49700 | 81.54 |
| 16 | −6.615 | Variable | | |
| 17 | ∞ | 0.50 | 1.53996 | 59.45 |
| 18 | ∞ | 0.27 | | |
| 19 | ∞ | 0.50 | 1.51633 | 64.14 |
| 20 | ∞ | 0.36 | | |

-continued unit mm

Image plane
(Light
receiving
surface)

Aspherical data

5th surface

K = 0.000, A4 = −2.27230e−04, A6 = −9.75416e−06,
A8 = −1.01440e−06
6th surface

K = 22.009, A4 = −1.79552e−05, A6 = 5.75292e−06,
A8 = −1.82073e−06, A10 = 7.77447e−08
9th surface K = 0.000, A4 = −1.30102e−05, A6 = 2.52036e−06, A8 = −2.38120e−07,
A10 = 1.01733e−08
11th surface K = 0.000, A4 = −2.76435e−05, A6 = 4.56133e−06, A8 = 2.14489e−09
14th surface K = 0.000, A4 = 1.25753e−03, A6 = 2.46703e−05, A8 = 5.00000e−06
15th surface K = 0.000, A4 = −1.36063e−04, A6 = 4.16360e−05, A8 = −4.11322e−06,
A10 = 1.57461e−07

Zoom data

|  | WE | ST | TE |
|---|---|---|---|
| IH | 3.60 | 3.60 | 3.60 |
| Focal length | 6.46 | 10.90 | 18.61 |
| FNO. | 3.42 | 4.40 | 6.00 |
| 2ω (°) | 67.03 | 37.94 | 22.22 |
| BF | 9.19 | 11.47 | 6.78 |
| Total length | 47.66 | 47.66 | 47.66 |
| d6 | 0.40 | 3.39 | 0.50 |
| d9 | 14.32 | 6.28 | 1.80 |
| d14 | 5.38 | 8.15 | 20.21 |
| d16 | 7.90 | 10.18 | 5.49 |

Unit focal length

| f1 = −95.11 | f2 = −17.85 | f3 = 11.35 | f4 = −4387.93 |
|---|---|---|---|

Example 17 unit mm

Surface data

| Surface No | r | d | nd | vd |
|---|---|---|---|---|
| 1 | ∞ | 0.70 | 1.88300 | 40.76 |
| 2 | 10.228 | 1.05 | | |
| 3 | 986.240 | 7.00 | 1.80610 | 40.92 |
| 4* | −17.915 | Variable | | |
| 5 | −9.376 | 0.80 | 1.88300 | 40.76 |
| 6 | 20.781 | 1.54 | 1.82114 | 24.06 |
| 7* | −21.134 | Variable | | |
| 8 (S) | ∞ | −0.50 | | |
| 9* | 5.412 | 2.30 | 1.58313 | 59.38 |
| 10 | 5.389 | 0.60 | 1.84666 | 23.78 |
| 11 | 3.756 | 2.50 | 1.59201 | 67.02 |
| 12* | 87.014 | Variable | | |
| 13* | 12.804 | 1.00 | 1.49700 | 81.54 |
| 14 | 9.922 | Variable | | |
| 15 | ∞ | 0.50 | 1.53996 | 59.45 |

-continued unit mm

| 16 | ∞ | 0.27 | | |
| 17 | ∞ | 0.50 | 1.51633 | 64.14 |
| 18 | ∞ | 0.36 | | |
| Image plane (Light receiving surface) | | | | |

Aspherical data

4th surface

K = 14.923, A4 = 1.86211e−04, A6 = 1.49944e−05,
A8 = −3.76324e−07,
A10 = 4.00000e−08

7th surface

K = 0.000, A4 = 5.37991e−06, A6 = −6.59192e−07,
A8 = −1.89552e−07, A10 = 1.53746e−08

9th surface

K = 0.000, A4 = −7.44715e−05, A6 = 2.68948e−06, A8 = −9.27734e−08

12th surface

K = 0.000, A4 = 1.30124e−03, A6 = 2.46588e−05, A8 = 5.00000e−06

13th surface

K = 0.000, A4 = −2.17005e−04, A6 = 4.46579e−05, A8 = −4.36178e−06,
A10 = 1.65618e−07

Zoom data

| | WE | ST | TE |
|---|---|---|---|
| IH | 3.60 | 3.60 | 3.60 |
| Focal length | 6.35 | 10.89 | 18.61 |

-continued unit mm

| FNO. | 3.43 | 4.54 | 6.00 |
|---|---|---|---|
| 2ω (°) | 67.95 | 37.35 | 22.03 |
| BF | 9.18 | 12.06 | 5.84 |
| Total length | 45.10 | 45.10 | 45.10 |
| D4 | 0.40 | 3.50 | 0.50 |
| D7 | 14.55 | 6.36 | 1.80 |
| D12 | 3.98 | 6.19 | 19.97 |
| D14 | 7.90 | 10.77 | 4.55 |

Unit focal length

| f1 = −46.58 | f2 = −18.63 | f3 = 11.03 | f4 = −100.22 |
|---|---|---|---|

FIGS. 18A through 34C are aberration diagrams of the zoom lenses according to the first to the seventeenth embodiments in the state in which the zoom lenses are focused on an object point at infinity. These aberration diagrams show spherical aberration (SA), astigmatism (AS), distortion (DT), and chromatic aberration of magnification (CC) respectively at the wide angle end in FIGS. 18A to 34A, in the intermediate focal length state in FIGS. 18B to 34B, and at the telephoto end in FIGS. 18C to 34C. In these diagrams, FIY denotes the maximum image height.

Values of expressions (1-1)-(1-10) of each of the embodiments are shown below.

Here, values associated with conditional expression (1) are values in a state where an image pickup is performed without a distortion correction.

| | Example 1 | Example 2 | Example 3 | Example 4 | Example 5 |
|---|---|---|---|---|---|
| (1) fg4/ihw | −11.342 | −11.784 | −10.989 | −14.604 | −6.944 |
| (2) βg4(t)/βg4(w) | 1.240 | 1.279 | 1.310 | 1.233 | 1.439 |
| (3) Dg4/fg4 | −0.024 | −0.024 | −0.073 | −0.055 | −0.116 |
| (4) enp(w)/fw | 1.146 | 1.145 | 1.146 | 1.146 | 1.146 |
| (5) fg4/fg1 | 0.084 | 0.042 | 0.040 | 0.601 | 0.232 |
| (6) Dpr/fw | 1.115 | 1.115 | 1.115 | 1.146 | 1.146 |
| (7) nd(g4i) | 1.525 | 1.497 | 1.497 | 1.540 | 1.540 |
| (8) vd(g4i) | 55.777 | 81.540 | 81.540 | 59.460 | 59.460 |
| (9) ft/fw | 2.881 | 2.881 | 2.881 | 2.881 | 2.881 |
| (10) nd(pr) | 1.883 | 1.883 | 1.883 | 1.90366 | 1.90366 |

| | Example 6 | Example 7 | Example 8 | Example 9 |
|---|---|---|---|---|
| (1) fg4/ihw | −19.841 | −13.016 | −15.773 | −10.540 |
| (2) βg4(t)/βg4(w) | 1.033 | 1.193 | 1.155 | 1.233 |
| (3) Dg4/fg4 | −0.014 | −0.043 | −0.053 | −0.026 |
| (4) enp(w)/fw | 1.161 | 1.161 | 1.161 | 1.161 |
| (5) fg4/fg1 | 0.527 | 0.519 | 1.083 | 0.379 |
| (6) Dpr/fw | 0.944 | 0.944 | 0.944 | 0.944 |
| (7) nd(g4i) | 1.525 | 1.497 | 1.497 | 1.497 |
| (8) vd(g4i) | 55.777 | 81.540 | 81.540 | 81.540 |
| (9) ft/fw | 2.881 | 2.895 | 2.895 | 2.895 |
| (10) nd(pr) | 1.883 | 1.883 | 1.883 | 1.883 |

After distortion correction (Here, values associated with conditional expression (1) presented below are those in a case where the effective image pickup area has a barrel shape at the wide angle end.)

|  | Example 1 | Example 2 | Example 3 | Example 4 | Example 5 |
|---|---|---|---|---|---|
| IH | 3.34 | 3.343 | 3.347 | 3.348 | 3.348 |
| Half field angle | 30.819 | 30.859 | 30.891 | 30.897 | 30.887 |
| (1) fg4/ihw | −12.2251 | −12.6903 | −11.8201 | −15.7036 | −7.46714 |

|  | Example 6 | Example 7 | Example 8 | Example 9 |
|---|---|---|---|---|
| IH | 3.345 | 3.302 | 3.317 | 3.315 |
| Half field angle | 30.869 | 31.06 | 30.96 | 30.985 |
| (1) fg4/ihw | −21.3538 | −14.1907 | −17.1188 | −11.446 |

|  | Example 10 | Example 11 | Example 12 | Example 13 |
|---|---|---|---|---|
| (11) D1p/fw | 0.23 | 0.23 | 0.23 | 0.24 |
| (12) D1npr/fw | 0.18 | 0.19 | 0.19 | 0.24 |
| (13) Dpr/fw | 1.01 | 0.94 | 0.94 | 0.98 |
| (14) (r1no + r1ni)/(r1no − r1ni) | 1.00 | 1.00 | 1.00 | 1.00 |
| (15) (r1po + r1pi)/(r1po − r1pi) | 0.44 | 0.36 | 0.36 | 0.33 |
| (16) P1p/Pg1 | −3.25 | −4.99 | 7.01 | −3.17 |
| (17) P1p/Pg2 | −0.94 | −0.99 | −1.01 | −1.28 |
| (18) ft/fw | 2.88 | 2.88 | 2.88 | 2.30 |
| (19) Pg2/Pg1 | 3.45 | 5.04 | 6.97 | 2.47 |
| Image height after correction of distortion (wide angle end) | 3.341 | 3.344 | 3.344 | 3.324 |
| Field angle after correction of distortion (wide angle end) | 61.69 | 61.73 | 61.72 | 63.74 |

|  | Example 14 | Example 15 | Example 16 | Example 17 |
|---|---|---|---|---|
| (11) D1p/fw | 0.23 | 0.23 | 0.23 | — |
| (12) D1npr/fw | 0.18 | 0.19 | 0.19 | 0.17 |
| (13) Dpr/fw | 1.01 | 1.01 | 1.01 | 1.10 |
| (14) (r1no + r1ni)/(r1no − r1ni) | 1.00 | 1.00 | 1.00 | 1.00 |
| (15) (r1po + r1pi)/(r1po − r1pi) | 0.40 | 0.41 | 0.37 | — |
| (16) P1p/Pg1 | −3.57 | −3.47 | −5.26 | — |
| (17) P1p/Pg2 | −0.94 | −0.98 | −0.99 | — |
| (18) ft/fw | 2.88 | 2.88 | 2.88 | 2.93 |
| (19) Pg2/Pg1 | 3.79 | 3.56 | 5.33 | 2.50 |
| Image height after correction of distortion (wide angle end) | 3.341 | 3.342 | 3.343 | 3.343 |
| Field angle after correction of distortion (wide angle end) | 61.69 | 61.71 | 61.72 | 62.57 |

A flare stop may be disposed on the object side of the first lens unit, between the first lens unit and the second lens unit, between the second lens unit and the third lens unit, between the third lens unit and the fourth lens unit, or between the fourth lens unit and the image plane. A frame member provided in the zoom lens to hold lenses may be adapted to cut flare rays. Alternatively, a separate member may be provided for this purpose. Such a frame member or separate member may constitute a flare stop.

Alternatively, a flare stop may be provided on any lens included in the zoom lens by direct printing, painting in black, or by attaching a black sheet or sticker.

The aperture of the flare stop may have various shapes such as circular, elliptical, rectangular, or polygonal shape, or the shape of the aperture may be defined by a curve specified by a mathematical function. The flare stop may cut not only detrimental beams but also beams that may cause coma flare etc. in the peripheral region of the picture area.

It is also preferred that at least one of the surfaces of the lenses included in the zoom lens have anti-reflection coating applied thereon.

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Embodiment for Correcting Electrically Aberration)

In the present invention an image is recorded and displayed upon correcting electrically a barrel distortion which occurs at the wide angle side. In the zoom lens system of these embodiments, the barrel distortion occurs at the wide angle end, on a rectangular photoelectric conversion surface. Whereas, at the telephoto end, and near the intermediate focal length state, an occurrence of distortion is suppressed.

For correcting the distortion electrically, the effective image pickup area is let to be barrel shaped at the wide angle end, and rectangular shaped at the intermediate focal length state and the telephoto end. Moreover, the effective image pickup area which is set in advance is subjected to image conversion by an image processing, and is converted to rectangular image information in which the distortion is reduced. An arrangement is made such that the image height $IH_w$ at the wide angle end becomes smaller than the image height $IH_s$ in the intermediate focal length state, and the image height $IH_t$ at the telephoto end.

Use is made of an image transformation section that transforms, by image processing, an electrical signal generated by picking up an image formed by a zoom lens into an image signal representing an image in which color misregistration attributed to chromatic aberration of magnification is corrected. An improved image can be obtained by electrically compensating chromatic aberration of magnification of the zoom lens. In electronic still cameras, an image of an object is generally separated into images of three primary colors or first, second, and third primary colors, and a color image is reproduced by superimposing the output signals of the respective colors by computation.

In a case where the zoom lens has chromatic aberration of magnification, if the image with the first primary color light is taken as a reference, then the positions at which the images with the second primary color light and the third primary color light are formed will be displaced from the position at which the image with the first primary color light is formed. In order to electrically correct chromatic aberration of magnification of an image, the amounts of displacement of the image positions with the second primary color light and the third primary color light relative to the image position with the first primary color light are obtained in advance for each pixel of the image pickup element based on information on the aberration of the zoom lens.

Coordinate transformation may be performed for each pixel of a picked up image in such a way that the displacement relative to the image position with the first primary color light is corrected. In a case, for example, where an image is composed of three primary color output signals of red (R), green (G), and blue (B), displacements in the R and B image positions from the G image position may be obtained for each pixel in advance, and coordinate transformation may be performed on the picked up image to correct displacement from the G image position, and R and B signals after correction may be output.

Since chromatic aberration of magnification changes depending on the zoom position, the focus position, and the stop value, it is preferred that displacement amounts of the image positions with the second and the third primary colors relative to the image position with the first primary color for every lens position (i.e. zoom position, focus position and stop value) be stored as correction data in a memory device. Such correction data may be referred to in accordance with the lens position. Thus, the second and third primary color signals that have been corrected in terms of displacement relative to the first primary color signal can be output.

(Correction of Distortion)

Incidentally, when the zoom lens system of the present invention is used, a digital correction of distortion of an image is carried out electrically. A basic concept for the digital correction of the distortion of an image will be described below.

Figure 35:
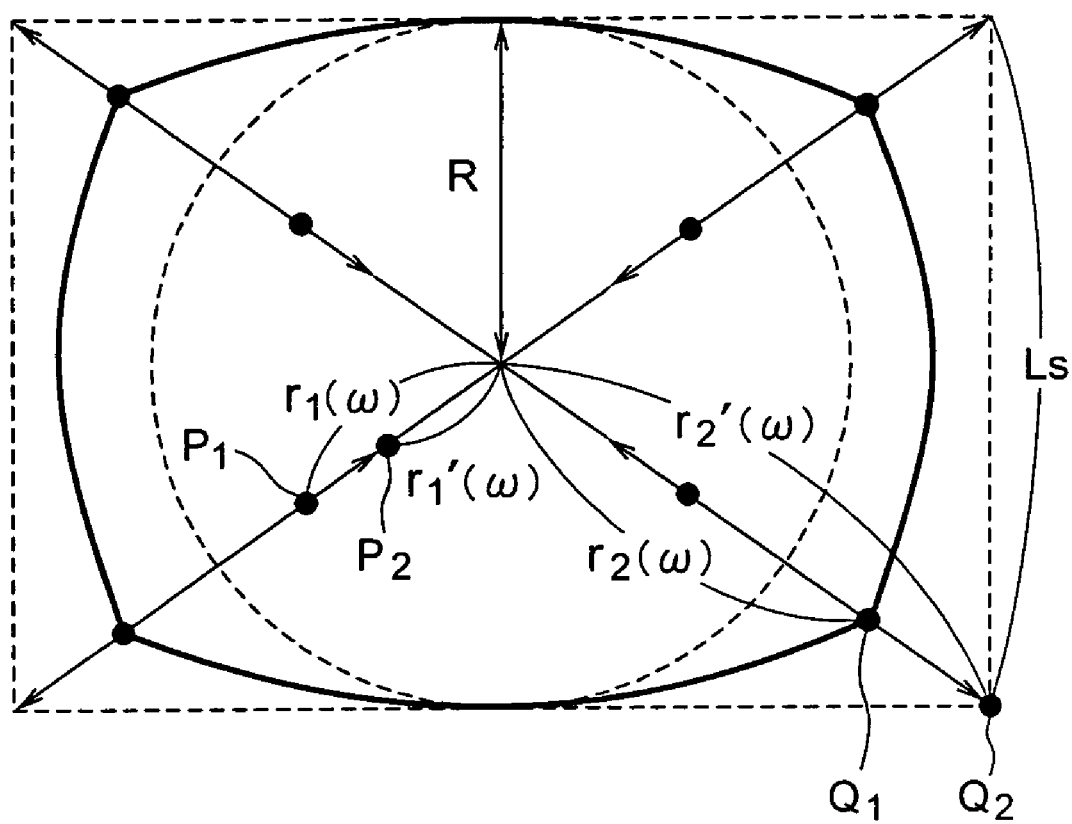
FIG. 35 is a diagram illustrating correction of distortion.

For example, as shown in FIG. 35, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 35, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \cdot \tan\omega \quad (0 \leq \alpha \leq 1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half image angle and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq 0.6 Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \cdot \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \cdot \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y / \tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f > y / \tan \omega.$$

In other words, when the focal length f of the imaging system, and the image height y are let to be fixed, a value of ω becomes large.

(Digital Camera)

The zoom lens according to the present invention as described in the forgoing my be used in an electronic image pickup apparatus, such as, in particular, a digital camera or a video camera, that receives or picks s up an image of an object formed by the zoom lens using an electronic image pickup element such as a CCD. An embodiment of such an image pickup apparatus will be described in the following.

Figure 36:
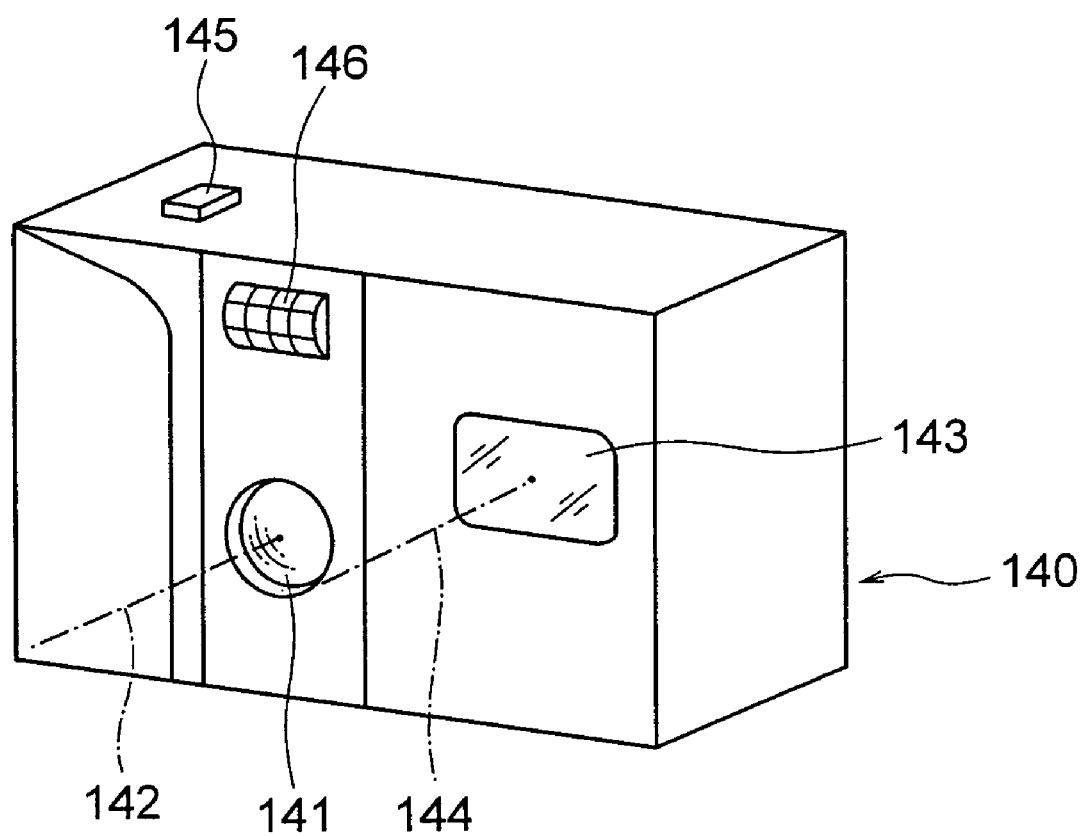
FIG. 36 is a front perspective view showing an outer appearance of a digital camera equipped with a zoom lens with a deflected optical path according to the present invention.
Figure 37:
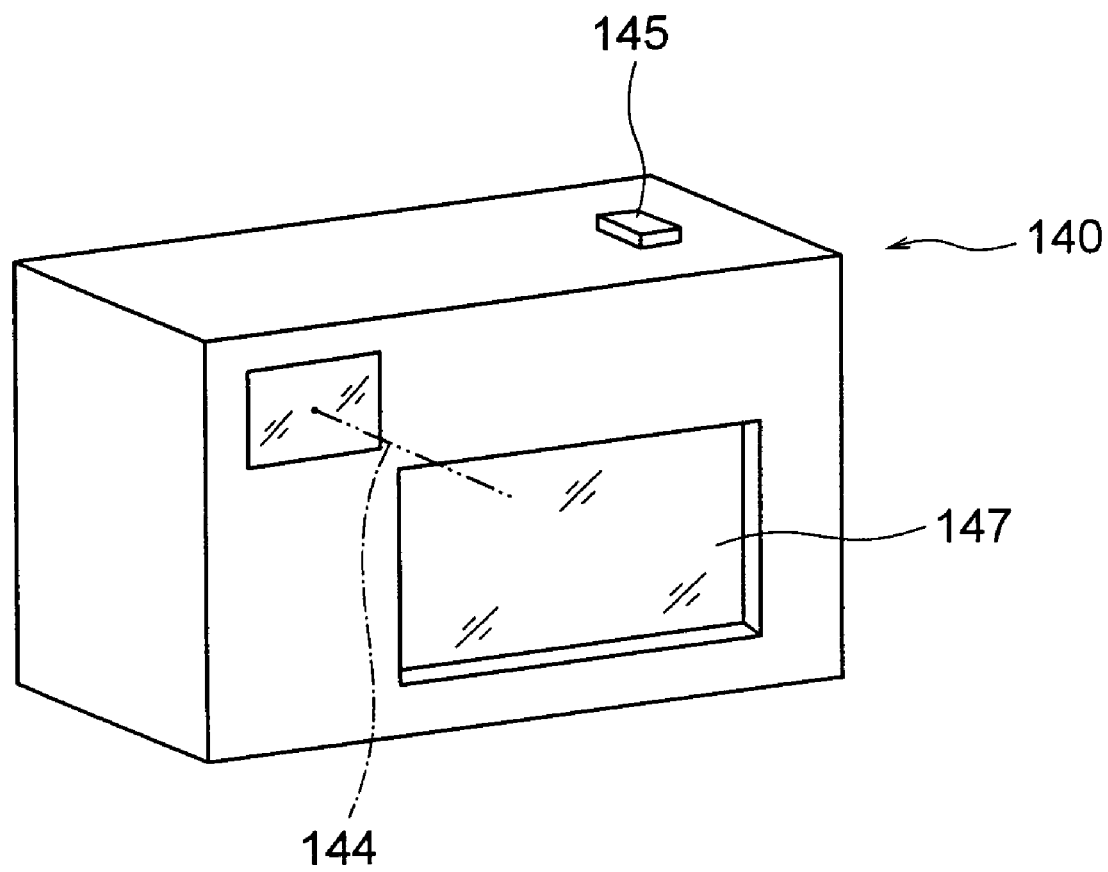
FIG. 37 is a rear perspective view of the digital camera.
Figure 38:
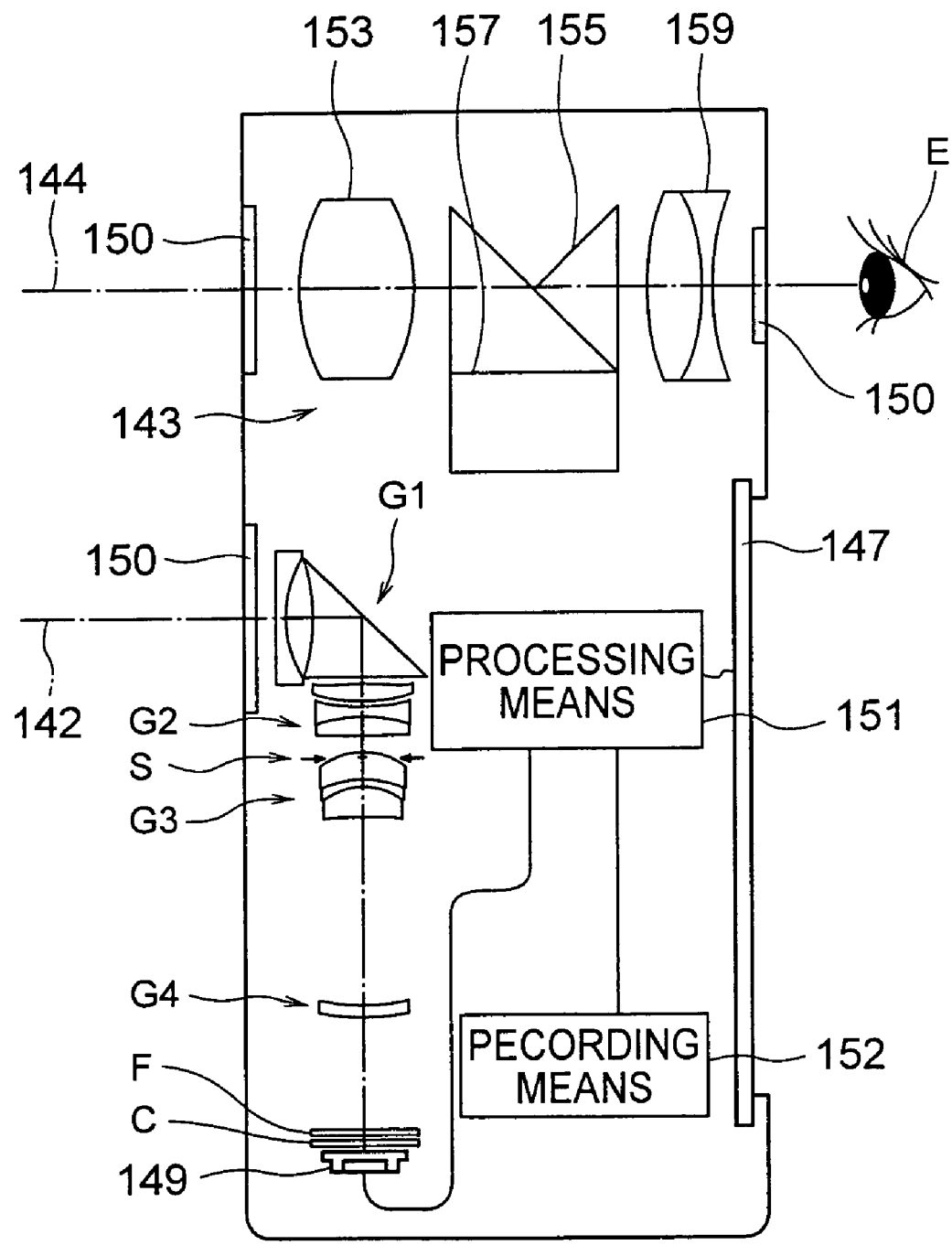
FIG. 38 is a cross sectional view of the digital camera.

FIG. 36 to FIG. 38 are conceptual diagrams of a structure of a digital camera according to the present invention in which a zoom lens system described above is incorporated in a taking optical system 141. FIG. 36 is a front perspective view showing an appearance of a digital camera 140, FIG. 37 is a rear perspective view of the same, and FIG. 38 is a schematic cross-sectional view showing a structure of the digital camera 140. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., when the shutter button 145 disposed on an upper portion of the digital camera 140 is pressed, in synchronization with the pressing of the shutter button 145, a photograph is taken by the taking optical system 141 such as the optical path reflecting zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. An object image formed by the finder objective optical system 153 is formed on a field frame 157 of a Porro prism 155 which is an image erecting member. On a rear side of the Porro prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has a high zoom ratio of 3 magnifications. Since the zoom lens has a high optical performance, it is possible to realize the inexpensive digital camera in which the depth is extremely thin.

Although a plane parallel plate is used as a cover member 150 in the camera shown in FIG. 38, it may be eliminated.

(Internal Circuit Structure)

Figure 39:
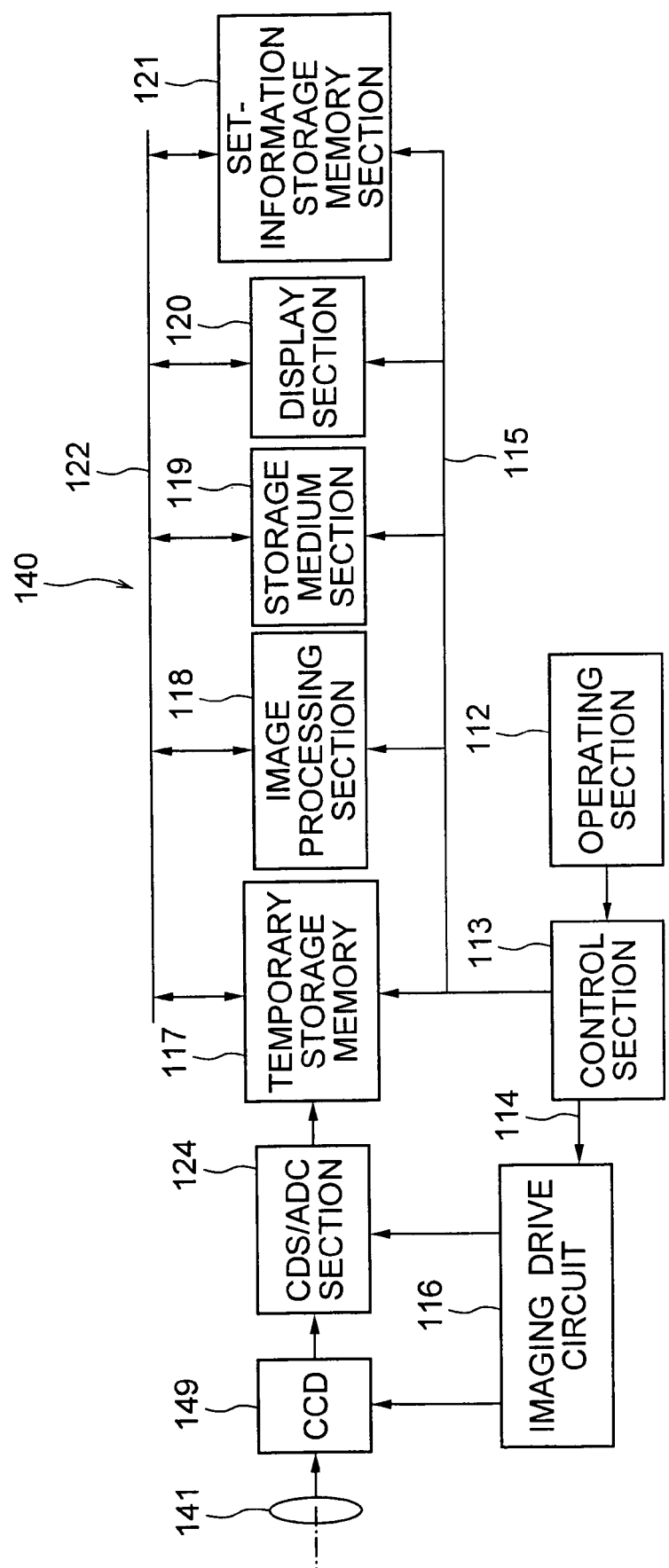
FIG. 39 is a block diagram of an internal circuit of a principal portion of the digital camera.

FIG. 39 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 39, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

Figure 40A:
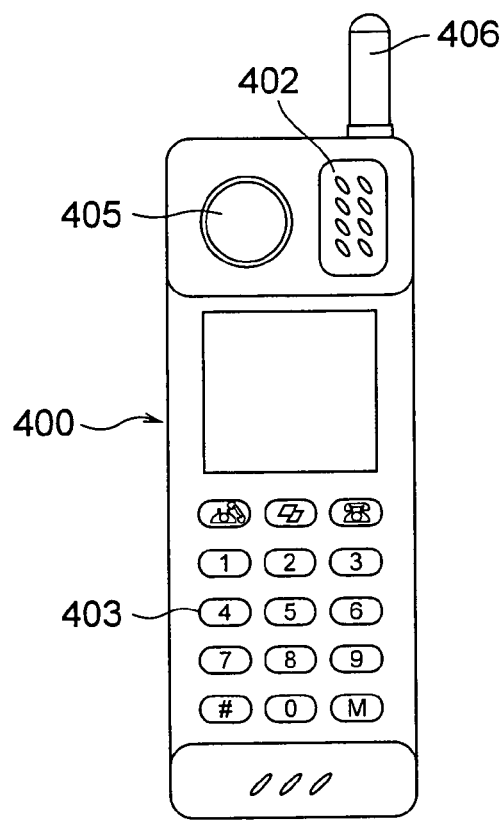
FIGS. 40A, 40B, and 40C are a front view, a side view, and a cross sectional view respectively showing a cellular phone equipped with a zoom lens with a deflected optical path according to the present invention.
Figure 40B:
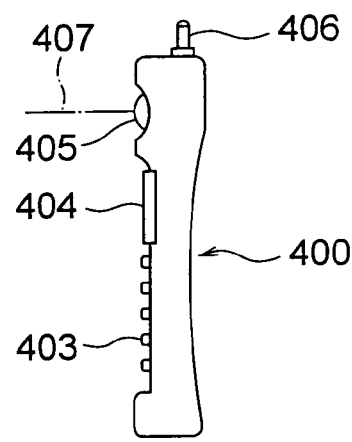
Figure 40C:
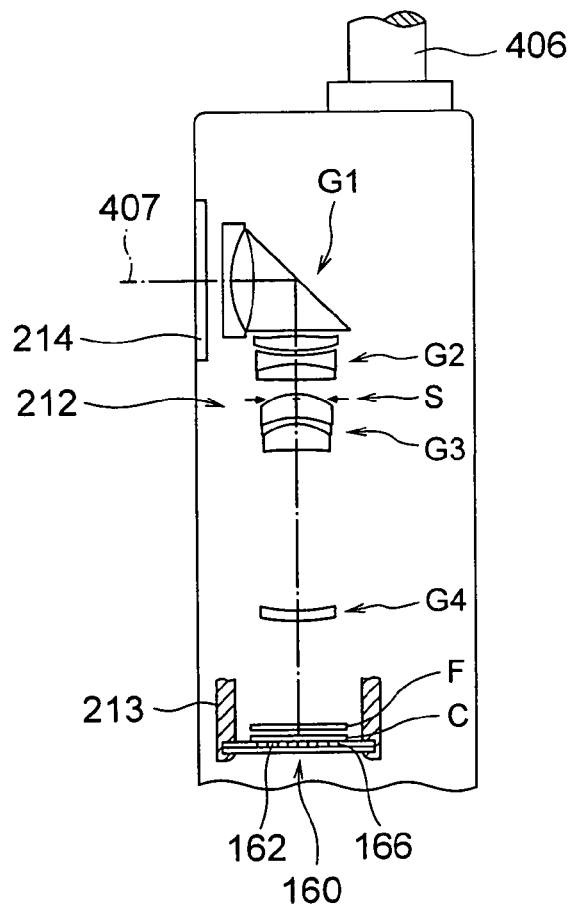

Next, a telephone which is an example of an information processing apparatus in which the vending changing magnification optical system of the present invention is built-in as a photographic optical system, particularly a portable telephone which is easy to carry is shown in FIG. 40A, FIG. 40B, and FIG. 40C. FIG. 40A is a front view of a portable telephone 400, FIG. 40B is a side view of the portable telephone 400, and FIG. 40C is a cross-sectional view of a photographic optical system 405. As shown in FIG. 40A to FIG. 40C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 212 which is constructed by the vending changing magnification optical system according to the present invention (it is abbreviated in the figure) which is disposed in a photographic optical path 407 and an image pickup element chip 162 which receives an object image. These are built into the portable telephone 400.

Here, an optical low-pass filter F is additionally installed on the image pickup element chip 162 which is integrally formed as an image pickup unit 160. the image pickup unit 160 is attachablly inserted by one touch at a rear end of a lens barrel 213 of the objective lens 212. Therefore, centering between the objective lens 212 and the image pickup element 162 or adjustment of plane gap is not necessary, thereby the assembling is simple. Further, a cover glass 214 for protecting the objective lens 212 is disposed at tip portion of the lens barrel 213 (it is omitted in the figure). A driving mechanism etc. of the zoom lens in the lens frame 213 is not shown in the figure.

An object image received at the electronic image pickup element chip 162 is input to an image processing means which is not shown in the diagram, via a terminal. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

As described in the forgoing, the present invention can provides a compact zoom lens that has an adequate zoom ratio and optical characteristics as demanded. Thus, the present invention can be suitably applied to a compact image pickup apparatus.

According to the present invention, there can be provided a zoom lens that is advantageous in making it compact and has an adequate zoom ratio and optical characteristics as demanded. In addition, an image pickup apparatus equipped with such a zoom lens can also be provided by the present invention.

What is claimed is:

1. An image pickup apparatus comprising, in order from its object side:
   a zoom lens; and
   an image pickup element that converts an optical image formed by the zoom lens into an electrical signal, wherein
   the zoom lens comprises, in order from the object side, a first lens unit having a negative refracting power, a second lens unit having a negative refracting power, a third lens unit having a positive refracting power, and a fourth lens unit having a negative refracting power,
   during zooming from the wide angle end to the telephoto end, a distance between the first lens unit and the second lens unit changes, a distance between the second lens unit and the third lens unit changes, and a distance between the third lens unit and the fourth lens unit changes, the distance between the second lens unit and the third lens unit being smaller at the telephoto end than at the wide angle end, and
   the first lens unit comprises a reflecting surface that deflects the optical path, and the zoom lens satisfies the following condition (1):

$$-100 < fg4/ihw < -2.5 \qquad (1)$$

where fg4 is a focal length of the fourth lens unit, and ihw is the maximum image height at the wide angle end, wherein if an effective image pickup area of the image pickup element is variable, ihw is the largest value among values it can assume.

2. The image pickup apparatus according to claim 1, wherein the fourth lens unit is located closer to the object side at the telephoto end than at the wide angle end and satisfies the following condition (2):

$$1.01 < \beta g4(t)/\beta g4(w) < 2.0 \qquad (2)$$

where $\beta g4(w)$ is a lateral magnification of the fourth lens unit at the wide angle end in a state in which the zoom lens is focused on an object at a farthest distance on an optical axis, and $\beta g4(t)$ is the lateral magnification of the fourth lens unit at the telephoto end in a state in which the zoom lens is focused on an object at a farthest distance.

3. The image pickup apparatus according to claim 1, wherein the zoom lens satisfies the following condition (3):

$$-0.35 < Dg4/fg4 < -0.0005 \qquad (3)$$

where Dg4 is a thickness of the fourth lens unit from its object side surface to its image side surface on an optical axis.

4. The image pickup apparatus according to claim 1, wherein the zoom lens satisfies the following condition (4):

$$0.5 < enp(W)/fw < 1.8 \qquad (4)$$

where enp(w) is a distance, on an optical axis, from an object side refracting surface of the first lens unit to an entrance pupil at the wide angle end, and fw is a focal length of the entire zoom lens system at the wide angle end.

5. The image pickup apparatus according to claim 1, wherein the zoom lens satisfies the following condition (5):

$$0.001 < fg4/fg1 < 30.0 \qquad (5)$$

where fg1 is a focal length of the first lens unit.

6. The image pickup apparatus according to claim 1, wherein the first lens unit comprises a reflecting prism, the reflecting prism comprising the reflecting surface, an object side refracting surface, and an image side refracting surface, and the total number of reflecting surfaces is one.

7. The image pickup apparatus according to claim 1, wherein the first lens unit comprises a reflecting prism, the reflecting prism comprising the reflecting surface, an object side refracting surface, and an image side refracting surface, and the reflecting prism satisfies the following condition (6):

$$0.5 < Dpr/fw < 2.0 \quad (6)$$

where Dpr is an optical path length from the object side refracting surface of the reflecting prism to the image side refracting surface thereof along an optical axis, and fw is a focal length of the entire zoom lens system at the wide angle end.

8. The image pickup apparatus according to claim 1, wherein the first lens unit comprises a reflecting prism, the reflecting prism comprising the reflecting surface, an object side refracting surface, and an image side refracting surface, and the reflecting prism satisfies the following condition (10):

$$1.70 < nd(pr) < 2.3 \quad (10)$$

where nd(pr) is a refractive index for the d-line of the reflecting prism in the first lens unit.

9. The image pickup apparatus according to claim 1, wherein during zooming from the wide angle end to the telephoto end, the first lens unit is kept stationary, the second lens unit moves, and the third lens unit moves in such a way that it is located closer to the object side at the telephoto end than at the wide angle end.

10. The image pickup apparatus according to claim 1, wherein during zooming from the wide angle end to the telephoto end, the second lens unit moves first toward the image side and thereafter reverses its moving direction to move toward the object side.

11. The image pickup apparatus according to claim 1, wherein during focusing operation from an object at a long distance toward an object at a short distance, the fourth lens unit moves toward the image side.

12. The image pickup apparatus according to claim 1, wherein the third lens unit comprises two positive lens elements in total and one negative lens element in total, and at least two of the lens elements in the third lens unit are cemented together.

13. The image pickup apparatus according to claim 1, wherein the second lens unit consists, in order from the object side, of a negative lens element and a positive lens element, and the negative lens element and the positive lens element are cemented together.

14. The image pickup apparatus according to claim 1, wherein the fourth lens unit comprises two or fewer lens elements in total.

15. The image pickup apparatus according to claim 1, wherein the fourth lens unit comprises a negative lens disposed closest to the image side, and the fourth lens unit satisfies the following conditions (7) and (8):

$$1.4 < nd(g4i) < 1.7 \quad (7)$$

$$55.0 < vd(g4i) < 100 \quad (8)$$

where nd(g4i) is a refractive index for d-line of the lens closest to the image side in the fourth lens unit, and vd(g4i) is an Abbe number of the lens closest to the image side in the fourth lens unit.

16. The image pickup apparatus according to claim 1, wherein the zoom lens comprises an aperture stop disposed between an image side surface of the second lens unit and an image side surface of the third lens unit, and the zoom lens is a four unit zoom lens.

17. The image pickup apparatus according to claim 1, wherein the zoom lens satisfies the following condition (9):

$$1.8 \leq ft/fw 6.5 \quad (9)$$

where fw is a focal length of the entire zoom lens system at the wide angle end, and ft is a focal length of the entire zoom lens system at the telephoto end.

18. The image pickup apparatus according to claim 1, wherein the image pickup apparatus comprises an image transformation section that transforms, by image processing, an electrical signal representing an image containing distortion attributed to the zoom lens into an image signal in which distortion is corrected.

19. The image pickup apparatus according to claim 1, wherein the image pickup apparatus comprises an image transformation section that transforms, by image processing, an electrical signal representing an image containing chromatic aberration of magnification attributed to the zoom lens into an image signal in which chromatic aberration of magnification is corrected.

20. A zoom lens comprising, in order from its object side, a first lens unit having a negative refracting power, a second lens unit having a negative refracting power, a third lens unit having a positive refracting power, and a fourth lens unit having a negative refracting power, wherein during zooming from the wide angle end to the telephoto end, a distance between the first lens unit and the second lens unit changes, a distance between the second lens unit and the third lens unit changes, and a distance between the third lens unit and the fourth lens unit changes, the distance between the second lens unit and the third lens unit being smaller at the telephoto end than at the wide angle end, and the first lens unit comprises a reflecting surface that deflects the optical path, a lens component having a negative refracting power disposed on the object side of the reflecting surface, and a convex surface having a positive refracting power disposed on the image side of the negative lens component.

21. The zoom lens according to claim 20, wherein the zoom lens satisfies the following condition (19):

$$0.5 < Pg2/Pg1 < 20 \quad (19)$$

where Pg1 is a refracting power of the first lens unit, and Pg2 is a refracting power of the second lens unit, the refracting power being the reciprocal of the focal length.

22. The zoom lens according to claim 20, wherein the negative lens component in the first lens unit has a shape with a concave surface directed toward the image side.

23. The zoom lens according to claim 22, wherein the concave image side surface of the negative lens component in the first lens unit is an aspheric surface.

24. The zoom lens according to claim 22, wherein the zoom lens component satisfies the following condition (14):

$$0.5 < (rlno+rlni)/(rlno-rlni) < 2 \quad (14)$$

where rlno is a paraxial radius of curvature of the object side surface of the negative lens component in the first lens unit, and rlni is a paraxial radius of curvature of the image side surface of the negative lens component in the first lens unit.

25. The zoom lens according to claim 20, wherein
the first lens unit has a convex lens surface positioned closer to the image side than the reflecting surface.

26. The zoom lens according to claim 25, wherein
the first lens unit comprises a positive lens component having the convex lens surface disposed on the image side of the reflecting surface.

27. The zoom lens according to claim 26, wherein the zoom lens satisfies the following condition (15):

$$-1.0<(rlpo+rlpi)/(rlpo-rlpi)<1.0 \quad (15)$$

where rlpo is a paraxial radius of curvature of an object side surface of the positive lens component in the first lens unit, and rlpi is a paraxial radius of curvature of an image side surface of the positive lens component in the first lens unit.

28. The zoom lens according to claim 26, wherein the zoom lens satisfies the following condition (16):

$$-20.0<P1p/Pg1<-0.5 \quad (16)$$

where P1p is a refracting power of the positive lens component in the first lens unit, and Pg1 is a refracting power of the first lens unit, the refracting power being the reciprocal of the focal length.

29. The zoom lens according to claim 26, wherein the zoom lens satisfies the following condition (17):

$$-5.0<P1p/Pg2<-0.03 \quad (17)$$

where P1p is a refracting power of the positive lens component in the first lens unit, and Pg2 is a refracting power of the second lens unit, the refracting power being the reciprocal of the focal length.

30. The zoom lens according to claim 29, wherein the first lens unit consists, in order from the object side, of the negative lens component, a reflecting member having the reflecting surface, and the positive lens component.

31. The zoom lens according to claim 30, wherein the zoom lens satisfies the following condition (11):

$$0.03<D1p/fw<2.0 \quad (11)$$

where D1p is a thickness, on an optical axis, of the positive lens component in the first lens unit, and fw is a focal length of the entire zoom lens system at the wide angle end.

32. The zoom lens according to claim 30, wherein the reflecting member is a reflecting prism having an object side refracting surface and an image side refracting surface.

33. The image pickup apparatus according to claim 32, wherein
the zoom lens satisfies the following condition (13):

$$0.5<Dpr/fw<2.0 \quad (13)$$

where Dpr is an optical path length along an optical axis from the object side refracting surface to the image side refracting surface of the reflecting prism, and fw is a focal length of the entire zoom lens system at the wide angle end.

34. The zoom lens according to claim 32, wherein the zoom lens satisfies the following condition (12):

$$0.03<D1npr/fw1.0 \quad (12)$$

where D1npr is a distance, on an optical axis, between the negative lens component in the first lens unit and the prism, and fw is a focal length of the entire zoom lens system at the wide angle end.

35. The zoom lens according to claim 30, wherein the negative lens component in the first lens unit is a single lens element, the positive lens component in the first lens unit is a single lens element, and the reflecting member in the first lens unit is a reflecting prism, and the reflecting prism comprises a plurality of refracting surface.

36. The zoom lens according to claim 20, wherein during zooming from the wide angle end to the telephoto end, the first lens unit is kept stationary, the second lens unit moves, and the third lens unit moves in such a way that it is located closer to the object side at the telephoto end than at the wide angle end.

37. The zoom lens according to claim 36, wherein during zooming from the wide angle end to the telephoto end, the second lens unit moves first toward the image side and thereafter reverses its moving direction to move toward the object side.

38. The zoom lens according to claim 36, wherein during zooming from the wide angle end to the telephoto end, the fourth lens unit moves in such a way that the distance between the fourth lens unit and the third lens unit changes.

39. The zoom lens according to claim 36, wherein the distance between the third lens unit and the fourth lens unit is larger at the telephoto end than at the wide angle end.

40. The zoom lens according to claim 36, wherein the fourth lens unit is located closer to the object side at the telephoto end than at the wide angle end.

41. The zoom lens according to claim 20, wherein any one of the lens units having a negative refracting power that is located closer to the image side than the reflecting surface moves during focusing operation from an object at a long distance toward an object at a short distance.

42. The zoom lens according to claim 20, wherein the fourth lens unit moves toward the image side during focusing operation from an object at a long distance toward an object at a short distance.

43. The zoom lens according to claim 20, wherein the zoom lens comprises an aperture stop provided between an image side surface of the second lens unit and an image side surface of the third lens unit, and the zoom lens is a four unit zoom lens.

44. The zoom lens according to claim 20, wherein the second lens unit consists of a negative lens element and a positive lens element, the third lens unit consists of two positive lens elements and one negative lens element, and the fourth lens unit consists of two or fewer lens elements in total.

45. The zoom lens according to claim 20, wherein the zoom lens satisfies the following condition (18):

$$2.3 \leq ft/fw<6 \quad (18)$$

where fw is a focal length of the entire zoom lens system at the wide angle end, and ft is a focal length of the entire zoom lens system at the telephoto end.

46. The zoom lens according to claim 20, wherein the zoom lens has a flare stop provided in the optical path.

47. The zoom lens according to claim 20, wherein at least one of the surfaces of the lenses included in the zoom lens has anti-reflection coating applied thereon.

48. An image pickup apparatus comprising a zoom lens according to claim 20, and an image pickup element disposed on the image side of the zoom lens that converts an optical image formed by the zoom lens into an electrical signal.

49. The image pickup apparatus according to claim 48, wherein the image pickup apparatus is provided with an image transformation section that transforms, by image processing, an electrical signal representing an image containing distortion attributed to the zoom lens into an image signal in which distortion is corrected.

50. The image pickup apparatus according to claim 48, wherein the image pickup apparatus is provided with an image transformation section that transforms, by image processing, an electrical signal containing chromatic aberration of magnification attributed to the zoom lens into an image signal in which chromatic aberration of magnification is corrected.

* * * * *